(12) United States Patent
Cao

(10) Patent No.: US 6,538,815 B1
(45) Date of Patent: Mar. 25, 2003

(54) BI-DIRECTIONAL OPTICAL CIRCULATOR AND APPLICATIONS THEREOF

(75) Inventor: Simon Cao, Pleasanton, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/572,928

(22) Filed: May 18, 2000

(51) Int. Cl.$^7$ .............................. G02B 27/28; H01J 14/02
(52) U.S. Cl. ..................... 359/484; 359/494; 359/495; 359/497; 359/502; 359/124; 385/11; 385/24
(58) Field of Search ................................. 359/124, 127, 359/484, 494, 495, 496, 497, 498, 502; 385/11, 15, 24

(56) References Cited

U.S. PATENT DOCUMENTS

| | | | | |
|---|---|---|---|---|
| 5,471,340 A | * | 11/1995 | Cheng et al. ............... | 359/484 |
| 5,546,219 A | * | 8/1996 | Iida ............................ | 359/484 |
| 5,615,290 A | * | 3/1997 | Harasawa et al. .......... | 385/24 |
| 5,909,295 A | * | 6/1999 | Li et al. ..................... | 359/130 |
| 5,912,766 A | * | 6/1999 | Pattie ......................... | 359/484 |

(List continued on next page.)

FOREIGN PATENT DOCUMENTS

GB 2304248 * 3/1997

OTHER PUBLICATIONS

Kreifeldt, E. Avanex Emerges with 'Photonic Process' Technology, http://news.fiberopticsonline.com/news–analysis/19990429–1759.html, pp. 1–6, Apr. 29, 1999.

"Optical circulator routes signals in two directions" p. 2 of 3 ($3^{rd}$ captioned paragraph), fibers.org–News & Analysis–Inn ...t patent applications (Mar. 2002) located at http://fibers.org/articles/news/4/3/7/1 WO 01/88603 corresponds to PCT/US01/14868, which corresponds to the patent application).

(List continued on next page.)

Primary Examiner—Cassandra Spyrou
Assistant Examiner—John Juba, Jr.
(74) Attorney, Agent, or Firm—Staas & Halsey LLP

(57) ABSTRACT

A method and apparatus of bi-directional optical circulation are provided wherein, for a plurality of optical input/output ports including a certain logical sequence, light of a first set of lights inputted to any port is outputted from the logical next port in the sequence and is prevented from being output from any other port and light of a second set of lights different from the first set inputted to any port is outputted from the logical preceding port in the sequence and is prevented from being output from any other port. An apparatus including a bi-directional optical circulator capable of either band bi-directional or interleaved bi-directional operation is also provided. The optical circulator of the present invention includes a mechanism of inputting and outputting four optical signals in each of two directions and a mechanism of directing each of the four input signals propagating in each direction to a unique output of the same direction in which the inputs and outputs of the signal propagating in the second direction are exactly opposite to those of the signal propagating in the first direction. The signal input and output mechanism includes four optical ports, a means of aligning the ports and a means of collimating the output of each fiber. Also provided are sets of apparatus and methods related to applications of bi-directional optical circulators within optical communications systems, such as bi-directional wavelength division optical multiplexing, bi-directional wavelength division optical add/drop multiplexing, three-way channel separation, bi-directional optical amplification, two-way multiplexing, and three-way multiplexing.

58 Claims, 28 Drawing Sheets

U.S. PATENT DOCUMENTS

| | | | |
|---|---|---|---|
| 5,930,422 A | * 7/1999 | Cheng | 359/484 |
| 6,130,765 A | * 10/2000 | Gautheron et al. | 359/127 |
| 6,157,477 A | * 12/2000 | Robinson | 359/130 |
| 6,160,660 A | * 12/2000 | Aina et al. | 359/124 |
| 6,169,604 B1 | 1/2001 | Cao | 356/519 |
| 6,215,592 B1 | * 4/2001 | Pelekhaty | 359/127 |
| 6,215,922 B1 | * 4/2001 | Okayama | 385/24 |
| 6,236,506 B1 | 5/2001 | Cao | 359/484 |
| 2001/0053022 A1 | 12/2001 | Tai et al. | 359/484 |
| 2002/0024730 A1 | 2/2002 | Ducellier et al. | 359/498 |

OTHER PUBLICATIONS

PCT Notification of Transmittal of International Preliminary Examination Report, mailed May 2, 2002, and PCT International Preliminary Examination Report, issued in corresponding PCT application No. PCT/US01/14868.

* cited by examiner

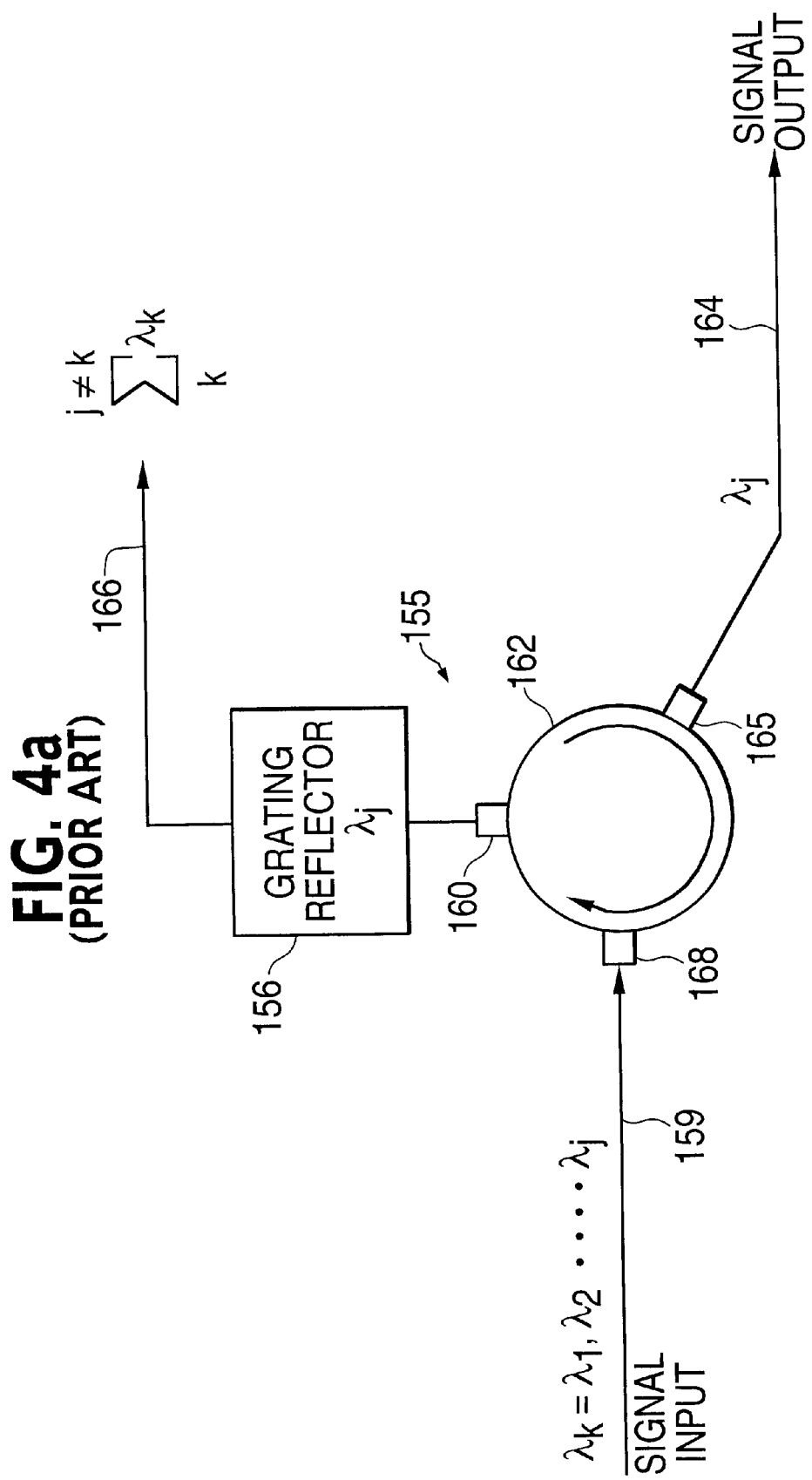

BI-DIRECTIONAL OPTICAL CIRCULATOR AND APPLICATIONS THEREOF

CROSS-REFERENCE TO RELATED APPLICATIONS

This application is related to U.S. Patent Application entitled Nonlinear Interferometer for Fiber Optic Dense Wavelength Division Multiplexer Utilizing a Phase Differential Method of Wavelength Separation, by Simon Cao, filed on Feb. 10, 1999, U.S. Ser. No. 09/247,253, incorporated herein by reference.

This application is also related to U.S. Patent Application entitled Dense Wavelength Division Multiplexer Utilizing an Asymmetric Pass Band Interferometer, filed Sep. 1, 1999, U.S. Ser. No. 09/388,350, incorporated herein by reference.

BACKGROUND OF THE INVENTION

1. Field of the Invention

The present invention relates to optical circulators utilized in lightwave communication systems and more particularly to bi-directional optical circulators within which a first subset of two mutually exclusive subsets of signals propagates in a logical clockwise direction and the second subset of the two mutually exclusive subsets of signals propagates in a logical counterclockwise direction opposite to the clockwise direction. The present invention further relates to wavelength division multiplexers and de-multiplexers in lightwave communications systems and, more particularly, to multiplexers and de-multiplexers utilizing bi-directional optical circulators.

2. Description of the Related Art

The optical circulator is a non-reciprocal multi-port device that has some similarities to an optical isolator but is more generally applicable. FIG. 1 illustrates the operation of a generalized four-port optical circulator 100 of the prior art. Light that enters the circulator at port A 102 exits the optical circulator 100 at port B 104. However, light that enters the optical circulator at port B 104 does not travel to port A 102 but instead exits at port C 106. Similarly, light entering the port C 106 exits only at port D 108, and light entering port D 108 exits only at the port A 102. In general, given a set of n equivalent optical input/output ports comprising a certain logical sequence within an optical circulator, light inputted to any port is outputted from the logical next port in the sequence and is prevented from being output from any other port. Since a light signal will only travel only one way through any two consecutive ports of an optical circulator, such ports, in effect, comprise an optical isolator. By installing a reflector at one port of a generalized n-port optical circulator (where n≧4) such that light outputted from the port is reflected back into the same port, the circulator may then be utilized as an (n−1)-port circulator. Furthermore, by blocking or failing to utilize one port of a generalized n-port optical circulator (where n≧4), the device may be used as an (n−1)-port quasi-circulator.

The main application of optical circulators is in bi-directional optical fiber communications in which two signals at the same wavelength may simultaneously propagate in opposite directions through a single fiber. In this way, optical circulators permit a doubling of the bit carrying capacity of an existing unidirectional fiber optic communication link since optical circulators can permit full duplex communication on a single fiber optic link.

FIG. 2 illustrates a common method by which a pair of conventional optical circulators can be used to provide simultaneous, bi-directional communication on a single fiber optic link. Two three-port optical circulators, 110 and 112, are installed at opposite ends of a fiber optic link 114. Each circulator comprises three ports, with ports A1 116; B1 118 and C1 120 located on circulator 110 and ports A2 122, B2 124 and C2 126 located on circulator 112. For optical circulators 111 and 112, communication transmitters 128 and 130 are optically coupled to port A1 116 and A2 122, respectively, the common fiber link 114 is optically coupled to port B1 118 and B2 124, respectively, and communication receivers 132 and 134 are optically coupled to port C1 120 and port C2 126, respectively. Because of the signal light re-direction properties of the optical circulators discussed above, light emitted from each transmitter 128 and 130 is launched into the fiber link 114 from opposite ports B1 118 and B2 124 in opposite directions. At the end of each respective path, the two optical circulators 110, 112 separate incoming signals from outgoing signals, so that the transmitters 128, 130 and receivers 132, 134 do not interfere with each other.

A more complex bi-directional optical communications system using a star architecture and optical circulators located, together with other components, on customers' premises, is disclosed in U.S. Pat. No. 5,572,612, which is incorporated herein by reference.

Optical circulators have many other applications in fiber optic communications systems. FIG. 3 illustrates an apparatus disclosed in U.S. Pat. No. 5,822,095 in which an optical add/drop multiplexer is constructed using two optical circulators and an intervening optical filter. U.S. Pat. No. 5,822,095 is incorporated herein by reference.

In FIG. 3 herein, which corresponds to FIG. 1 of U.S. Pat. No. 5,822,095, the wavelength components $\lambda_1$ to $\lambda_n$, of an input n-wave signal are received by an input optical fiber 136 and transmitted through an optical circulator 138 and an optical fiber 140 to an optical bandpass filter 144. The bandpass filter 144 allows a specific wavelength $\lambda_1$ to pass but rejects the other wavelengths $\lambda_2$ to $\lambda_n$. The rejected wavelengths are reflected by the bandpass filter 144 back to circulator 138 which re-directs them to output fiber 146. Meanwhile, the signal at wavelength $\lambda_1$ passes through filter 144 to another optical fiber 148 and thenceforth into another optical circulator 150 which then drops it to an output optical fiber 152. Furthermore, another signal component with the same wavelength $\lambda_1$ is simultaneously added and is introduced from another input optical fiber 154 interfaced to the second optical circulator 150. The second optical circulator 150 directs the added second signal to the bandpass filter 144 in the reverse direction from that of the dropped signal. After the second signal with wavelength $\lambda_1$ passes through the bandpass filter 144, it is mixed with the rejected wavelengths $\lambda_2$ to $\lambda_n$ from the first input fiber at the first optical circulator 138 and is outputted, along with these other rejected wavelengths, via output fiber 146.

In U.S. Pat. Nos. 5,383,686 and 5,825,520, which are both incorporated herein by reference, optical wavelength multiplexers and de-multiplexers are disclosed in which one or more Bragg grating reflectors are used in conjunction with one or more optical circulators. An example of one such de-multiplexer 155 and multiplexer 157, as disclosed in U.S. Pat. No. 5,825,520, is illustrated herein in FIGS. 4a and 4b, respectively. FIGS. 4a and 4b herein correspond to the FIGS. 3a and 2, respectively, of U.S. Pat. No. 5,825,520, and are explained briefly herein.

In the de-multiplexer 155 of FIG. 4a, an input signal 159 is de-multiplexed into two output signals, 164 and 166. In the multiplexer 157 of FIG. 4b, input signals 167 and 169 are multiplexed into output signals 170.

The grating reflector, such as grating reflector 156 of FIG. 4a or grating reflector 158 of FIG. 4b, typically comprises an in-fiber Bragg grating reflector and specifically reflects only one signal at a specific target wavelength. When coupled to the intermediate port 160 of a three-port optical circulator, such as circulator 162 of FIG. 4a, then only the target wavelength will be returned back to the circulator 162 and thereby directed to the output fiber 164 via port 165 of circulator 162. All other signals at different wavelengths will pass through the grating reflector 156 and then be output via the intermediate port 160 through fiber 166. In this fashion, the target signal is separated from all other signals. In similar fashion, as shown in FIG. 4b, if port 168 is used as input for the signal at wavelength $\lambda_j$, port 160 is used as the input for the signal at $\lambda_i$, and a grating reflector 158 specific to wavelength $\lambda_j$ is coupled to port 160, then the two signals are multiplexed and outputted through port 165 to output fiber 170.

As disclosed in U.S. Pat. No. 5,748,349, which is herein incorporated by reference, an optical add/drop multiplexer may be constructed by coupling a plurality of in-fiber Bragg gratings, each targeted to reflect a different wavelength, in series to an intermediate port of one or more optical circulators. An example of one embodiment of the apparatus of U.S. Pat. No. 5,748,349, as shown in FIG. 4 thereof, is shown herein as FIG. 5. To avoid transmitting any optical channel through a radiation mode loss region of any fiber Bragg grating, these gratings are disposed in a grouped sequence, 187 or 208, away from the circulator so as to reflect back to the circulator a sequence of wavelengths, $\lambda_1$, $\lambda_2$, $\lambda_3$, ..., $\lambda_i$, ..., $\lambda_n$ in which $\lambda_1 < \lambda_2 < \lambda_3 < \lambda_i < \lambda_n$.

The prior-art add-drop multiplexer 172 (FIG. 5) comprises a first three-port optical circulator 176 having first circulator port 178, second circulator port 180 and third circulator port 182, and a second three-port optical circulator 198 having first circulator port 200, second circulator port 202, and third circulator port 204. A first optical transmission path 174 optically communicates with first circulator port 178 for carrying a wavelength division multiplexed optical communication signal. A second optical transmission path 184 optically communicates with both the second port 180 of the first optical circulator 176 and the second port 202 of the second optical circulator 198.

Positioned in second optical transmission path 184 are first and second sets of Bragg gratings, respectively 187 and 208, separated by optical isolator 196. The first Bragg grating set 187 includes gratings 188, 190, and 192 respectively corresponding to wavelengths of $\lambda_1$, $\lambda_2$ and $\lambda_3$ where $\lambda_1 < \lambda_2 < \lambda_3$. Optical signals having these wavelengths are reflected back through the second port 180 of circulator 176 and output onto "drop" optical transmission path 186. The second Bragg grating set 208 includes gratings 210, 212, and 214 also corresponding to wavelengths of $\lambda_1$, $\lambda_2$ and $\lambda_3$ where $\lambda_{<\lambda 2} < \lambda_3$. Optical signals to be added to an optical system are carried by optical transmission path 206 into the first port 200 of the second optical circulator 198 and encounter gratings set 208 when the signals are output onto transmission path 184 through the second port 202 of the second circulator. These "add" optical signals are reflected back towards circulator port 202 along with the through optical channels transmitted through first and second gratings sets 187 and 208. The combined optical signals are output through the third port 204 of optical circulator 198 onto optical transmission path 194.

To prevent Fabry-Perot resonances between like gratings on either side of the isolator from leaked optical signals, an isolator 196 is positioned between gratings set 187 and gratings set 208. Isolator 196 permits optical signals to be unidirectional transmitted in the illustrated direction while optical signals propagating in the opposite direction are attenuated.

The reader is referred to U.S. Pat. No. 5,748,349 for further discussion of this and other aspects of the apparatus disclosed therein.

A reduced-ASE light source for fiber optic networks utilizing a circulator and a plurality of fiber Bragg gratings optically coupled in series thereto is disclosed in U.S. Pat. No. 5,812,712, which is herein incorporated by reference. In the apparatus of U.S. Pat. No. 5,812,712, the fiber Bragg gratings reflect only wavelengths corresponding to signal channels back to an intermediate circulator port, whereas unwanted ASE light passes through all the fiber gratings to a non-reflecting termination at which it is eliminated from the system. Wavelengths reflected back to the circulator's intermediate port by the gratings are directed by the circulator to an output port. In this fashion, light emanating from the output port is essentially free of ASE but has little or no attenuation of the targeted channel wavelengths.

Furthermore, an optical amplifier for use in a WDM system and employing an optical circulator is disclosed in U.S. Pat. No. 5,636,301, which is incorporated herein by reference. In the apparatus disclosed in U.S. Pat. No. 5,636,301, two circulator ports constitute the input and output ports of the amplifier, and a third circulator port is connected to an optically amplifying fiber. Bragg grating reflectors are formed at specific intervals along this fiber chosen such that each WDM channel is reflected back to the circulator at a distance in inverse proportion to the gain per unit length experienced by that channel in the amplifier fiber. In this fashion, the amplifier amplifies all channels to the same extent.

All of the prior art applications using optical circulators have the same limitation-they all use unidirectional optical circulators. In a unidirectional circulator, all wavelength channels are rotated or directed in a certain logical circulation direction (e.g., FIG. 1) around the ports of the device. However, through use of a bi-directional optical circulator, counter-propagating signals may be made to comprise different sets of wavelengths. In a bi-directional optical circulator apparatus, one set of wavelengths propagates in a first logical circulation direction (e.g., clockwise) through the apparatus whereas a second set of wavelengths different from the first propagates in a second logical circulation direction opposite to the first direction. In this fashion, utilization of the bi-directional optical circulator facilitates the development of certain bi-directional optical communication systems.

One example of the wavelength constitution of co-propagating bi-directional signals is illustrated in FIG. 6. In FIG. 6, as an example, the "blue" band 601 and the "red" band 602 occupy separate wavelength regions each wholly contained within the well-known fiber transmission band 603 centered near a wavelength of 1.55 mm. This type of bi-directional lightwave communication scheme is termed "band bi-directional" optical communication herein. In a band bi-directional optical communication system, wavelengths comprising a first band (e.g., the "red" band of FIG. 6) propagate in a first direction (e.g., eastbound) through the apparatus whereas wavelengths comprising a second band different from the first (e.g., the "blue" band of FIG. 6) propagate in a second direction (e.g., westbound) opposite to the first direction. Various types of band bi-directional communication schemes are possible. For instance, the "blue" band might correspond to all or a portion of the 1.3 mm fiber transmission band while the "red" band might correspond to all or a portion of the 1.55 mm transmission band, etc.

FIG. 7 illustrates a more complex form of bi-directional communication, herein termed "interleaved bi-directional" communication. In interleaved bi-directional communication, every $n^{th}$ channel propagates in one direction along an optical fiber communication system while the remaining channels propagate in the opposite direction. For instance, in FIG. 7, the special case in which n=2 is illustrated in which the even-numbered set of channels 701 denoted by a solid line might comprise the westbound signals and the odd-numbered set of channels 702 denoted by a dashed line might comprise the eastbound channels. Functionally, the set of channels 701 corresponds to the blue channels 601 of FIG. 6 while the set of channels 702 corresponds to the red channels 602. Ideally, within each set of channels 701 or 702, the spacing and widths of the component bands are identical, although this is not required. For instance, in FIG. 7, successive westbound (or eastbound) channels are separated by a frequency spacing of 100 GHz. However, the frequency spacing between a westbound (eastbound) channel and each of the nearest eastbound (westbound) channels is only 50 GHz.

A problem with prior-art circulators as well as of optical devices comprised of such circulators is that band bi-directional and interleaved bi-directional wavelength division multiplexed optical communications are not realizable without an excessive number of components and a complicated architecture. For instance, FIG. 22 illustrates a bi-directional optical add/drop multiplexer architecture for a band bi-directional optical communications system. The prior-art bi-directional optical add/drop multiplexer 2200 utilizes conventional (unidirectional) optical circulators. As described later herein, the add/drop multiplexer 2200 (FIG. 22) both adds and drops wavelengths of a first set of eastbound wavelengths as well as wavelengths of a second set of westbound wavelengths. However, the bi-directional add/drop multiplexer 2200 utilizing conventional circulators 2256–2259 comprises duplicate add/drop systems 2254–2255 which handle eastbound and westbound communications, respectively. Such duplication of systems adds undesirable complexity and cost to the apparatus.

SUMMARY OF THE INVENTION

Accordingly, it is an object of the present invention to create such advantages, as described herein, over the prior art through the disclosure of a bi-directional optical circulator.

In view of the above mentioned limitations of conventional unidirectional optical circulators and optical communications systems using such conventional circulators, it is an object of the present invention to provide a method of bi-directional optical circulation wherein, for a plurality of optical input/output ports comprising a certain logical sequence, light of a first set of lights inputted to any port is outputted from the logical next port in the sequence and is prevented from being output from any other port and light of a second set of lights different from the first set inputted to any port is outputted from the logical preceding port in the sequence and is prevented from being output from any other port.

It is a further object of the present invention to provide a bi-directional optical circulator apparatus in both band bi-directional and interleaved bi-directional embodiments.

It is another object of the present invention to provide a set of apparatus and methods related to important applications of bi-directional optical circulators within optical communications systems—namely, bi-directional wavelength division optical multiplexing, bi-directional wavelength division optical add/drop multiplexing, three-way channel separation, bi-directional optical amplification, two-way multiplexing, and three-way multiplexing.

A bi-directional optical circulator of the present invention is an apparatus that performs the method of bi-directional optical circulation as described above.

Further, a band bi-directional optical circulator of the present invention is an apparatus performing the method in which the first set of lights and the second set of lights comprise separate individually contiguous bands within the wavelength realm. Each such band may comprise one or a plurality of wavelength multiplexed channels wherein each such channel comprises a more-restricted wavelength range and carries an individual signal.

An interleaved bi-directional optical circulator of the present invention is an apparatus performing the method in which the first set of lights and the second set of lights each comprise a plurality of wavelengths wherein the wavelengths comprising the first set and those comprising the second set are interleaved with one another.

Moreover, a signal re-direction mechanism is provided with the present invention and includes a birefringent beam separation plate, two 90° optical rotation elements, a birefringent beam recombination plate, a set of two 45° optical rotation elements, one being a reciprocal optical rotator and the other being a non-reciprocal optical rotator, a lens and a reflector which provides a means of selectively rotating the polarization of only signals propagating in one direction. The reflector comprises a mirror and waveplate assembly in the band bi-directional embodiment and a non-linear interferometer in the interleaved bi-directional embodiment.

In a preferred embodiment of the present invention, the bi-directional optical circulator of the present invention comprises a ferrule, four optical fibers or ports contained within or secured by the ferrule, four optical collimators disposed adjacent to the optical fibers or ports, a first birefringent walk-off plate disposed adjacent to the collimators and separating unpolarized light input thereto into plane polarized e-ray and e-ray sub-lights, a first and a second 90° reciprocal optical rotator disposed adjacent to the first birefringent walk-off plate and opposite to the collimators and each intercepting one of the two sub-lights from each port, a second birefringent walk-off plate disposed adjacent to the two 90° optical rotators opposite to the first birefringent plate, a 45° reciprocal optical rotator and a 45° non-reciprocal optical rotator disposed adjacent to the second birefringent walk-off plate opposite to the two 90° reciprocal optical rotators and each intercepting light from two optical ports, a focusing lens disposed adjacent to the two 45° optical rotators opposite to the second birefringent plate and a reflecting element disposed at the focal point of the lens opposite to the two 45° optical rotators. The reflecting element comprises a mirror and waveplate assembly in the band bi-directional optical circulator and a non-linear interferometer in the interleaved bi-directional optical circulator.

The present invention is also a bi-directional wavelength division optical multiplexer apparatus comprising a three-port bi-directional optical circulator in which two ports are optically coupled to respective bi-directional optical communications systems, each such system comprising a first set of wavelengths propagating in a first direction and a second set of wavelengths different from the first set propagating in a second direction opposite to the first direction, and the third port is optically coupled to a unidirectional or common-wavelength bi-directional optical communication system and further comprising a set of channel-specific reflecting elements disposed within the uni-directional or common-wavelength bi-directional system.

The present invention is also a method for bi-directional optical wavelength division multiplexing in which two bi-directional optical communications systems, each such system comprising a first set of wavelengths propagating in a first direction and a second set of wavelengths different from the first set propagating in a second direction opposite to the first direction, are optically coupled to a single bi-directional optical circulator through a first port and a second port such that the first and second set are input to the circulator through its first and second ports, respectively, and directed in the logical clockwise and counterclockwise direction, respectively, through the circulator to its third port to be output therefrom. The method for bi-directional optical wavelength division multiplexing is further provided such that, after being output from the circulator third port, a first selection of the first wavelength set and a second selection of the second wavelength set are reflected back to and re-input to the circulator at the third port and the first wavelength selection and second wavelength selection are directed in the logical clockwise and counterclockwise direction, respectively, through the circulator to its second port and to its first port, respectively, so as to be output therefrom whilst the non-selected wavelengths are output from the third port.

The present invention is also a bi-directional wavelength division optical add/drop multiplexer apparatus comprising two three-port bi-directional optical circulators optically coupled to one another through one each of their respective ports wherein each circulator is also coupled, via its remaining ports, to a bi-directional optical communication system and a bi-directional optical add/drop system and further comprising a set of channel-specific reflecting elements disposed within the optical coupling between the two three-port bi-directional optical circulators.

The present invention is also a method for bi-directional optical add/drop multiplexing in which a first (second) bi-directional optical transmission system and a first (second) bi-directional optical add/drop system are optically coupled to a first port and a second port of a first of two (second of two) bi-directional optical circulators, wherein each of the first and second bi-directional optical transmission systems and each of the first and second bi-directional optical add/drop systems comprises a first set of wavelengths propagating in a first direction and a second set of wavelengths different from the first set propagating in a second direction opposite to the first direction, such that through-going wavelengths of the first (second) set are directed from the first (second) system to the first port of the first (second) circulator to the third port of the first (second) circulator to the third port of the second (first) circulator to the first port of the second (first) circulator and thence are output to the second (first) system. The method for bi-directional optical add/drop multiplexing is further provided such that dropped wavelengths of the first (second) set are directed from the first (second) system to the first port of the first (second) circulator to the third port of the first (second) circulator back to the third port of the first (second) circulator to the second port of the first (second) circulator and thence are output to the first (second) add/drop line. The method for bi-directional optical add/drop multiplexing is further provided such that added wavelengths of the first (second) set are directed from the second (first) add/drop line to the second port of the second (first) circulator to the third port of the second (first) circulator back to the third port of the second (first) circulator to the first port of the second (first) circulator and thence are output to the second (first) system.

The present invention is also a three-way optical channel separator apparatus comprising a four-port bi-directional optical circulator optically coupled to an input communication system through a first of its ports and to a first output communication system through its logical third port and also coupled to second and third output communication systems through its remaining ports wherein a set of channel-specific reflecting elements is disposed within the second output system and the third output system.

The present invention is also a method for three-way optical channel separation in which a set of wavelengths comprising a first and a second wavelength subset is input to a four-port bi-directional optical circulator through its first port such that the first (second) wavelength set is directed by the circulator in a logical clockwise (counterclockwise) circulation direction to its logical second (fourth) port so as to be output therefrom. The method for three-way optical channel separation is further provided such that, after being output from the circulator second (fourth) port, a first selection of the first wavelength set and a second selection of the second wavelength set are reflected back to and re-input to the circulator at the second (fourth) port and the first wavelength selection of the first set and second wavelength selection of the second set are directed in the logical clockwise (counterclockwise) direction through the circulator to its third port so as to be output therefrom to a first optical output system whilst the non-selected wavelengths of the first (second) set are output from the second (fourth) port to a second (third) optical output system.

The present invention is also a bi-directional optical amplifier apparatus comprising a three-port bi-directional optical circulator optically coupled to two bi-directional optical communications systems through two of its ports and optically coupled to an optical gain element through the third port wherein a dichroic mirror reflecting signal wavelengths and transmitting pump laser wavelengths is disposed at the end of and optically coupled to the end of the optical gain element and wherein a pump laser light is optically coupled to the optical gain element through the dichroic mirror.

The present invention is also a method for bi-directional optical amplification within a bi-directional optical communications system, wherein the system comprises a first set of wavelengths propagating in a first direction and a second set of wavelengths different from the first set propagating in a second direction opposite to the first direction, such that separate segments of the bi-directional system are optically coupled to a single three-port bi-directional optical circulator through its first and second ports so that the first (second) wavelengths input from the first (second) port and are directed through the circulator in a logical clockwise (counterclockwise) direction to the third port so as to be output therefrom to an optical gain element. The method for bi-directional optical amplification is further provided such that the first and second wavelengths propagate through the optical gain element from the third port of the circulator to a dichroic reflector at the end of the optical gain element and back to the third port of the circulator whilst a laser pump beam in inputted to the optical gain element through the dichroic reflector. The method for bi-directional optical amplification is further provided such that the laser pump beam is prevented from entering the optical circulator and such that, after traveling once in each direction through the optical gain element, the first (second) wavelengths are re-input to the circulator through its third port and directed through the circulator in the logical clockwise (counterclockwise) direction to the second (first) port to be output therefrom back to the bi-directional optical communication system.

The present invention is also a two-way wavelength division optical multiplexer apparatus comprising a three port bi-directional optical circulator whose three ports are optically coupled to a first input, a second input and an output optical communication system.

The present invention is also a method for wavelength division optical multiplexing in which a first (second) set of wavelengths are input to a three-port bi-directional optical circulator through its first (second) port and then directed through the circulator in a logical clockwise (counterclockwise) direction to the third port so as to be output therefrom.

The present invention is also a three-way optical multiplexer apparatus comprising a four-port bi-directional optical circulator optically coupled to an input optical communication system through a first of its ports and to an output optical communication system through another port two ports removed from the first port and also coupled to second and third input communication systems through its remaining ports wherein a set of channel-specific reflecting elements is disposed within the second input system and the third input system.

The present invention is also a method for three-way wavelength division optical multiplexing in which a first, second and third set of wavelengths are input to a four-port bi-directional optical circulator through a first, second and third port, respectively and wherein the first (third) wavelengths are all elements of a first (second) subset of wavelengths that are directed through the circulator in a logical clockwise (counterclockwise) circulation direction and wherein the second wavelengths comprise elements of both the first and second wavelength subset. The method for three-way wavelength division optical multiplexing is further provided such that the first (third) wavelengths are directed through the circulator from the first (third) port in a logical clockwise (counterclockwise) circulation direction to the fourth port so as to be output therefrom. The method for three-way wavelength division optical multiplexing is further provided such that the second wavelengths comprising the first (second) wavelength subset are directed through the circulator in a logical clockwise (counterclockwise) circulation direction from the second port to the first (third) port so as to be output therefrom and thence reflected back to and re-input to the circulator through its first (third) port and thence directed in the logical clockwise (counterclockwise) circulation direction to the fourth port so as to be output therefrom.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The objects and features of the present invention will become more readily apparent from the following detailed description taken in conjunction with the accompanying drawings in which:

FIG. 4A and FIG. 4B are schematic diagrams of a prior-art optical add/drop multiplexer utilizing conventional optical circulators together with optical grating reflectors.

DESCRIPTION OF THE PREFERRED EMBODIMENTS

Figure 1:
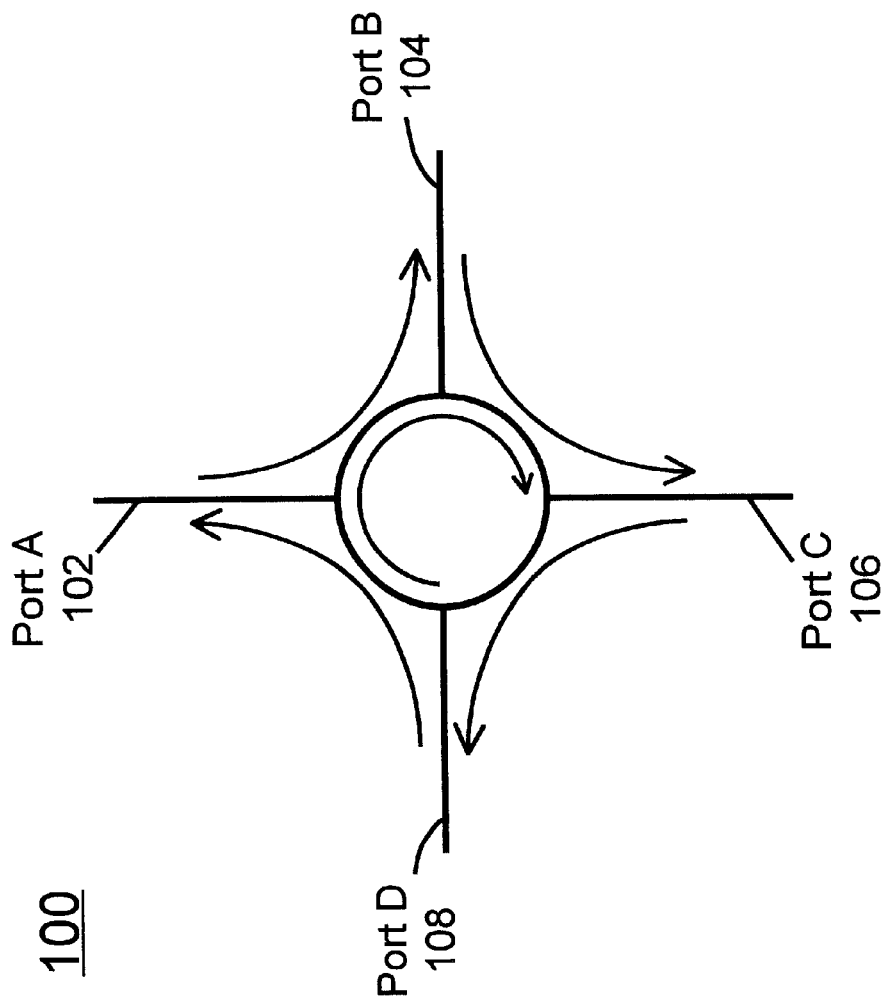
FIG. 1 is a schematic diagram of the operation of a conventional optical circulator.
Figure 2:
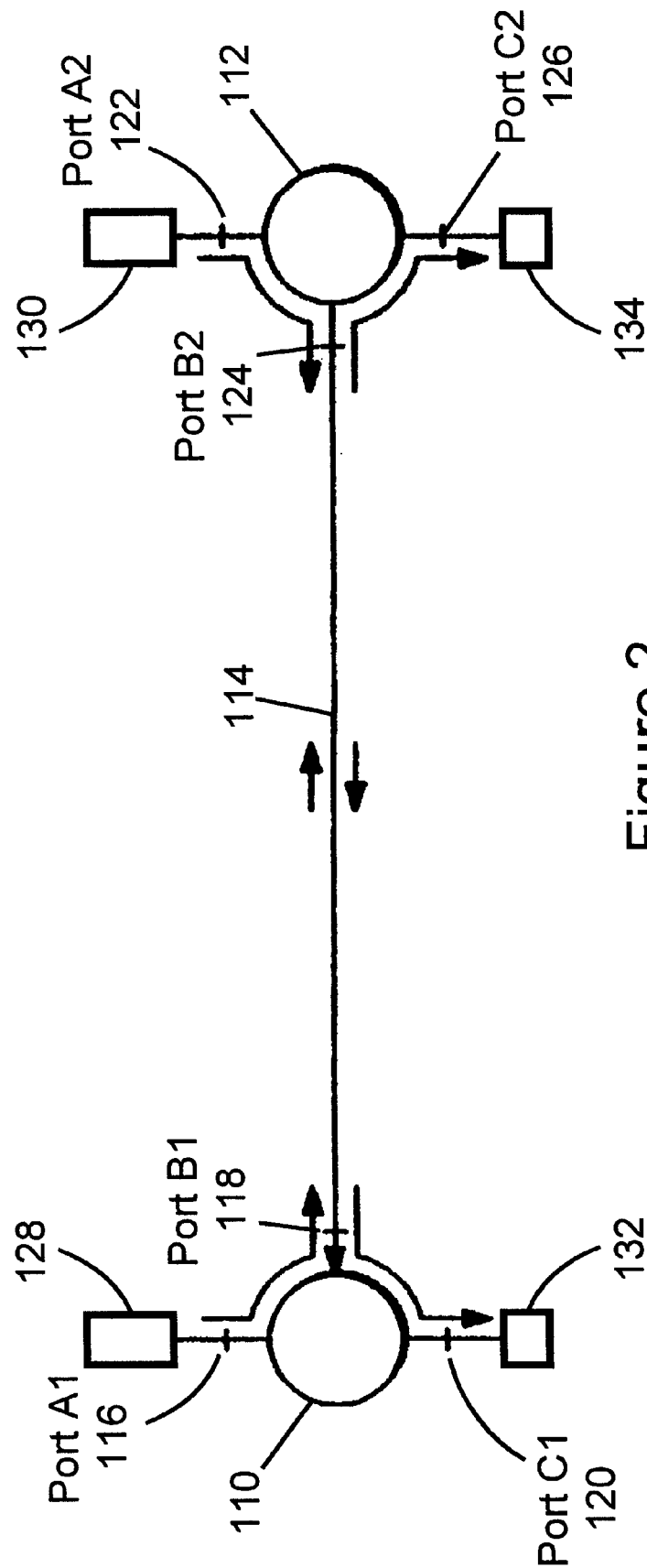
FIG. 2 is a schematic diagram of a prior-art bi-directional optical communication system utilizing conventional optical circulators together with transmitters and receivers.
Figure 3:
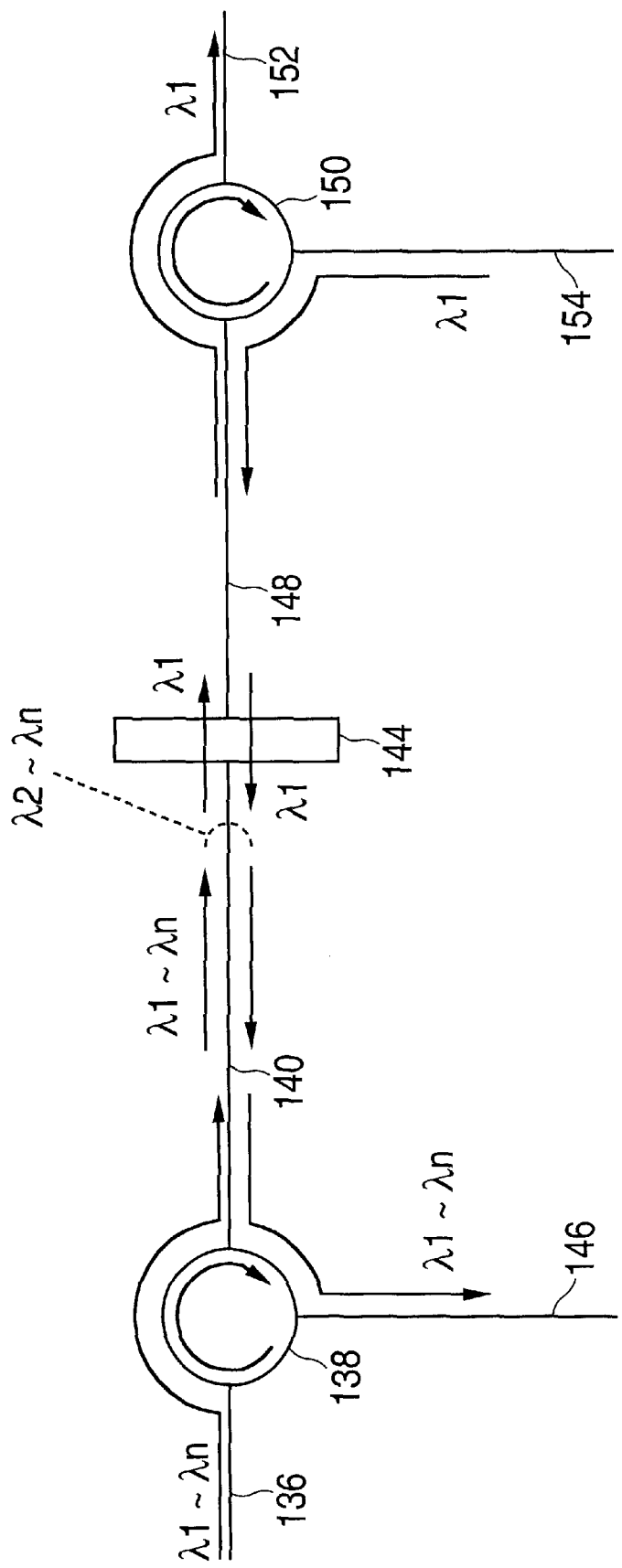
FIG. 3 is a schematic diagram of a prior-art optical add/drop multiplexer utilizing conventional optical circulators together with an optical bandpass filter.
Figure 4B:
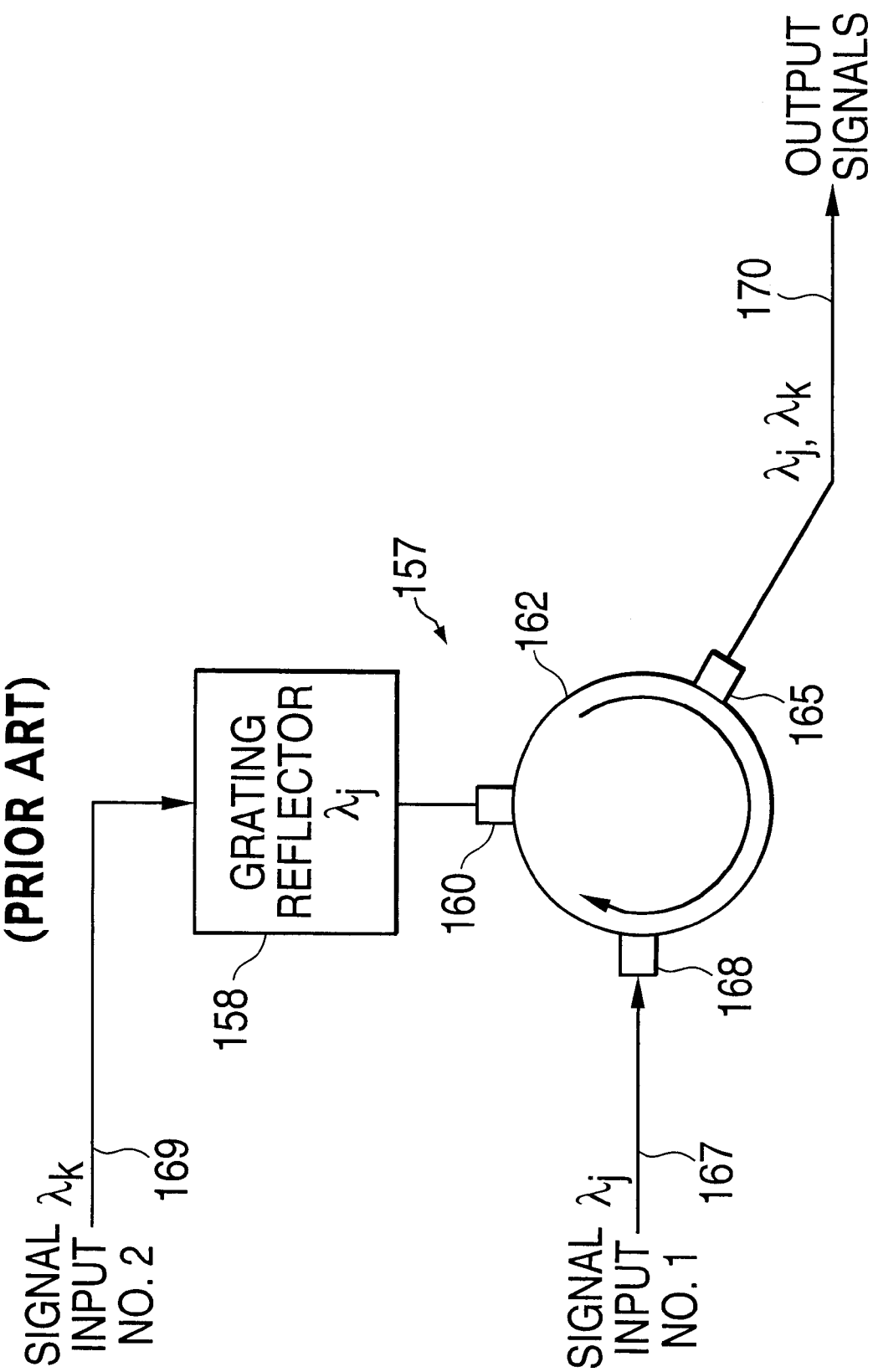
Figure 5:
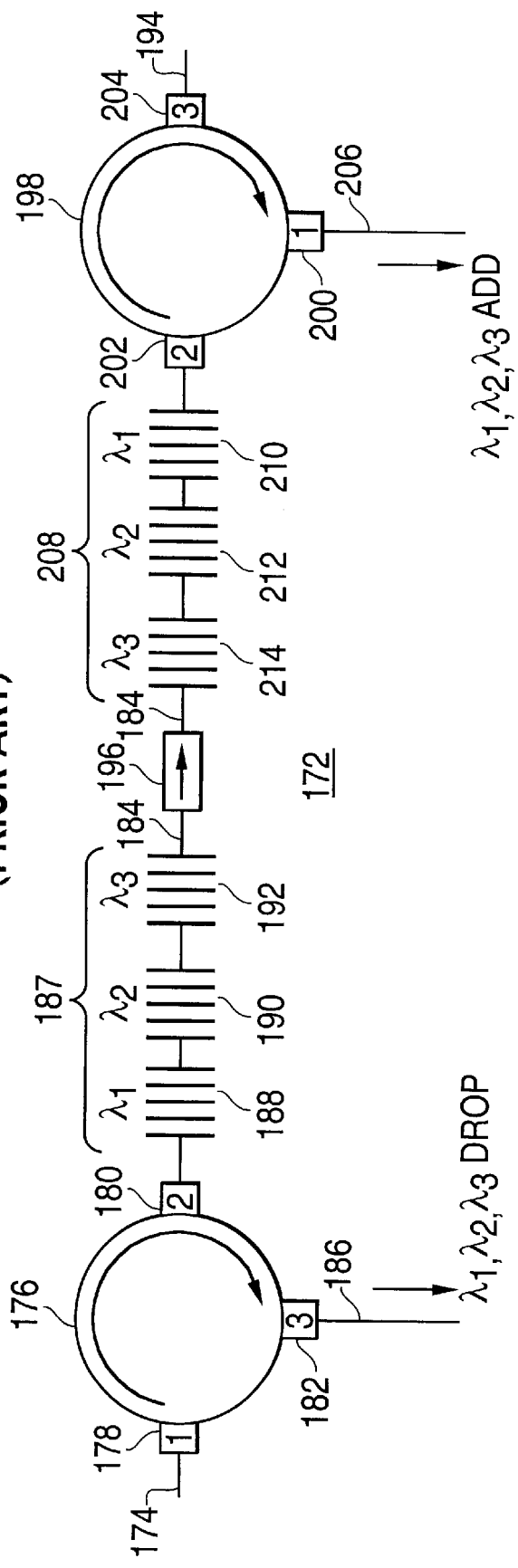
FIG. 5 is a schematic diagram of a prior-art optical add/drop multiplexer utilizing conventional optical circulators together with sequentially arranged fiber Bragg gratings and an optical isolator.
Figure 6:
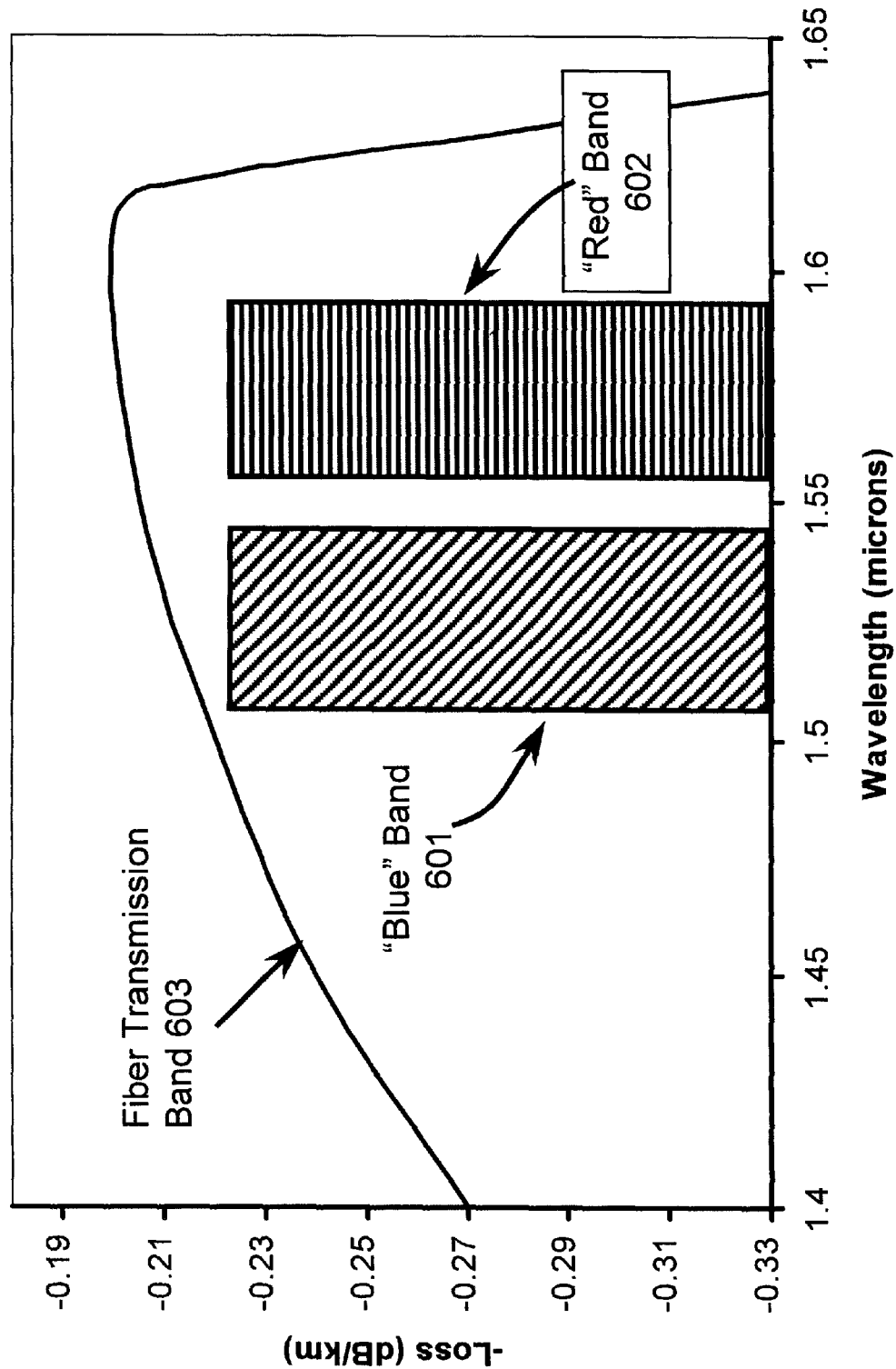
FIG. 6 is a graph of an example of the wavelength constitution of eastbound and westbound bands in a band bi-directional optical communication system.
Figure 7:
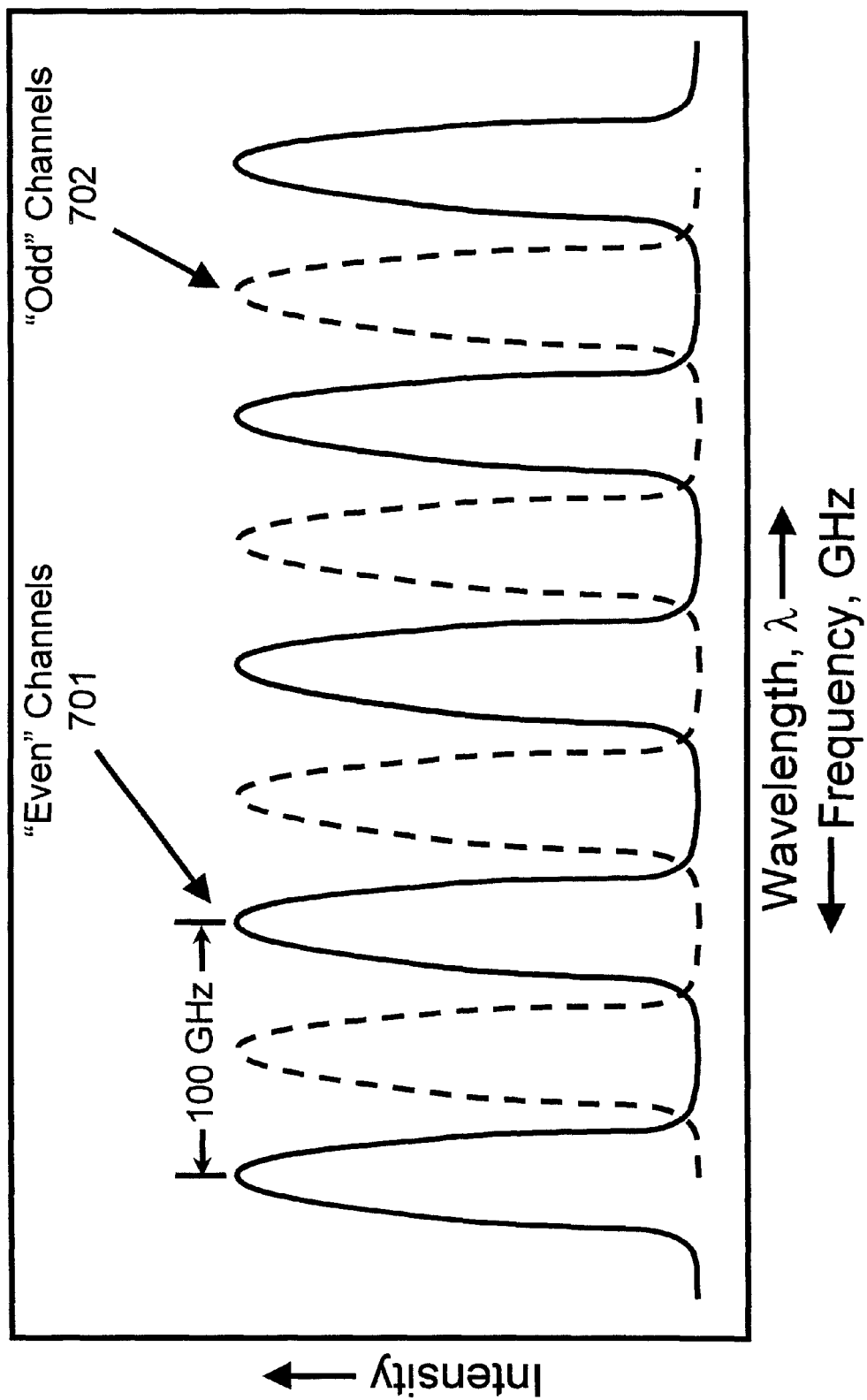
FIG. 7 is a graph of an example of the wavelength constitution of eastbound and westbound channels in an interleaved bi-directional optical communication system.

In the description of the present invention, it is to be noted that like parts are designated by like reference numerals throughout in the accompanying drawings.

As used in this document, the terms "reciprocal optical rotator" or equivalently "reversible optical rotator" or "reciprocally rotating optical element" refer to optical components having the property such that the direction of rotation about the axis of light propagation, either clockwise (CW) or counter-clockwise (CCW), of the plane of polarization of linearly polarized light propagated therethrough is always the same when viewed facing the rotator towards the side at which the linearly polarized light beam enters the component. Conversely, the terms "non-reciprocal optical rotator" or equivalently "non-reversible optical rotator" or "non reciprocally rotating optical element" refer to optical components having the property such that the direction of rotation about the axis of light propagation, either clockwise (CW) or counter-clockwise (CCW), of the plane of polarization of linearly polarized light propagated therethrough is always the same when viewed facing the rotator from a fixed reference point in a fixed direction, regardless of the propagation direction of the light ray through the element. An example of a reciprocal optical rotator is a half-wave plate. An example of a non-reciprocal optical rotator is a Faraday rotator.

The first embodiment of the bi-directional optical circulator of the present invention is explained with reference to FIGS. 8–10.

Figure 8:
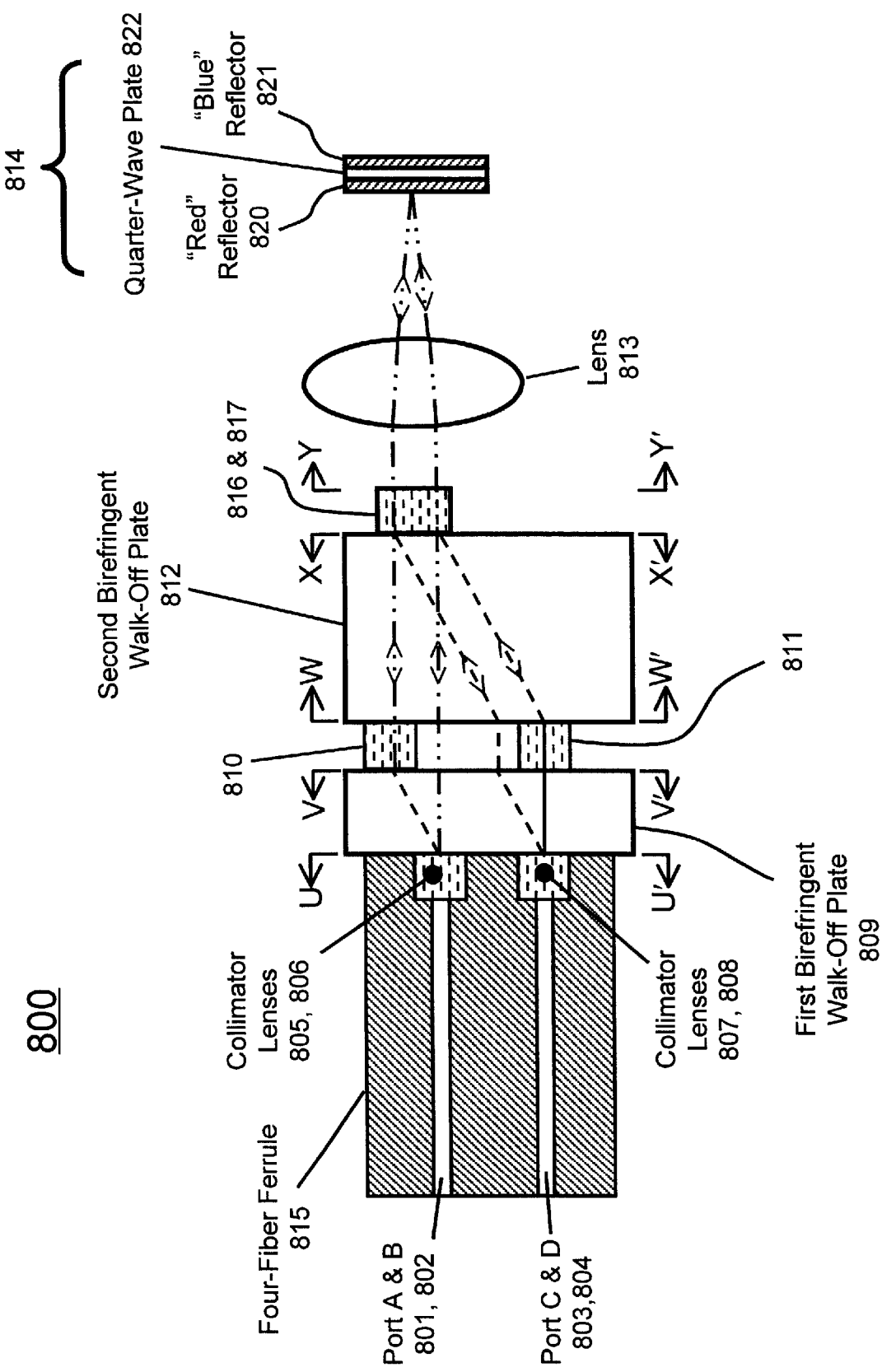
FIG. 8 is a side view of a first embodiment of the bi-directional circulator of the present invention comprising a band bi-directional optical circulator.

FIG. 8 shows a side view of a first embodiment of the bi-directional optical circulator of the present invention comprising a band bi-directional optical circulator 800. In the first embodiment, circulator 800, shown in FIG. 8, reference numeral 815 is a four fiber ferrule and reference numerals 801, 802, 803 and 804 are four optical ports contained within or by the ferrule 815. Preferably, such optical ports comprise optical fibers although they may comprise any type or combination of types of optical inputting and outputting device, such as windows.

Figure 9:
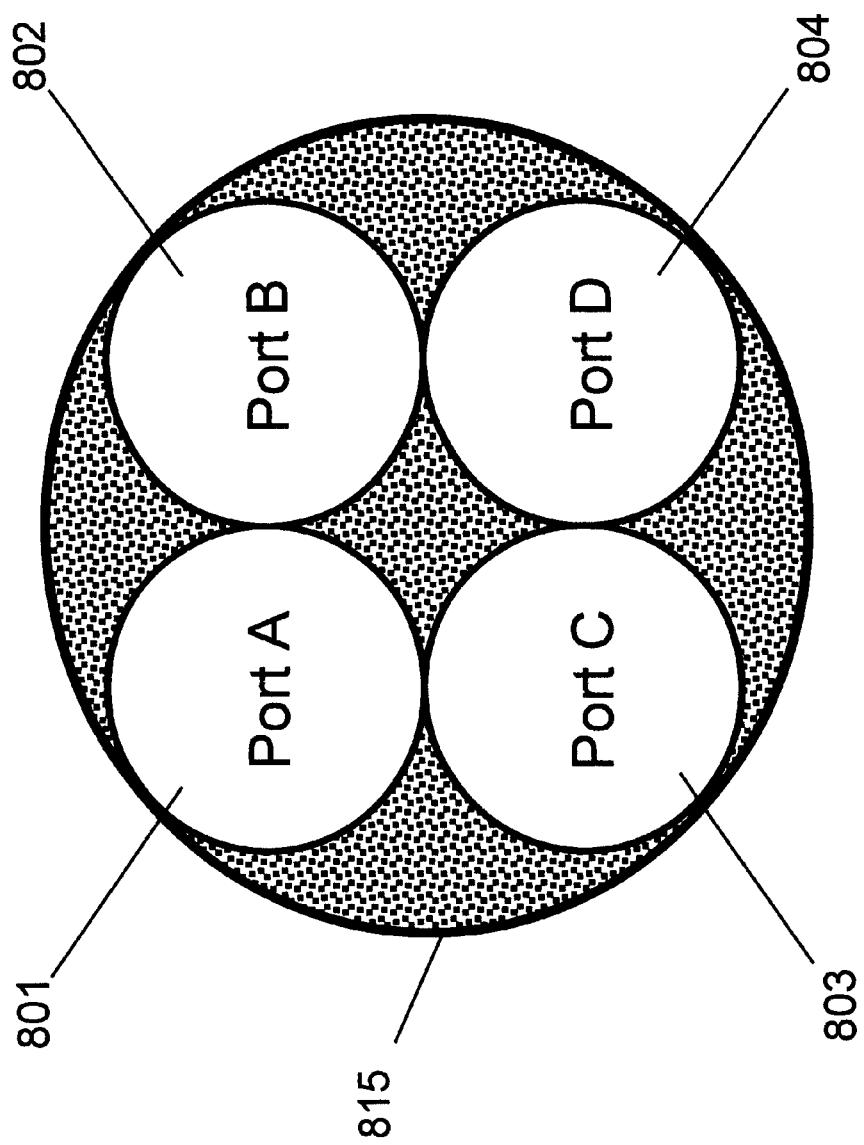
FIG. 9 is an end view of the fiber configuration of the input and output fibers of the circulator of the present invention.

FIG. 9 shows an end view of the configuration of the four ports—Port A 801, Port B 802, Port C 803 and Port D 804—as viewed from the left side of the device of FIG. 8. As also shown in FIG. 8, four collimator lenses, reference numerals 805, 806, 807 and 808, are incorporated into the end of ferrule 815 such that each collimator receives light from and directs light to exactly one of the ports, specifically Port A 801, B 802, C 803 and D 804, respectively. Disposed adjacent to the end of ferrule 815 is a first birefringent walk-off plate 809 which has the property of separating any signal light ray emanating from any of the fibers 801, 802, 803 or 804 into two physically separated linearly polarized sub-signal rays—one innermost and one outermost sub-signal ray. This separation of signals into sub-signals is accomplished by deflection or offset of the path of one—the e-ray—of each pair of sub-signals in a first direction perpendicular to the circulator main axis. Because four fibers or ports are contained within ferrule 815, eight separate sub-signals are so defined and are comprised of four outermost and four innermost sub-signals. The outermost and innermost sub-signals from both Port A 801 and Port B 802 comprise e-rays and o-rays, respectively, in their traverse through birefringent plate 809. Conversely, the outermost and innermost sub-signals from both Port C 803 and Port D 804 comprise o-rays and e-rays, respectively, in their traverse through birefringent plate 809.

Disposed adjacent to the first birefringent plate 809 and on the side of plate 809 opposite to ferrule 815 are both a first and a second reciprocally rotating optical element, 810 and 811, respectively. Reciprocally rotating optical element 810 is disposed so as to intercept only the two outermost sub-signals arising from Port A 801 and Port B 802. Likewise, reciprocally rotating optical element 811 is disposed so as to intercept only the two outermost sub-signals arising from Port C 803 and Port D 804.

A second birefringent walk-off plate 812 is disposed adjacent to the two reciprocally rotating optical elements 810 and 811 on the side opposite to the first birefringent plate 809. The thickness and optical orientation of birefringent plate 812 is designed so as to give an offset in the first direction of any of the e-rays propagating therethrough by a distance equivalent to the common center-to-center inter-port separation distance.

A pair of 45° optical polarization rotation elements—a reciprocally rotating optical element 816 and a non-reciprocally rotating optical element 817—are disposed to the side of the second birefringent walk-off plate 812 opposite to the elements 810 and 811. Preferably, the reciprocally rotating optical element 816 and non-reciprocally rotating optical element 817 comprise a half-wave plate and a Faraday rotator, respectively. The reciprocally rotating optical element 816 is disposed so as to intercept all and only those sub-signal light rays either emanating from or destined for Port A 801 and Port C 803. The polarization plane direction of linearly polarized light of sub-signals propagating through reciprocally rotating optical element 816 is reversibly rotated by 45° in the clockwise (CW) direction. The non-reciprocally rotating optical element 817 is disposed so as to intercept all and only those sub-signal light rays either emanating from or destined for Port B 802 and Port D 804. The polarization plane direction of linearly polarized light of sub-signals propagating through non-reciprocally rotating optical element 817 is non-reversibly rotated by 45° in the counter-clockwise (CCW) direction as viewed from a reference point at the left side of the apparatus of FIG. 8. As used in this specification, the terms 'emanating from' and 'destined for' refer to light or signal rays propagating left-to-right and right-to-left, respectively, in the apparatus of FIG. 8, or similar.

A lens or lens assembly 813 is disposed to the side of rotation elements 816 and 817 opposite to the second birefringent walk-off plate 812. Finally, a mirror and waveplate assembly 814 is disposed at the focal point of lens 813 opposite to the rotation elements 816 and 817. The mirror/ waveplate assembly 814 is comprised of three elements-a red reflector (mirror) 820 on the side facing the lens 813, a blue reflector (mirror) 821 on the side away from the lens 813 and a λ/4 (quarter-wave) plate 822 between the red reflector and the blue reflector. The red reflector 820 is designed so as to reflect signals comprising wavelengths of the red band while remaining transparent for signals comprising wavelengths of the blue band.

Figure 10:
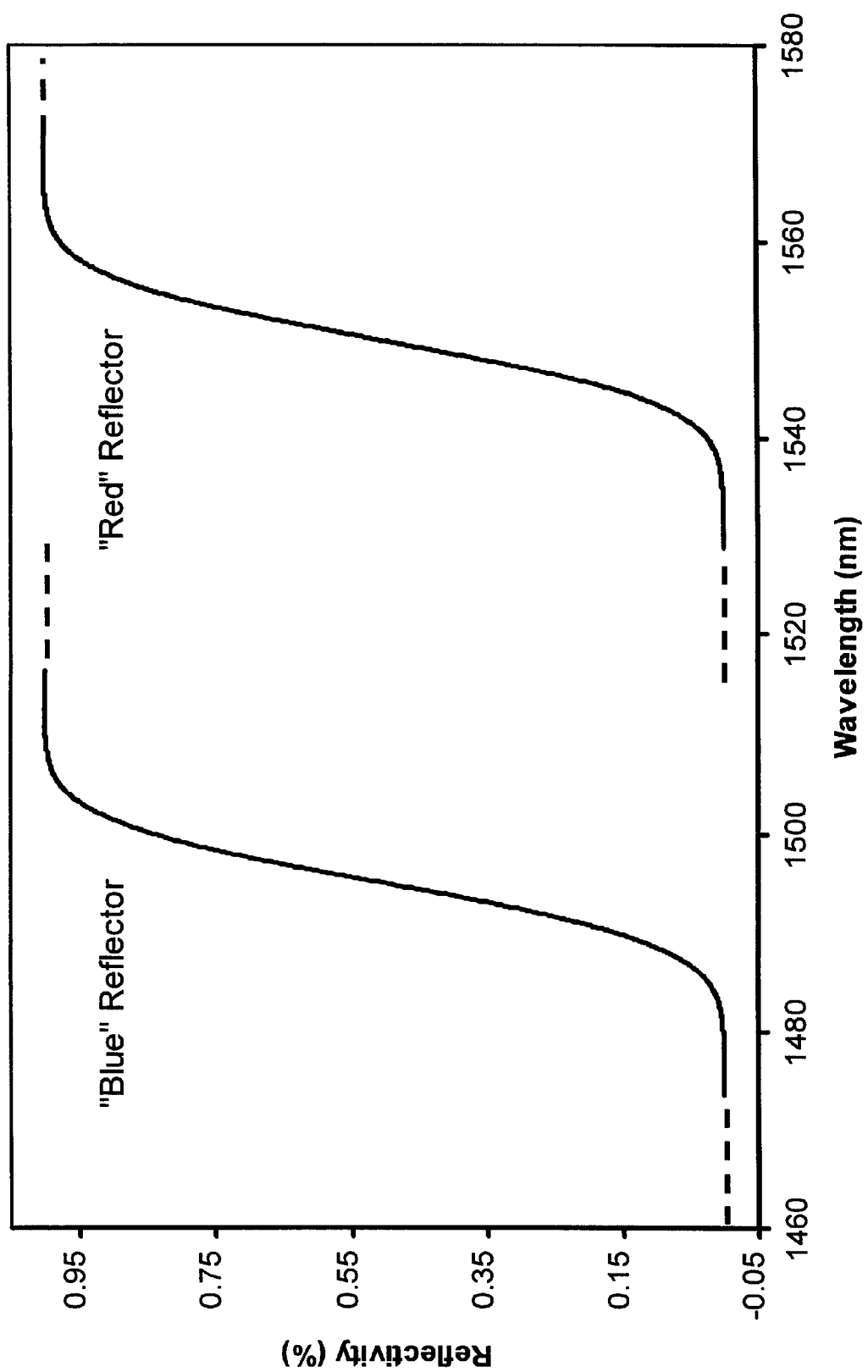
FIG. 10 is a graph of the preferred reflectivity variation with wavelength of both the "red" and "blue" reflectors of the first embodiment of the present invention.

Hypothetical, idealized reflectivity curves of these two reflective elements (i.e., the "blue" reflector and the "red" reflector) are illustrated in FIG. 10. The mirror/waveplate assembly 814 reflects all signals. However, relative to signals comprising the red band, those signals comprising the blue band must make an additional set of two passes through the quarter-wave plate 822. Therefore, the linearly polarized light comprising signals comprising the blue band travels further than the linearly polarized light comprising signals comprising the red band and therefore experiences an additional 90-degree rotation of its polarization.

Figure 11:
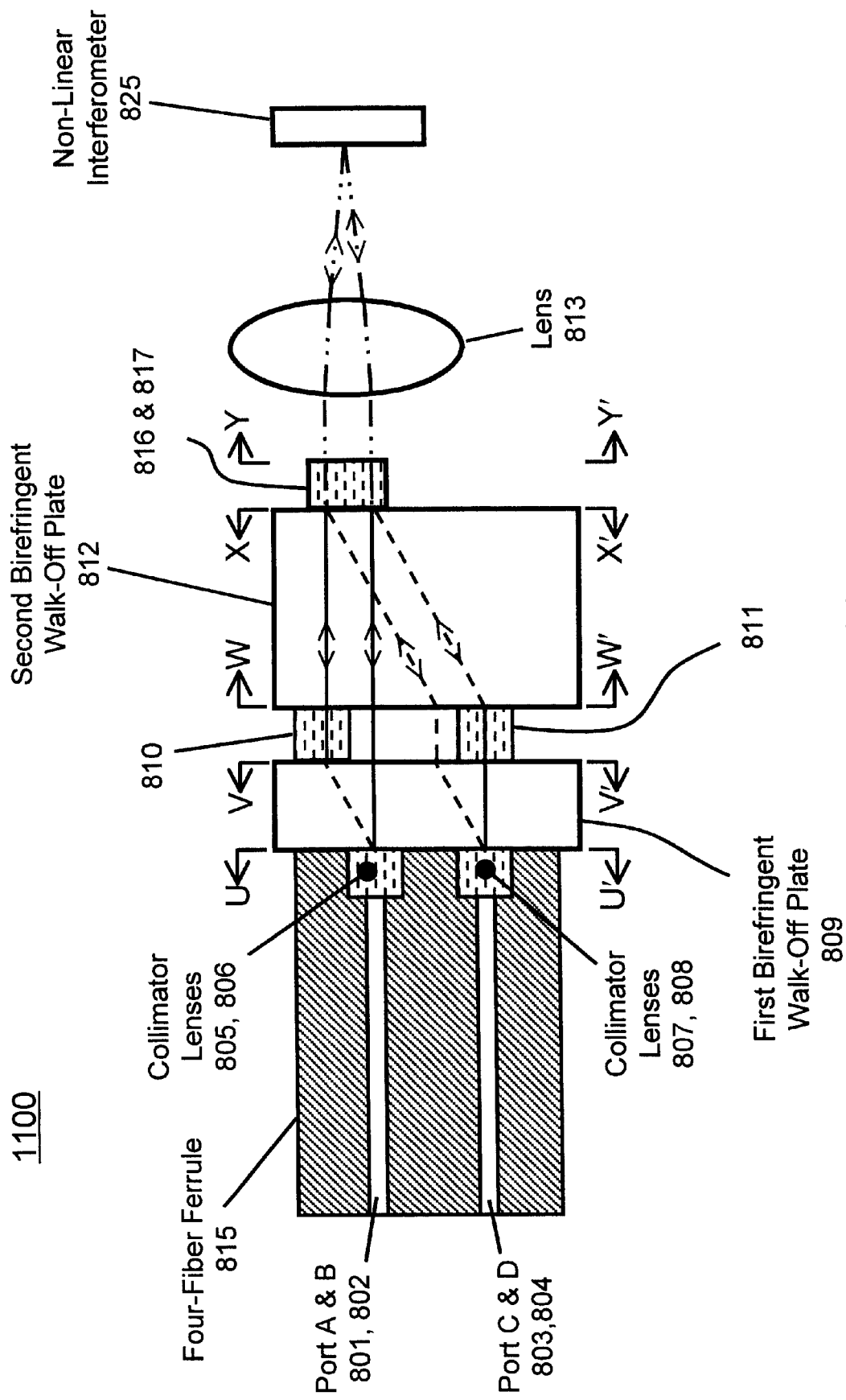
FIG. 11 is a side view of a second embodiment of the bi-directional circulator of the present invention comprising an interleaved bi-directional optical circulator.

FIG. 11 shows a side view of a second embodiment of the circulator of the present invention comprising an interleaved bi-directional optical circulator. In the interleaved bi-directional optical circulator 1100, shown in FIG. 11, all elements are identical to those of the first embodiment, circulator 800, except that the mirror/waveplate assembly 814 of the latter is replaced by a non-linear interferometer 825. All elements that are common between the circulator 800 and the circulator 1100 are denoted by similar reference numerals in both FIG. 8 and FIG. 11. The non-linear interferometer 825 shown in FIG. 11 is disclosed in co-pending U.S. Patent Applications entitled "Nonlinear Interferometer for Fiber Optic Wavelength Division Multiplexer Utilizing a Phase Differential Method of Wavelength Separation" (Ser. No. 09/247,253, filed Feb. 10, 1999) and "Dense Wavelength Division Multiplexer Utilizing an Asymmetric Pass Band Interferometer" (Ser. No. 09/388, 350, filed Sep. 1, 1999). Any signal light ray impinging upon non-linear interferometer 825 will be entirely reflected as shown in FIG. 11. However, the operation of the non-linear interferometer is such that linearly polarized light having a wavelength corresponding to one of a first set of channels (for instance, even-numbered channels) will be reflected with a 90° rotation of its plane of polarization whereas linearly polarized light having a wavelength corresponding to one of a second set of channels interleaved with the first set of channels (for instance odd-numbered channels) will be reflected without a change in polarization.

Figure 12:
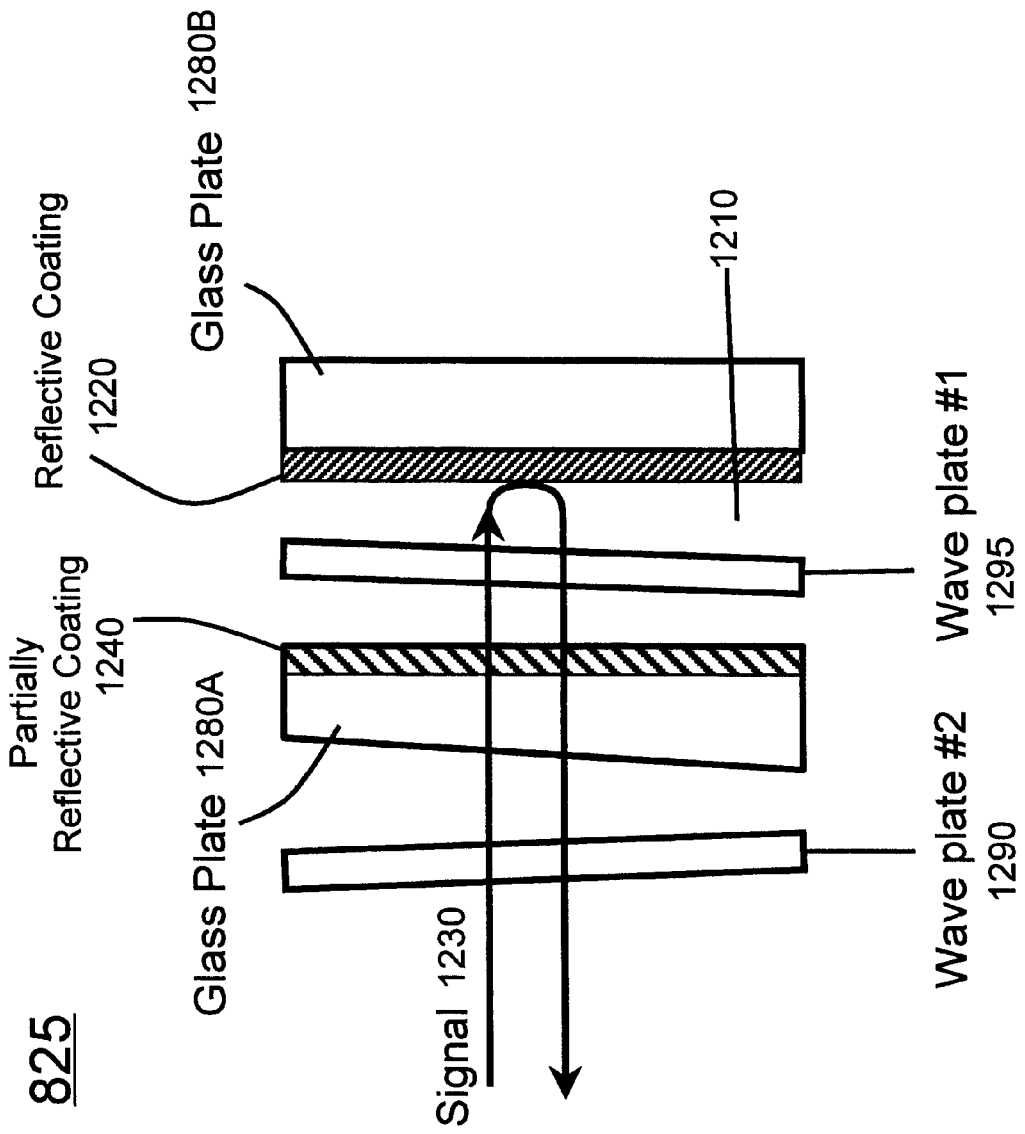
FIG. 12 is a diagram of a preferred embodiment of a non-linear interferometer for use within the interleaved bi-directional optical circulator of the present invention.
Figure 13:
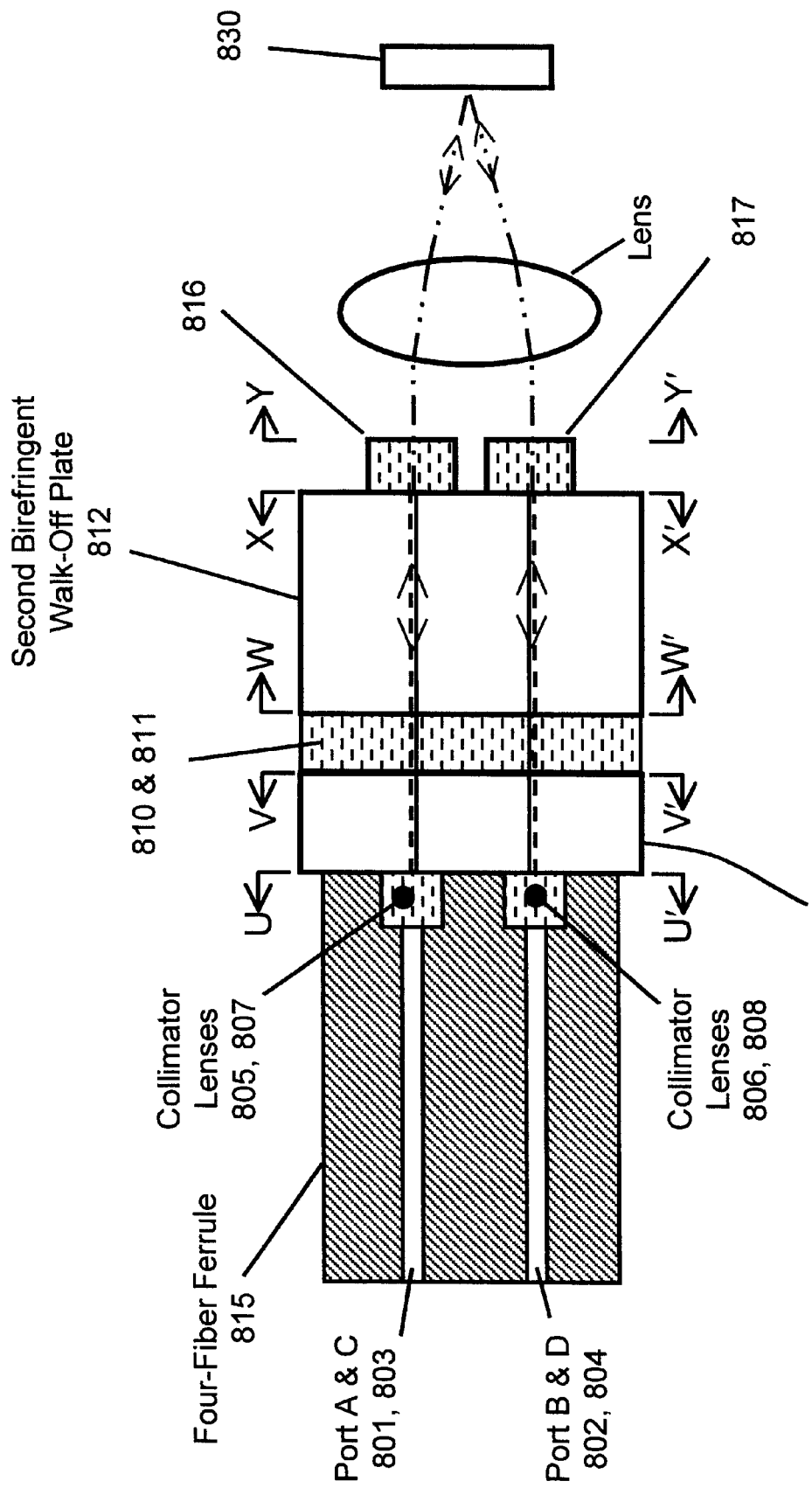
FIG. 13 is a top view of either of the first two embodiments of the bi-directional circulator of the present invention.

FIG. 12 illustrates a detailed cross-sectional view of the preferred embodiment of the non-linear interferometer 825 of the interleaved bi-directional circulator 1100. The non-linear interferometer 825 shown in FIG. 13 is disclosed in a co-pending U.S. Patent Application entitled "Nonlinear Interferometer for Fiber Optic Wavelength Division Multiplexers Utilizing a Phase Differential Method of Wavelength Separation" and "Dense Wavelength Division Multiplexer Utilizing an Asymmetric Pass Band Interferometer". The non-linear interferometer 825 is comprised of a first (or front) glass plate 1280A whose second (or rear) surface hosts a partially reflective coating 1240, a second (or rear) glass plate 1280B whose first (or front) surface hosts a reflective coating 1220, a cavity 1210 between the two plates, a first waveplate 1295 disposed within the cavity 1210, and a second waveplate 1290 adjacent to the front surface of glass plate 1280A. Any signal light ray 1230 impinging upon non-linear interferometer 825 will be entirely reflected as shown in FIG. 12. Furthermore, the operation of the interferometer is such that linearly polarized light of signal 1230 having a wavelength corresponding to each channel of the first set of channels (for instance, even-numbered channels) will be reflected with a 90° rotation of its plane of polarization whereas linearly polarized light of signal 1230 having a wavelength corresponding to each channel of the second set of channels interleaved with the first set (for instance odd-numbered channels) will be reflected without change in polarization. Preferably, the reflectivity of reflective coating 1220 is 100%. The reflectivity of the partially reflective coating 1240 and the phase retardation of waveplate #1 1295 and of waveplate #2 1290 are variable and are chosen so as to control the output properties of signal 1230 after reflection. For instance, for output signal 1230 to be comprised of equally spaced, equal-width odd and even channels, the partially reflective coating 1240 preferentially has a reflectivity of 18.5% and waveplate #1 and waveplate #2 comprise a λ/4 (quarter-wave) plate and a λ/8 (eighth-wave) plate, respectively.

FIG. 13 shows a top view of either of the first or second embodiments of the bi-directional optical circulator (800 or 1100, respectively) of the present invention. In FIG. 13, reference numeral 830 represents a reflective element that may correspond to either the mirror/waveplate assembly 814 or the non-linear interferometer 825. If element 830 is taken as the mirror/waveplate assembly 814, then FIG. 13 corresponds to a top view of the band bi-directional circulator 800. If, on the other hand, element 830 is understood to be the non-linear interferometer 825, then FIG. 13 corresponds to a top view of the interleaved bi-directional circulator 1100. FIG. 13 shows the disposition of the reciprocally rotating optical element 816 and the non-reciprocally rotating optical element 817. As illustrated in FIG. 13, reciprocally rotating optical element 816 is disposed on the same side of the apparatus 1100 as is Port A 801 and Port C 803 and thus intercepts all and only sub-signal light emanating from or destined for these two optical ports. Likewise, non-reciprocally rotating optical element 817 is disposed on the same side of the apparatus 1100 as is Port B 802 and Port D 804 and thus intercepts all and only sub-signal light emanating from or destined for these latter two optical ports.

Figure 14:
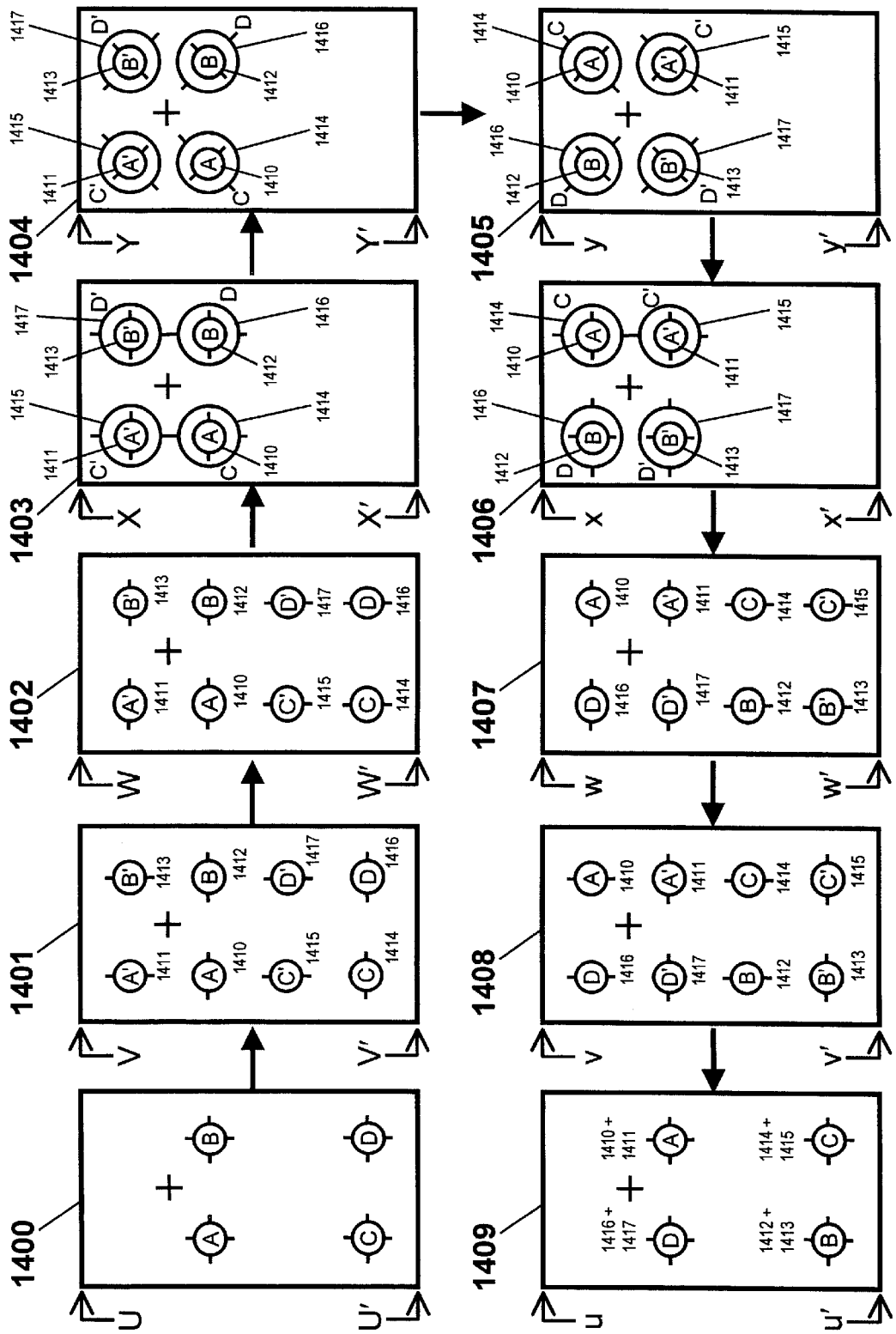
FIG. 14 is a sequence of cross sections through the first (second) embodiment of the circulator of the present invention illustrating the locations and polarization states of fiber images created by the light of signals and sub-signals of the red band (odd channels).
Figure 15:
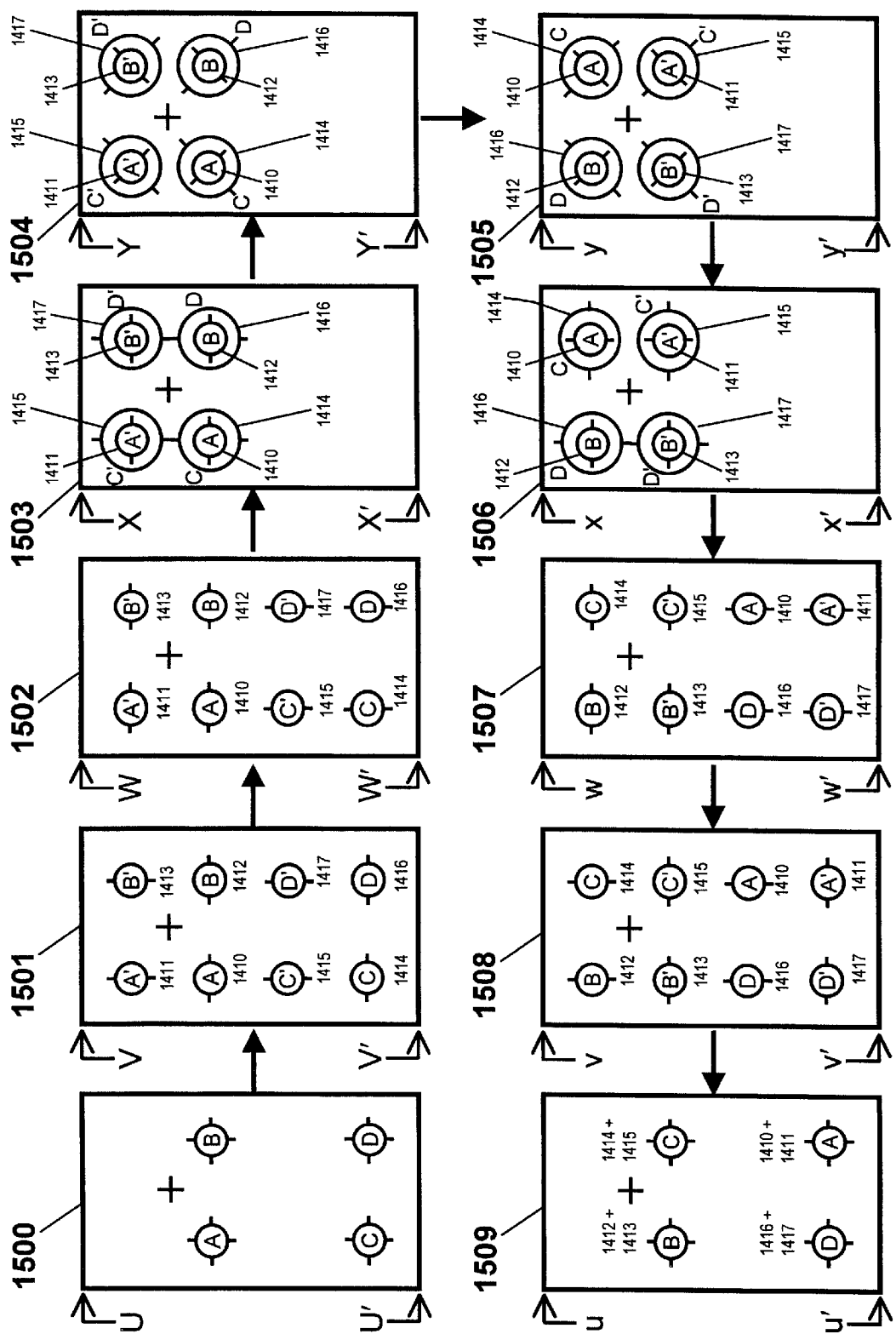
FIG. 15 is a sequence of cross sections through the first (second) embodiment of the circulator of the present invention illustrating the locations and polarization states of fiber images created by the light of signals and sub-signals of the blue band (even channels).

The operation of either of the embodiments, bi-directional circulator 800 or bi-directional circulator 1100, is now described with reference to FIG. 14 and FIG. 15. FIG. 14 is a sequence of cross sections through either the circulator 800 or the circulator 1100 illustrating the locations and polarization states of fiber images created within the respective circulator by the light of signals and sub-signals of the red band or of odd channels. FIG. 15 is a similar set of cross sections for light of signals and sub-signals of the blue band or of even channels. These cross-sections are all drawn as viewed from the left side of the device of FIG. 8 or FIG. 11 and are taken at the labeled cross-sectional planes U–U', V–V', W–W', X–X', and Y–Y' whose locations are noted on FIG. 8 and on FIG. 11. In the cross sections of FIG. 14 and FIG. 15, the centers of labeled circles denote the positions of fiber images created by sub-signals propagating through circulator 800 or circulator 1100 as projected onto the respective cross section. Concentric circles of different sizes indicate overlapping or co-propagating sub-signals. The sizes of these circles in the diagrams of FIG. 14 and FIG. 15 have no physical significance. A set of two opposed barbs on any of the circles in FIG. 14 and FIG. 15 indicate the orientation of the polarization plane of the linearly polarized sub-signal represented by the circle. Two sets of opposed barbs represent a signal comprised of unpolarized or randomly polarized light. As will be evident from the discussion following, all sub-signal light is reflected by the mirror/waveplate assembly 814 of circulator 800 or the non-linear interferometer 825 of circulator 1100 so as to make one complete forward and one complete return traverse through the respective circulator. Therefore, each cross-section of sub-signal fiber images is shown twice, one time labeled with capital letters to denote forward propagation (upper rows of FIG. 14 and FIG. 15) and one time labeled with small letters (lower rows of FIG. 14 and FIG. 15) to denote reverse propagation. Heavy arrows indicate the sequence of images produced by light signals propagating through the respective circulator.

The paths of forward propagating signals and sub-signals through either circulator 800 or circulator 1100 are now described with reference to FIG. 14 and FIG. 15. It is to be noted that this forward propagation sequence, represented by the sequence of uppermost cross sections in either FIG. 14 or FIG. 15, is the same in both circulator 800 and circulator 1100, and is therefore only described once for FIG. 14. As seen in cross section U–U' 1400 of FIG. 14 and U–U' 1500 of FIG. 15, signals emanating from each of the four ports or fibers—Port A 801, Port B 802, Port C 803 and Port D 804—are comprised of unpolarized or of randomly polarized light. After emanating from one of the four fibers and passing through one of the collimator lenses 805–808, signal light enters and passes through the first birefringent plate 809 which separates it into physically separated horizontally and vertically polarized sub-signal components. In both FIG. 14 and FIG. 15, sub-signal A 1410, sub-signal B 1412, sub-signal C 1414 and sub-signal D 1416 are the sub-signals having horizontally polarized light and emanating, respectively, from Port A 801, Port B 802, Port C 803 and Port D 804. Likewise, sub-signal A' 1411, sub-signal B' 1413, sub-signal C' 1415 and sub-signal D' 1417 are the sub-signals having vertically polarized light and emanating, respectively, from Port A 801, Port B 802, Port C 803 and Port D 804.

The four sub-signals comprising vertically polarized light, A' 1411, B' 1413, C' 1415 and D' 1417, all comprise e-rays during their traverse through the first birefringent plate 809. Therefore, as shown in cross-section V–V' 1401 in FIG. 14 or V–V' 1501 in FIG. 15, sub-signals 1411, 1413, 1415 and 1417 are all shifted in the first direction with respect to the corresponding sub-signals with horizontally polarized light, 1410, 1412, 1414 and 1416, respectively. After passing through the first birefringent plate 809, the four outermost sub-signals A' 1411, B' 1413, C 1414 and D 1416 pass through one of the two 90° reciprocally rotating optical elements, 810 and 811, and therefore their linearly polarized light rays incur 90° rotations of the directions of their polarization planes. Thus, as shown in cross section W–W' 1402 of FIG. 14 or W–W' 1502 of FIG. 15, the polarization plane directions of sub-signals A' 1411 and B' 1413 change from vertical to horizontal whilst those of sub-signals C 1414 and D 1416 change from horizontal to vertical.

After passing the positions of the reciprocally rotating optical elements 810 and 811, all sub-signals enter and pass through the second birefringent walk-off plate 812. The four sub-signals with vertically polarized light, C' 1415, D' 1417, C 1414 and D 1416, all traverse birefringent plate 812 as e-rays and are thus deflected or offset in the first direction. At the same time, the four sub-signals with horizontally polarized light, A' 1411, B' 1413, A 1410 and B 1412 traverse birefringent plate 812 as undeflected o-rays. The thickness and optical orientation of birefringent plate 812 are disposed such that the lateral offset of e-rays upon traversing therethrough is exactly equal to common center-to-center separation distance between any pair of adjacent optical ports. For this reason, after passing through birefringent plate 812, the images of the two sub-signals C' 1415 and C 1414 become superimposed on those of the sub-signals A' 1411 and A 1410, respectively. In the same manner, the images of the two sub-signals D' 1417 and D 1416 become superimposed on those of the sub-signals B' 1413 and B 1412, respectively. Furthermore, the two sub-signals comprising each pair of superimposed sub-signals each follow identical paths until later separated during their return paths. This superimposition of sub-signals is shown in cross section X–X' 1403 of FIG. 14 and X–X' 1503 of FIG. 15.

After exiting plate 812, each pair of superimposed sub-signals, A' 1411 and C' 1415, A 1410 and C 1414, B' 1413 and D' 1417, and B 1412 and D 1416 each travels along its own path with the two sub-signals comprising each pair remaining superimposed, one upon the other. The two pairs of sub-signals A' 1411 and C' 1415 and A 1410 and C 1414, which comprise all and only that light originating from Port A and Port C, pass through the reciprocally rotating optical element 816. In passing through reciprocally rotating optical element 816, the polarization plane directions of light comprising these four sub-signals are all rotated by an angle of 45° CW around their propagation directions. The two pairs of sub-signals B' 1413 and D' 1417 and B 1412 and D 1416, which comprise all and only that light originating from Port B and Port D, pass through the non-reciprocally rotating optical element 817. In passing through non-reciprocally rotating optical element 817, the polarization plane directions of light comprising these four sub-signals are all rotated by an angle of 45° CCW around their propagation directions. Barbs in cross section Y–Y' 1404 (FIG. 14) and Y–Y' 1504 (FIG. 15) show the orientations of the polarization planes of light of the various sub-signals after exiting elements 816 and 817.

The four pairs of sub-signals travel to and through the lens 813, which brings them all to a common focal point at either the mirror/waveplate assembly 814 in circulator 800 or the non-linear interferometer 825 in circulator 1100. Either the mirror/waveplate assembly 814 or the non-linear interferometer 825 immediately reflects all sub-signals back along their return paths through circulator 800 or 1100, respectively. Because the focal point of the lens 813 is on the plane of mirror/waveplate assembly 814 or non-linear interferometer 825, the four pairs of sub-signals immediately diverge from one another after being reflected and pass through lens 813 a second time in the reverse direction. The diverging pathways of the four pairs of returning sub-signals are set parallel to one another once again by lens 813. Thus, these four pairs of sub-signals are directed back towards reciprocally rotating optical element 816 and non-reciprocally rotating optical element 817 along pathways which, between these two rotation elements and lens 813, exactly superimpose upon those of forward propagating pairs of sub-signals.

The reflection at either the mirror/waveplate assembly 814 or the non-linear interferometer 825 causes different effects upon the polarization plane directions of these returning sub-signal lights, depending upon whether the sub-signals comprise the red band (odd channels) or the blue band (even channels). In circulator 800, light of the red sub-signal channels is immediately reflected by red reflector 820 and directed along its return path towards lens 813 without interacting with either the quarter-wave plate 822 or the blue reflector 821. Therefore, in circulator 800, sub-signal light of the red band is reflected from mirror/waveplate assembly 814 without a change in polarization. In circulator 1100, light of the odd sub-signal channels is similarly reflected without polarization change from the non-linear interferometer 825.

Sub-signals comprising light of the blue band traversing circulator 800 are entirely transmitted through the red reflector 820 and completely reflected by the blue reflector 821 as shown by the reflectivity curves in FIG. 10. These reflectivity characteristics cause the blue-band sub-signals to make two passes through the quarter-wave plate 822. The quarter-wave plate 822 is disposed such that sub-signal light of the blue band incurs a 90° rotation of its polarization plane direction upon passing twice therethrough. Thus, in circulator 800, sub-signal light of the blue band is reflected by mirror/waveplate assembly 814 towards lens 813 with a 90° polarization-plane rotation. Sub-signal light of the even channels is reflected from non-linear interferometer 825 with a similar 90° polarization-plane rotation in the circulator 1100.

The return light pathways and polarization states of sub-signal light of the red band (odd channels) and of the blue band (even channels) are illustrated in the lowermost sequence of cross sections in FIG. 14 and FIG. 15, respectively. Because of the reflectivity characteristics of mirror/waveplate assembly 814 in circulator 800 and non-linear interferometer 825 in circulator 1100, the polarization states of returning sub-signal light of the red band (odd channels) shown in FIG. 14 are different from those of returning sub-signal light of the blue band (even channels) shown in FIG. 15. That is, after reflection, the polarization plane direction of the light of each sub-signal A 1410, A' 1411, B 1412, B' 1413, C 1414, C' 1415, D 1416, and D' 1417 of the blue band or of the even channels is rotated by 90° with respect to the analogous sub-signal, with the same reference numeral, of the red-band or of the odd channels. The subsequent return pathways of signal lights of the red band (odd channels) and those of signal lights of the blue band (even channels) are identical to one another only through lens 813 and up to the point where these returning sub-signals encounter the second birefringent walk-off plate 812.

Cross sections y–y' 1405 of FIG. 14 and y–y' 1505 of FIG. 15 show the locations of the pairs of superimposed sub-signal images at their points of return entry into reciprocally rotating optical element 816 and non-reciprocally rotating optical element 817. The focusing and re-collimation of sub-signal images by lens 813 causes the inversion of image positions about the center of the lens as projected onto cross-section y–y' 1405 (FIG. 14) or y–y' 1505 (FIG. 15). This inversion causes interchange of the positions of opposing pairs of returning sub-signals projected onto cross-section y–y' 1405 (y–y' 1505) as compared to their respective positions during their forward traverse projected onto cross section Y–Y' 1404 (Y–Y' 1504). Thus, upon re-entry into either reciprocally rotating optical element 816 or non-reciprocally rotating optical element 817, as shown in cross-section y–y' 1405 and y–y' 1505, the location of the returning pair of sub-signal images B 1412 and D 1416 is the same as that of the forward propagating pair of sub-signals A' 1411 and C' 1415. Likewise, in cross-section y–y' 1405 and y–y' 1505, the locations of returning pairs of sub-signals A 1410 and C 1414, B' 1413 and D' 1417, and A' 1411 and C' 1415 are identical to those of forward propagating pairs of sub-signals B' 1413 and D' 1417, A 1410 and C 1414, and B 1412 and D 1416, respectively.

Because of the inversion properties of lens 813, each of the returning sub-signals within circulator 800 or circulator 1100 encounters the optical rotation element—either the reciprocally rotating optical element 816 or the non-reciprocally rotating optical element 817—through which it did not pass during its forward path through the respective circulator. Thus, after passing through lens 813 on their return traverse through circulator 800 or circulator 1100, the sub-signals B 1412, B' 1413, D 1416 and D' 1417 all pass through reciprocally rotating optical element 816 and thus their linearly polarized light rays incur 45° CW rotations of the directions of their polarization planes. Because reciprocally rotating optical element 816 is a reversible optical rotator and the sub-signal propagation in question is in the return direction, this rotation has an apparent CCW direction as viewed from the left side of the device of FIG. 8 or FIG. 11 and as indicated in both FIG. 14 and FIG. 15. The sub-signals A 1410, A' 1411, C 1414 and C' 1415 all pass through non-reciprocally rotating optical element 817 and thus their linearly polarized light rays incur 45° CCW rotations of the directions of their polarization planes after passing through lens 813 on their return traverse through circulator 800 or circulator 1100. Because non-reciprocally rotating optical element 817 is a non-reversible optical rotator, the rotation of the polarization planes of light of sub-signals passing therethrough is always in the CCW direction as viewed from the left side of the device of FIG. 8 or FIG. 11. The polarization state of each sub-signal after passing through either reciprocally rotating optical element 816 or non-reciprocally rotating optical element 817 in the return direction is therefore either horizontal or vertical as indicated in cross section x–x' 1406 of FIG. 14 and x–x' 1506 of FIG. 15.

During return passage through the second birefringent plate 812, the vertically polarized sub-signals pass therethrough as deflected e-rays whilst the horizontally polarized sub-signals pass therethrough as undeflected o-rays. For this reason, the two sub-signals comprising each pair of superimposed sub-signals become re-separated one from another upon passing through birefringent plate 812 a second time. When the wavelengths of the sub-signals in question comprise the red band or the odd channels, then, as shown in cross section x–x' 1406 of FIG. 14, the light rays of sub-signals B 1412, C 1414, B' 1413 and C' 1415 are vertically polarized and those of sub-signals D 1416, A 1410, D' 1417 and A' 1411 are horizontally polarized. Conversely, when the wavelengths of the sub-signals in question comprise the blue band or the even channels, then, as shown in cross section x–x' 1506 of FIG. 15, the light rays of sub-signals D 1416, A 1410, D' 1417 and A' 1411 are vertically polarized and those of sub-signals B 1412, C 1414, B' 1413 and C' 1415 are horizontally polarized. Thus, in the case of signals comprising wavelengths of the red band (odd channels), sub-signals B 1412, C 1414, B' 1413 and C' 1415 are deflected and, in the case of signals comprising wavelengths of the blue band (even channels), sub-signals A 1410, D 1416, A' 1411 and D' 1417 are deflected during the return traverse through second birefringent plate 812. The deflection of these sub-signals comprising vertically polarized light rays upon their second traverse through birefringent plate 812 is exactly equal and opposite to the deflection of the deflected sub-signals during their forward traverse through this plate. Therefore, the locations of the images of the various sub-signals after the return traverse of the sub-signals through birefringent plate 812 are as shown in cross section w–w' 1407 of FIG. 14 and w–w' 1507 of FIG. 15.

After exiting the second birefringent plate 812, the outermost returning sub-signals pass through one of the two 90° reciprocally rotating optical elements, 810 and 811, and therefore their linearly polarized light rays incur 90° rotations of the directions of their polarization planes. In the case of signals comprising wavelengths of the red band (odd channels), the polarization planes of light of sub-signals D 1416, A 1410, B' 1413 and C' 1415 are so rotated. In the case of signals comprising wavelengths of the blue band (even channels), the polarization planes of light of sub-signals B 1412, C 1414, D' 1417 and A' 1411 are so rotated. Thus, after passing the positions of the 90° reciprocally rotating optical elements, 810 and 811, in the return direction, the polarization plane directions of light of the various sub-signals are as shown in cross section v–v' 1408 of FIG. 14 and v–v' 1508 of FIG. 15.

Figure 16:
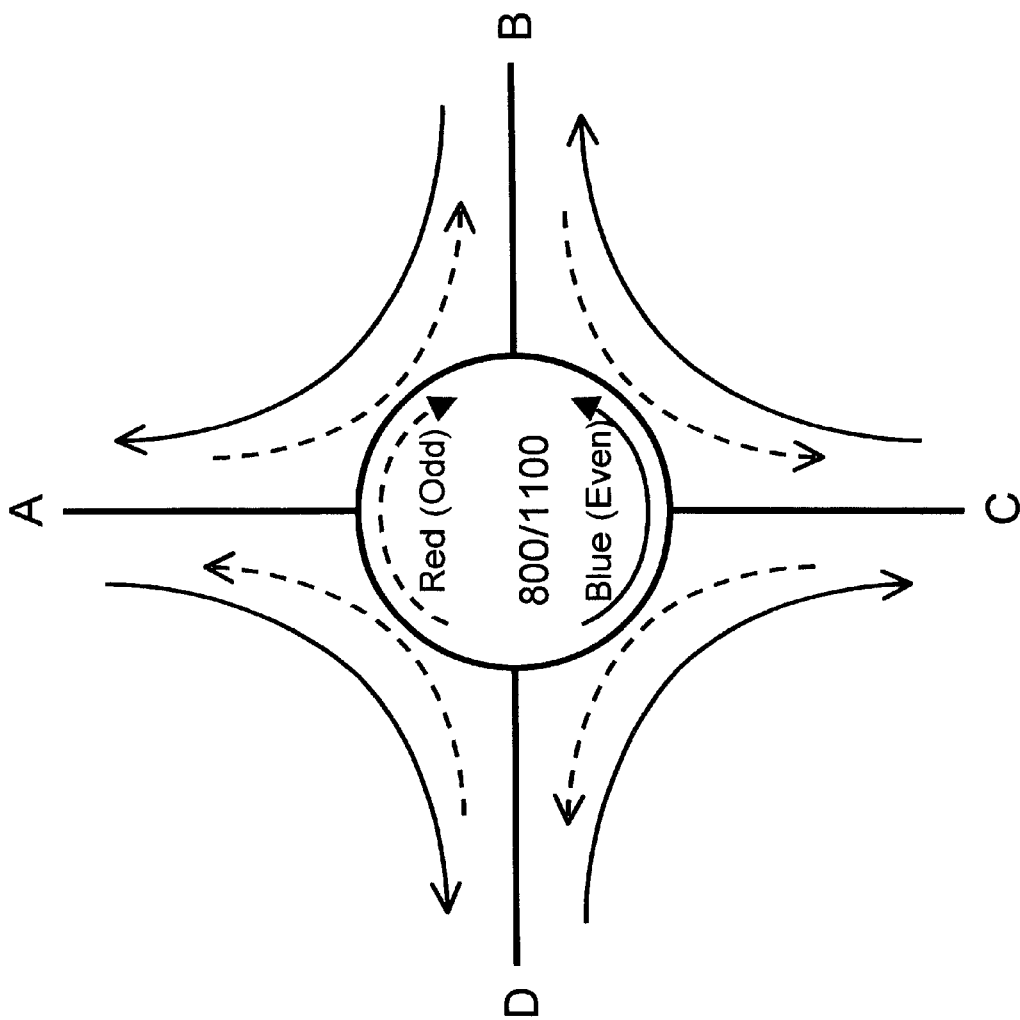
FIG. 16 is a schematic summary of the signal routing within either a band bi-directional or an interleaved bi-directional optical circulator.

Finally, all sub-signals enter the first birefringent walk-off plate 809 in the return direction. The vertically polarized sub-signals pass through plate 809 as deflected e-rays whilst the horizontally polarized sub-signals pass through plate 809 as undeflected e-rays. In all cases, the light of sub-signals A 1410, B 1412, C 1414 and D 1416 is vertically polarized and is so deflected whilst the light of sub-signals A' 1411, B' 1413 C' 1415 and D' 1417 is horizontally polarized and is not deflected. The deflection of sub-signals A 1410, B 1412, C 1414 and D 1416 during return passage through plate 809 is exactly equal and opposite to the deflection of sub-signals A' 1411, B' 1413, C' 1415 and D' 1417 during their forward passage through this plate. Therefore, in all cases, the vertically and horizontally polarized pairs of sub-signals A 1410 and A' 1411, B 1412 and B' 1413, C 1414 and C' 1415, and D 1416 and D' 1417 become recombined at the positions of the fiber collimator lenses 805–808. Each of the collimator lenses focuses the return-path signal impinging thereon into the immediately adjacent fiber or port. Therefore, for signals comprising the red band or odd channels, the recombined signals are located such that the signals originally from Port A, from Port B, from Port C and from Port D are directed into Port B, Port C, Port D and Port A, respectively, as shown in cross section u–u' 1409 of FIG. 14. Likewise, for signals comprising the blue band or even channels, the recombined signals are located such that the signals originally from Port A, from Port B, from Port C and from Port D are directed into Port D, Port A, Port B and Port C, respectively, as shown in cross section u–u' 1509 of FIG. 15. In this way, the circulator 800 and the circulator 1100 each functions as a bi-directional optical circulator. FIG. 16 summarizes the results of the operation of circulator 800 and circulator 1100 of the present invention, consistent with the foregoing disclosure, in which signals of the red band or odd channels entering the circulator 800/1100 from any of Ports A, B, C, or D circulate to the next logical port and are output therefrom, while signals of the blue band or even channels entering the circulator 800/1100 from any of Ports A, B, C, or D circulate to the preceding logical port and are output therefrom.

Figure 17A:
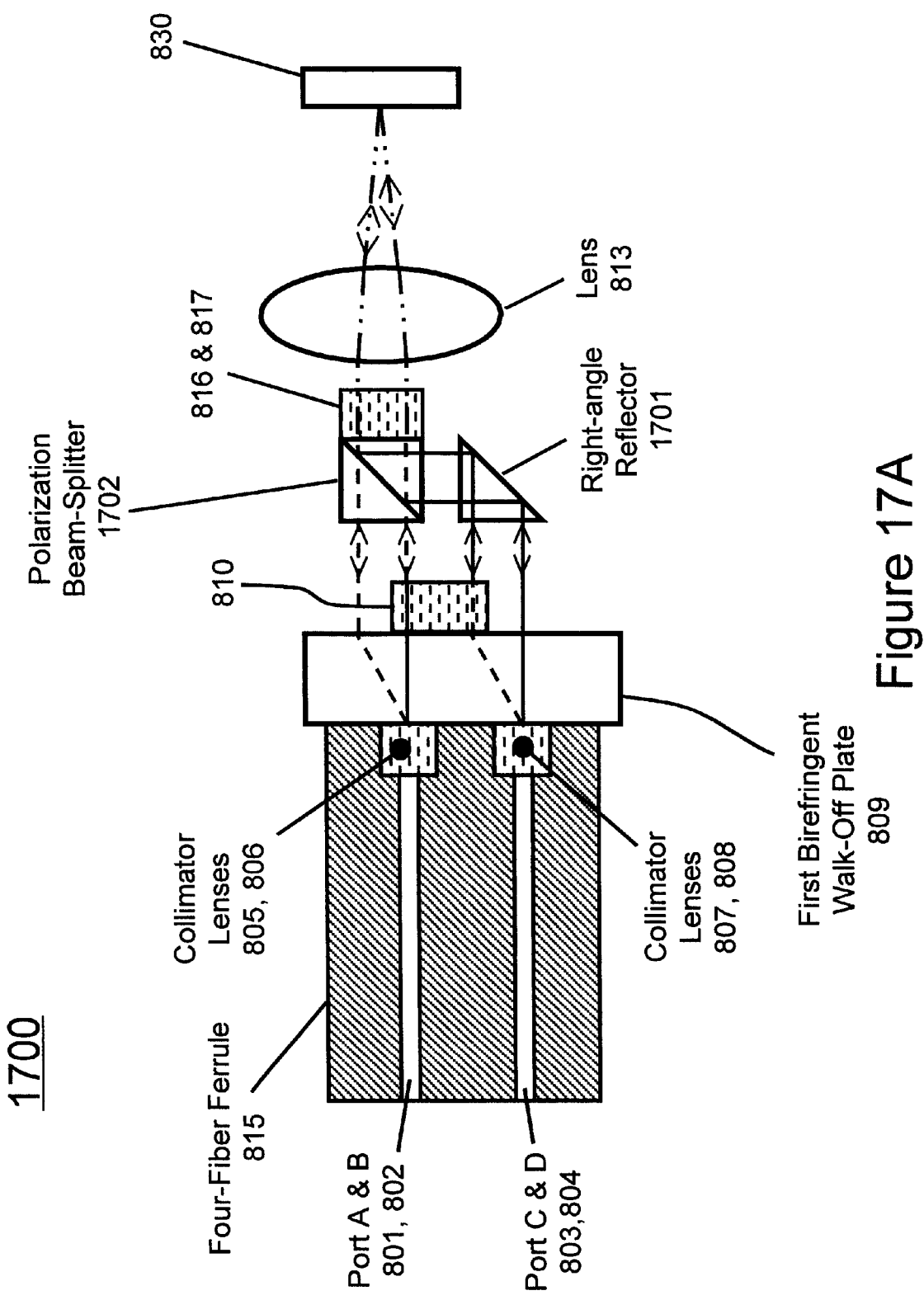
FIG. 17A and 17B are side and top views, respectively, of a third embodiment of the bi-directional optical circulator of the present invention comprising either a band bi-directional or an interleaved bi-directional optical circulator.
Figure 17B:
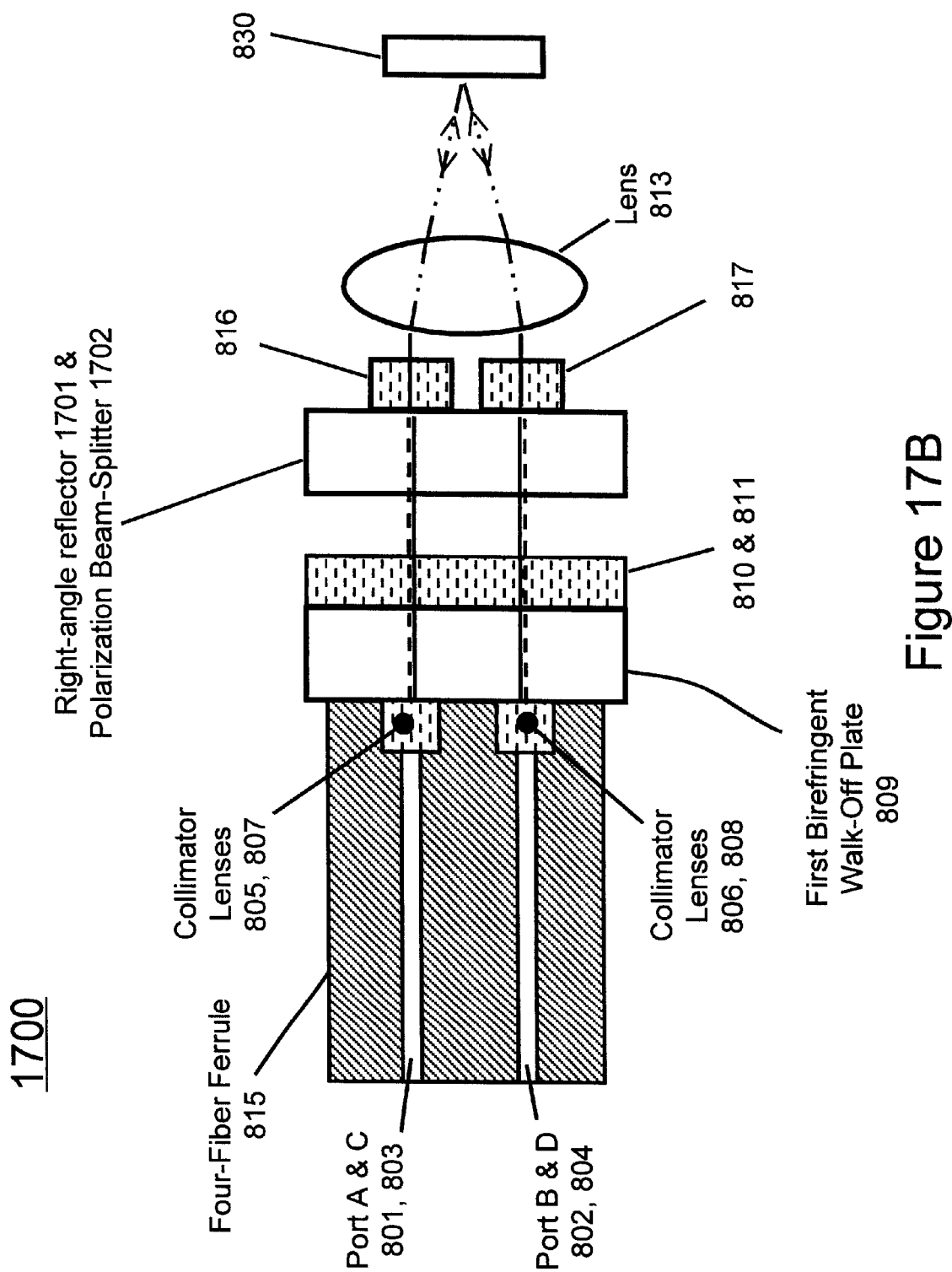

In the first two embodiments of the present invention, circulator 800 and circulator 1100, the second birefringent walk-off plate 812 must be of the exact thickness so as to cause a lateral offset of e-rays equivalent to the center-to-center inter-port separation distance. This requirement may create difficulties in some circumstances. Another embodiment of the present invention, which eliminates this requirement, is shown in FIGS. 17A and 17B in side and top views, respectively. In this third embodiment of the present invention, circulator 1700, shown in FIGS. 17A and 17B, the four-fiber ferrule 815, the four ports 801-804, the collimator lenses 805–808, the first birefringent plate 809, the first 90° reciprocally rotating optical element 810, the optical rotators 816 and 817, the lens 813 and the reflector element 830 are common to the circulators 800 and 1100. However, in the circulator 1700, there is neither a second birefringent walk-off plate nor a second 90° optical rotator. Instead, there is a beam-turning reflector 1701 and also a polarization beam splitter 1702 both disposed between the first reciprocally rotating optical element 810 and the set of polarization rotators 816 and 817. Furthermore, as illustrated in FIG. 17A, the single 90° optical rotator 810 is disposed so as to intercept and rotate the polarization plane directions of only the innermost four rays or sub-signals emanating from or destined for the four input/output ports. Preferably, the beam-turning reflector 1701 comprises a prism although it may comprise any other type of optical element, such as a mirror, capable of deflecting an optical propagation direction by approximately 90°. The beam-turning reflector 1701 is disposed so as to intercept the signals emanating from Port C 803 and Port D 804 and turn their directions of propagation by approximately 90°. This turning direction is in the first direction, that is, in a direction such that the polarization beam splitter 1702 subsequently intercepts these same signals. The polarization beam splitter 1702 is disposed such that light of sub-signals emanating from Port A 801 and Port B 802 pass therethrough without deflection whilst sub-signals emanating from Port C 803 and Port D 804, after having been deflected by the beam-turning reflector 1701, are deflected by approximately 90° by the polarization beam splitter 1702. The combined deflections by beam-turning reflector 1701 and polarization beam splitter 1702 upon the propagation paths of signals emanating from Port C 803 and Port D 804 are such that, subsequent to passage through polarization beam splitter 1702, sub-signals from Port A 801 and Port B 802 are superimposed upon those from Port C 803 and Port D 804, respectively.

The superimposition of sub-signals in the circulator 1700 is identical to that already described for circulator 800 and circulator 1100 and is as exactly as shown in FIG. 14 and FIG. 15 for sub-signals comprising the red band (odd channels) and blue band (even channels), respectively. The operation of circulator 1700 is similar to that shown in FIG. 14 and FIG. 15 and described in reference thereto except that the cross-section X–X' is disposed to the side of polarization beam splitter 1702 facing lens 813 and the sub-signal polarization plane orientations are all rotated by 90° (relative to circulator 800 and circulator 1100) between cross section W–W' (or w–w') and cross section Y–Y' (or y–y'). This difference between polarization plane orientations arises from the different disposition of 90° optical rotator 810 between circulator 1700 and either circulator 800 or 1100 as well as the absence of optical rotator 811 in circulator 1700. The beam-turning reflector 1701 deflects the forward-propagating pathway of each of the sub-signals C 1414, D 1416, C' 1415 and D' 1417 by approximately 90° . Subsequently, these same sub-signals are deflected by approximately 90° by the polarization beam splitter 1702 such that, as shown in cross section X–X' 1403 of FIG. 14 and X–X' 1503 of FIG. 15, the sub-signals from Port A 801 and Port B 802 are superimposed upon those from Port C 803 and Port D 804, respectively.

In the circulator 1700, the sub-signals C 1414, D 1416, C' 1415 and D' 1417 are all horizontally polarized before entering beam-turning reflector 1701. After being deflected by and exiting beam-turning reflector 1701, these sub-signals remain horizontally polarized. The horizontal polarization of sub-signals C 1414, D 1416, C' 1415 and D' 1417 comprises s-polarization (or perpendicular polarization) with respect to the polarization beam splitter 1702 and thus the paths of these sub-signals are deflected by approximately 90° at the polarization beam splitter 1702. The sub-signals A 1410, B 1412, A' 1411 and B' 1413 are all vertically polarized before entering polarization beam splitter 1702. This vertical polarization comprises p-polarization (or parallel polarization) with respect to the polarization beam splitter 1702 and thus these sub-signals are transmitted directly through beam splitter 1702 without deflection. By this, the sub-signals from Port A 801 and Port B 802 become superimposed upon those from Port C 803 and Port D 804, respectively. The re-separation of superimposed sub-signals of differing polarization during their return traverse through circulator 1700 is also effected by polarization beam splitter 1702 and beam-turning reflector 1701 in a similar fashion.

Aside from superimposing and re-separating sub-signal images, other aspects of the operation of the second circulator embodiment, circulator 1700, are similar to those already described for circulators 800 and 1100 and are not described in further detail here. The third embodiment, circulator 1700, has the advantage that a birefringent wedge of precise thickness is not required to superimpose the various sub-signal images. Precise positioning of the various sub-signals in circulator 1700 may be accomplished by slight tilt adjustments of the beam-turning reflector 1701 and/or the polarization beam splitter 1702.

In the preceding discussion, the operation of the embodiments of the bi-directional optical circulator of the present invention has been described with regard to either the "red band" and the "blue band" or "even channels" "odd channels." The use of such terminology, i.e., "red band," "blue band," "odd channel" and "even channel," in this document is made for the convenience of the reader only and does not imply restriction of the present invention to any particular optical channel wavelength distribution, wavelength spacing or enumeration scheme. Adaptation of the present invention for use with any one of numerous optical channel configurations and or systems will be readily apparent to one of ordinary skill in the art and is within the scope and spirit of the teachings herein.

The operation of the bi-directional optical circulator present invention has also been described with reference to either a mirror/waveplate assembly or a non-linear interferometer incorporated therein such that the light rays comprising the "blue band" (even channels) incur polarization plane rotation whilst those comprising the "red band" (odd channels) do not incur any rotation. However, it will be readily recognized by one of ordinary skill in the art that the mirror/waveplate assembly and non-linear interferometer comprising this invention may also be constructed so as to only rotate polarization planes of light rays of the red band or of odd channels, respectively, without departing from the scope or spirit of the teachings herein. Such modifications are readily performed, for instance, by adjusting the properties of the non-linear interferometer or interchanging the order of "red" and "blue" reflectors in the mirror/waveplate assembly and are within the scope and spirit of the present invention.

The operation of the bi-directional optical circulator present invention has also been described with reference to birefringent plates disposed such that e-rays and o-rays propagate with vertical and horizontal polarization respectively and also with reference to polarization rotation elements disposed such the polarization plane directions of light rays passing therethrough are rotated in certain directions when viewed from certain reference points. Such orientational disposition references, i.e., "horizontal," "vertical," "clockwise," "counterclockwise," are used in a relative sense only and are made for the clarity of the discussion and the convenience of the reader and do not imply restriction of the use of the present invention to particular absolute spatial orientations of elements contained therein or of polarization planes of light rays propagating therethrough.

Figure 18:
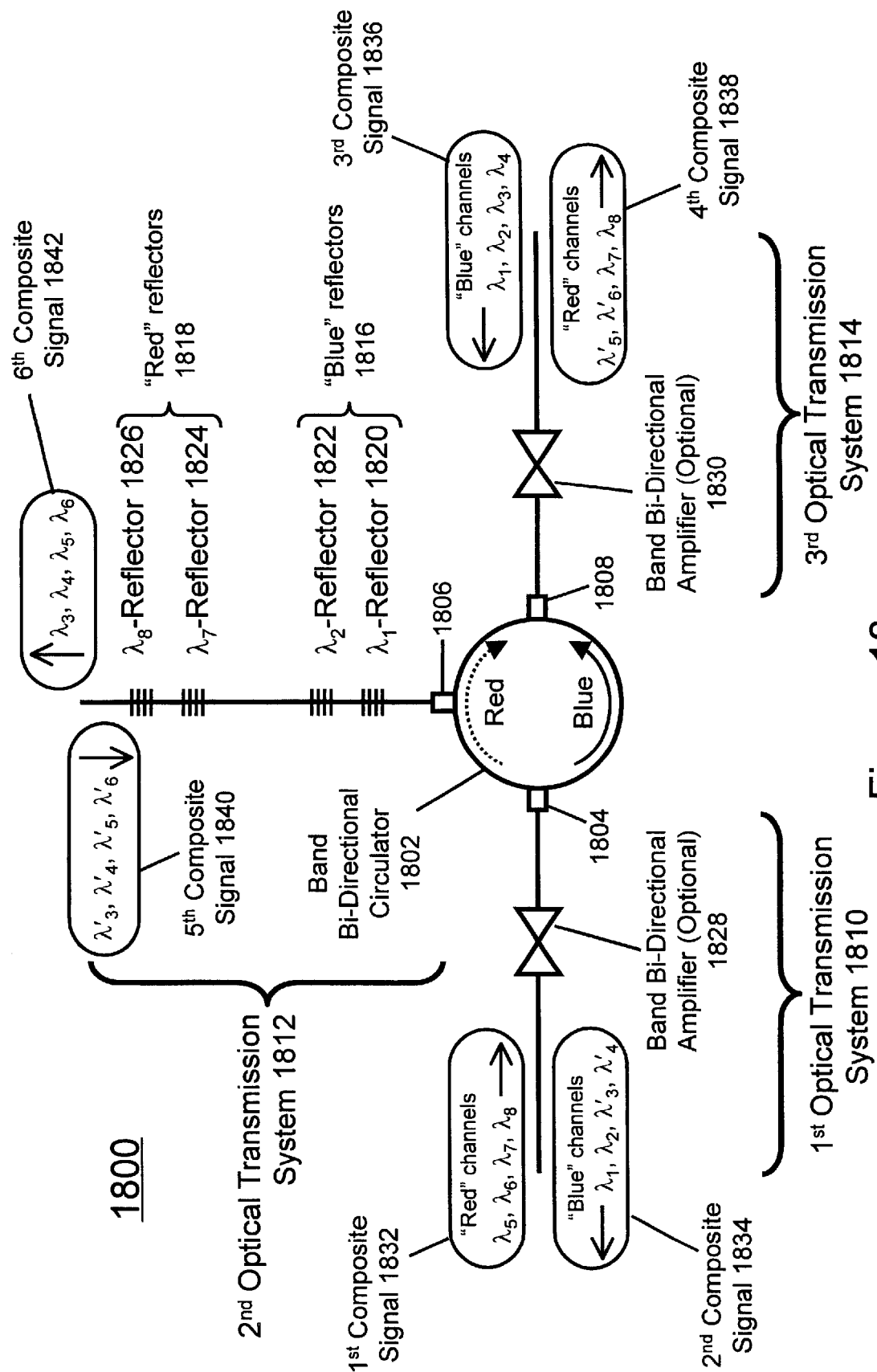
FIG. 18 is a diagram of an embodiment of the present invention comprising a bi-directional wavelength division optical multiplexer.

Subsequent embodiments of the present invention comprise a set of apparatuses and methods by which the bi-directional circulator is used to enhance data transmission flexibility and capacity within an optical communication system. For a detailed discussion of these embodiments of the present invention, the reader is referred to FIGS. 18–26 in conjunction with the following discussion. The first such embodiment of the present invention is illustrated in FIG. 18, which comprises a bi-directional wavelength division optical multiplexer utilizing a bi-directional optical circulator. The bi-directional wavelength division optical multiplexer 1800 of FIG. 18 comprises a three-port band bi-directional optical circulator 1802 each of the ports of which is optically coupled to a separate bi-directional optical communication or transmission line, in which two of the optical communication lines are band bi-directional and the third is either unidirectional or common-wavelength bi-directional. Thus, port #1 1804, port #2 1806 and port #3 1808 of bi-directional optical circulator 1802 are optically coupled to first optical communication (transmission) system 1810, second optical communication (transmission) system 1812 and third optical communication (transmission) system 1814, respectively. The optical communication systems 1810 and 1814 both comprise band bi-directional systems. The other optical communication system 1812, optically coupled to the port #2 1806 intermediate to the other two ports of bi-directional optical circulator 1802, comprises either a common-wavelength bi-directional or unidirectional communication system.

In the exemplary embodiment of FIG. 18, each band bi-directional optical system 1810 and 1814 comprises fiber optic lines within which a set of "red" signal channels propagates in a first direction and a set of "blue" channels propagates in a second direction opposite to the first direction. Optional band bi-directional amplifiers 1828 and 1830 may be disposed within the first band bi-directional system 1810 and/or the second band bi-directional system 1814. The set of signal channels propagating towards and away from bi-directional circulator 1802 within optical system 1810 comprise a first composite signal 1832 and a second composite signal 1834, respectively. Likewise, the set of signal channels propagating towards and away from bi-directional circulator 1802 within optical system 1814 comprise a third composite signal 1836 and a fourth composite signal 1838, respectively. In this discussion of the present invention shown in FIG. 18, it is assumed that the first composite signal 1832, second composite signal 1834, third composite signal 1836 and fourth composite signal 1838 comprise "red", "blue", "blue" and "red" signal channels, respectively.

Also in the exemplary embodiment of FIG. 18, the second optical communication system 1812 comprises fiber optic lines within which each of each of certain selected signal channels propagates in either one or both directions. If each signal channel propagates in only the direction away from the bi-directional circulator 1802 within the optical communication system 1812, then optical system 1812 is a unidirectional system. If each signal channel propagates in both directions within the optical communication system 1812, then optical system 1812 is a common-wavelength bi-directional system. The set of signals that propagate towards and away from the bi-directional circulator 1802 within the second optical communication system 1812 comprise fifth and sixth composite signals 1840 and 1842, respectively.

Disposed within the second optical communication system 1812 are a first set of grating reflectors 1816 corresponding to the "blue" band channel wavelengths and a second set of grating reflectors 1818 corresponding to the "red" band channel wavelengths. Each individual grating reflector within each set of reflectors is designed so as to reflect light of the specific wavelength comprising a certain target channel and to transmit the light of all other channels. In the preferred embodiment, each grating reflector comprises an in-fiber Bragg grating reflector, such as is well known in the art.

The operation of the bi-directional wavelength division optical multiplexer 1800 is now described with reference to FIG. 18. In this discussion, it is assumed that there are a total of eight possible channels, denoted by $\lambda_1-\lambda_8$, and that the set of four channels denoted by denoted by $\lambda_1-\lambda_4$ comprise the "blue" band whilst the set of four channels denoted by $\lambda_5-\lambda_8$ comprise the "red" band. Within the band bi-directional circulator 1802, it is assumed that the clockwise circulation direction refers to the logical sequence of any two of the ports #1 1804, #2 1806, #3 1808 and #1 1804, in this order, and that the counterclockwise circulation direction refers to the logical sequence of any two of the ports #3 1808, #2 1806, #1 1804, and #3 1808, in this order. It is further assumed that, within the bi-directional circulator 1802, the "red" and "blue" channels circulate in the clockwise and counterclockwise directions, respectively.

It is further assumed, in the exemplary embodiment of FIG. 18 and discussion pertaining thereto, that the set of "blue" grating reflectors 1816 comprises a specific grating reflector 1820 that reflects only the $\lambda_1$ channel and another grating reflector 1822 that reflects only the $\lambda_2$ channel. Likewise, it is also assumed that the set of "red" grating reflectors 1818 comprises a specific grating reflector 1824 that reflects only the $\lambda_7$ channel and another grating reflector 1826 that reflects only the $\lambda_8$ channel. Because of these assumptions as well as details provided in the following discussion, it follows that the fifth composite signal 1840 and sixth composite signal 1842 are each comprised of the set of signal channels $\lambda_3-\lambda_6$. This embodiment of the present invention is not limited to these particular grating choices, however.

Signal channels of the first composite signal 1832 enter the band bi-directional circulator through its port #1 1804. Because, according to the assumptions of the present example, these signal channels comprise "red" signal bands, specifically $\lambda_5-\lambda_8$, they are circulated in a clockwise direction through bi-directional circulator 1802 and are thus outputted from the circulator through its port #2 1806 to the second optical communication system 1812. Furthermore, all these signal channels are transmitted by the second communication system 1812 to and through the first set of grating reflectors 1816 without reflection. After passing through grating reflectors 1816, these signal channels then interact with the second set of grating reflectors 1818. According to the assumptions of the present example, the second set of grating reflectors 1818 comprises two grating reflectors 1824 and 1826 that reflect the $\lambda_7$ and $\lambda_8$ signals back through optical communication system 1812 towards bi-directional circulator 1802. The $\lambda_5$ and $\lambda_6$ signal channels are transmitted completely through the second set of grating reflectors 1818 and thus become components of the sixth composite signal 1842, which travels away from bi-directional circulator 1802 along the second optical communication system 1812. The $\lambda_7$ and $\lambda_8$ signal channels, which are both reflected by the second set of grating reflectors 1818, travel back through the first grating set 1816 to port #2 1806 of bi-directional circulator 1802 where they are input to the circulator for a second time. According to the assumptions of the present example, these $\lambda_7$ and $\lambda_8$ signal channels are circulated in a clockwise direction through bi-directional circulator 1802 and thus are outputted from the circulator through its port #3 1808 into the third bi-directional communication system 1814. The $\lambda_7$ and $\lambda_8$ signal channels thus become components of the fourth composite signal 1838, which travels away from bi-directional circulator 1802 along the third optical communication system 1814.

Signal channels of the third composite signal 1836 enter the band bi-directional circulator through its port #3 1808. Because, according to the assumptions of the present example, these signal channels comprise "blue" signal bands, specifically $\lambda_1-\lambda_4$, they are circulated in a counterclockwise direction through bi-directional circulator 1802 and are thus outputted from the circulator through its port #2 1806 to the second optical communication system 1812. The signal channels $\lambda_1-\lambda_4$ are then directed by optical communication system 1812 to the first set of grating reflectors 1816. According to the assumptions of the present example, the first set of grating reflectors 1816 comprises two grating reflectors 1820 and 1822 which reflect the $\lambda_1$ and $\lambda_2$ signals back through optical communication system 1812 towards bi-directional circulator 1802. The $\lambda_3$ and $\lambda_4$ signal channels are transmitted completely through the first set 1816 and then the second set 1818 of grating reflectors and thus become components of the sixth composite signal 1842, which travels away from bi-directional circulator 1802 along the second optical communication system 1812. As per the above discussions, the sixth composite signal 1842 thus comprises these $\lambda_3$ and $\lambda_4$ signal channels of the "blue" band together with the $\lambda_5$ and $\lambda_6$ signal channels of the "red" band. The $\lambda_1$ and $\lambda_2$ signal channels, which are both reflected within the first set of grating reflectors 1816, travel back to port #2 1806 of bi-directional circulator 1802 where they are input to the circulator for a second time. According to the assumptions of the present example, these $\lambda_1$ and $\lambda_2$ signal channels are circulated in a counterclockwise direction through bi-directional circulator 1802 and thus are outputted from the circulator through its port #1 1804 into the first bi-directional communication system 1810. The $\lambda_1$ and $\lambda_2$ signal channels thus become components of the second composite signal 1834, which travels away from bi-directional circulator 1802 along the first optical communication system 1810.

Signal channels of the fifth composite signal 1840, if present, travel to the bi-directional circulator 1802 through the second optical communication system 1812. Because the second optical communication system 1812 comprises a common wavelength bi-directional system if the fifth composite signal 1840 exists, then the wavelengths, $\lambda'_3$, $\lambda'_4$, $\lambda'_5$ and $\lambda'_6$, of the signal channels of the fifth composite signal 1840 are identical to those of the signals $\lambda_3$, $\lambda_4$, $\lambda_5$ and $\lambda_6$, respectively of the sixth composite signal 1842. The wavelengths of these signal channels of the fifth composite signal 1840 do not correspond to any of the target reflection wavelengths of any of the grating reflectors of either the first set 1816 or the second set 1818 of grating reflectors. Therefore, the set of signal channels $\lambda'_3-\lambda'_6$ are transmitted by communication system 1812 completely through both the second set 1818 and first set 1816 of grating reflectors to port #2 1806 of bi-directional circulator 1802 where they are input to the circulator. Because the signals $\lambda'_3$ and $\lambda'_4$ are of the set of "blue" signals, then, according to the assumptions of the present discussion, these signals are circulated in a counterclockwise direction through circulator 1802 from its port #2 1806 to its port #1 1804. Because the signals $\lambda'_5$ and $\lambda'_6$ are of the set of "red" signals, then, according to the assumptions of the present discussion, these signals are circulated in a clockwise direction through circulator 1802 from its port #2 1806 to its port #3 1808. The signals $\lambda'_3$ and $\lambda'_4$, if present, are thus outputted from circulator 1802 through its port #1 1804 to the first bi-directional communication system 1810 and thus become components of the second composite signal 1834. Furthermore, the signals $\lambda'_5$ and $\lambda'_6$, if present, are outputted from circulator 1802 through its port #3 1808 to the third bi-directional communication system 1814 and thus become components of the fourth composite signal 1838.

Figure 19:
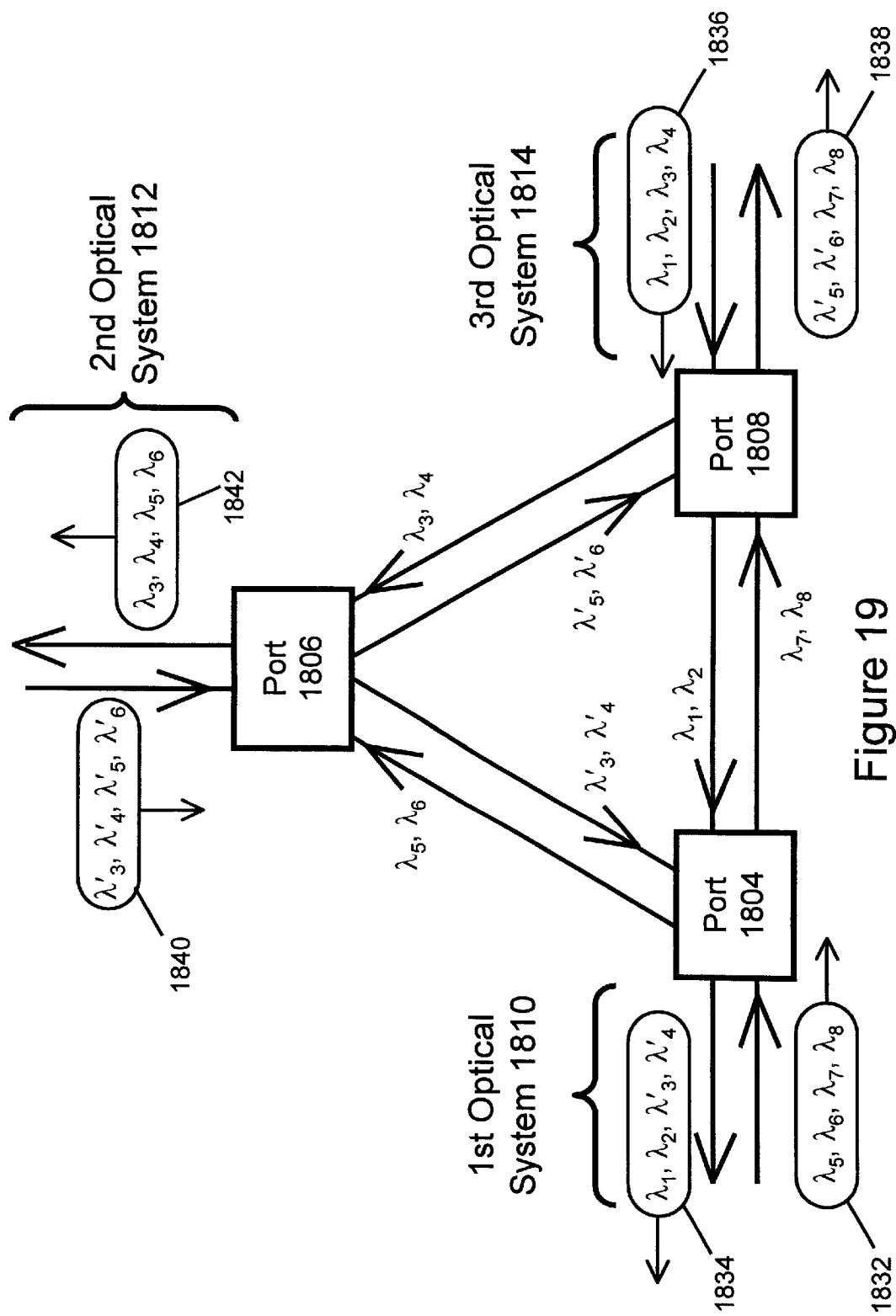
FIG. 19 is a block diagram schematically illustrating the signal routing functionality of the bi-directional wavelength division optical multiplexer of the present invention.

From the above discussion, the second composite signal 1834 comprises the signals $\lambda_1$ and $\lambda_2$ from composite signal 1836 together with, optionally, the signals $\lambda'_3$ and $\lambda'_4$ from composite signal 1840. In like fashion, the fourth composite signal 1838 comprises the signals $\lambda_7$ and $\lambda_8$ from composite signal 1832 together with, optionally, the signals $\lambda'_5$ and $\lambda'_6$ from composite signal 1840. As previously mentioned, the sixth composite signal 1842 comprises the signals $\lambda_3$–$\lambda_6$. FIG. 19 schematically illustrates this signal routing functionality in block diagram form. It may be seen from FIG. 19 that, according to the given example of the operation of the bi-directional wavelength division optical multiplexer 1800 of the present invention, the signals $\lambda_1$, $\lambda_2$, $\lambda_7$ and $\lambda_8$ are routed from the communication system coupled to the first (third) port of the bi-directional circulator to the communication system coupled to the third (first) port. It is further seen from FIG. 19 that the signals $\lambda_3$, $\lambda_4$, $\lambda_5$ and $\lambda_6$ are inputted to one of the first or third ports of the bi-directional circulator and are outputted from the intermediate port #2 of the circulator. Finally, it is also seen from FIG. 19 that any signals input to the bi-directional circulator intermediate port #2 are routed to one or another of the other ports depending upon whether their respective wavelengths are of the "red" band or the "blue" band.

Figure 20:
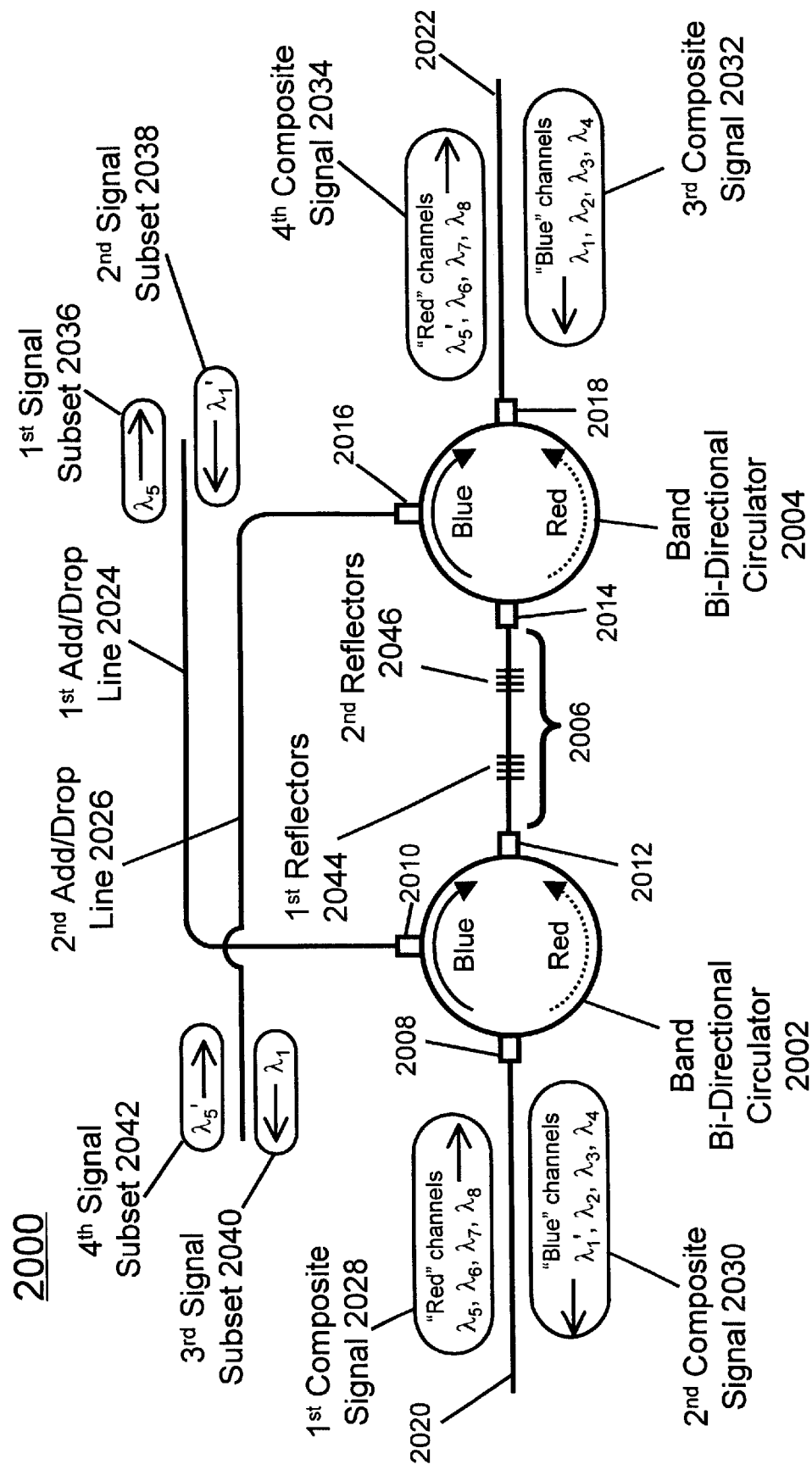
FIG. 20 is a diagram of an embodiment of the present invention comprising a bi-directional wavelength division optical add/drop multiplexer.

Another embodiment of the present invention comprising a bi-directional wavelength division optical add/drop multiplexer is illustrated in FIG. 20. In the bi-directional wavelength division optical add/drop multiplexer 2000 of FIG. 20, a first three-port bi-directional circulator 2002 is connected to a second three-port bi-directional circulator 2004 via an intermediate fiber optic link 2006. The first bi-directional circulator 2002 comprises a port #1 2008, a port #2 2010 and a port #3 2012. The second bi-directional circulator 2004 comprises a port #4 2014, a port #5 2016 and a port #6 2018. The fiber optic link 2006 is optically coupled to port #3 2012 of circulator 2002 and to port #4 2014 of second circulator 2004 via its respective ends. Each of the other circulator end ports, port #1 2008 and port #6 2018 is optically coupled to a bi-directional optical communication or transmission system, namely first bi-directional system 2020 and second bi-directional system 2022, respectively. Each of the circulator intermediate ports, port #2 2010 and port #5 2016 is optically coupled to a bi-directional add/drop line, namely first add/drop line 2024 and second add/drop line 2026, respectively.

In the exemplary embodiment of FIG. 20, each band bi-directional optical system 2020 and 2022 comprises fiber optic lines within which a set of "red" signal channels propagates in a first direction and a set of "blue" channels propagates in a second direction opposite to the first direction. The set of signal channels propagating towards and away from multiplexer 2000 within bi-directional system 2020 comprise a first composite signal 2028 and a second composite signal 2030, respectively. Likewise, the set of signal channels propagating towards and away from multiplexer 2000 within bi-directional system 2022 comprise a third composite signal 2032 and a fourth composite signal 2034, respectively. In the discussion pertaining to FIG. 20, it is assumed that the first composite signal 2028 and the fourth composite signal 2034 both comprise "red" signal channels and that the second composite signal 2030 and the third composite 2032 signal both comprise "blue" signal channels.

In the exemplary embodiment of FIG. 20, each band bi-directional add/drop line 2024 and 2026 comprises fiber optic lines within which a set of "red" signal channels propagates in a first direction and a set of "blue" channels propagates in a second direction opposite to the first direction. The "red" and "blue" signal channels or wavelengths carried by the add/drop lines 2024 and 2026 are selected subsets of the totality of "red" and "blue" signal channels or wavelengths, respectively, carried by the bi-directional optical systems 2020 and 2022. Specifically, add/drop line 2024 carries a first subset 2036 of signals dropped from the first composite signal 2028 and a second subset 2038 of signals to be added to the second composite signal 2030. Likewise, add/drop line 2026 carries a third subset 2040 of signals dropped from the third composite signal 2032 and a fourth subset 2042 of signals to be added to the fourth composite signal 2034. The first signal subset 2036 and second signal subset 2038 propagate away from and towards the first circulator 2002 within first add/drop line 2024. Likewise, the third signal subset 2040 and fourth signal subset 2042 propagate away from and towards the second circulator 2004 within second add/drop line 2026.

According to the assumptions of the present example, the first signal subset 2036 and fourth signal subset 2042 comprise "red" channels whereas the second signal subset 2038 and third signal subset 2040 comprise "blue" channels. Signal add/drop operations generally occur in pairs with an add operation of one signal corresponding to a drop operation of a second signal comprising a wavelength identical to the added signal. Because of this property, it follows that the first signal subset 2036 and fourth signal subset 2042 comprise signals with identical wavelengths and that the second signal subset 2038 and third signal subset 2040 comprise signals with identical wavelengths.

The intermediate fiber link 2006 is partially comprised of a first set 2044 and a second set 2046 of grating reflectors. These grating reflectors preferably comprise in-fiber Bragg grating reflectors, the likes of which are well known in the art. Each grating reflector in the first set 2044 is designed so as to reflect only light of the specific wavelength corresponding to one dropped signal of the first signal subset 2036 and the matching added signal of the fourth signal subset 2042. Likewise, each grating reflector in the second set 2046 is designed so as to reflect only light of the specific wavelength corresponding to one dropped signal of the third signal subset 2040 and the matching added signal of the second signal subset 2038. According to the assumptions of the present example, each grating reflector of the first set 2044 is designed so as to reflect a targeted add/drop wavelength corresponding to one of the "red" channels and each grating reflector of the second set 2046 is designed so as to reflect a targeted add/drop wavelength corresponding to one of the "blue" channels.

As discussed previously, each of the band bi-directional circulators 2002 and 2004 comprises a first circulation direction for the "red" ("blue") channels and a second circulation direction opposite to the first for the "blue"

("red") channels. Within the band bi-directional circulator 2002, it is assumed that the clockwise circulation direction refers to the logical sequence of any two of the ports #1 2008, #2 2010, #3 2012, and #1 2008, in this order, and that the counterclockwise circulation direction refers to the logical sequence of any two of these ports in the reverse order. Likewise, within the band bi-directional circulator 2004, it is assumed that the clockwise circulation direction refers to the logical sequence of any two of the ports #4 2014, #5 2016, #6 2018, and #4 2014, in this order, and that the counterclockwise circulation direction refers to the logical sequence of any two of these ports in the reverse order. Generally, the circulation directions of the two bi-directional circulators 2002 and 2004 comprising multiplexer 2000 are disposed such that each inbound composite signal, that is, first composite signal 2028 and third composite signal 2032, circulates in a direction during its initial pass within each circulator so as to bypass the respective intermediate port, either port #2 2010 or port #5 2016, of the circulator. Specifically, for the present example, it is assumed that the "blue" and "red" channels circulate in the clockwise and counterclockwise directions, respectively, within each of the circulators 2002 and 2004.

The operation of the bi-directional wavelength division optical add/drop multiplexer 2000 is now described in detail with reference to FIG. 20. Individual signals of the first composite signal 2028 are input to multiplexer 2000 through port #1 2008 of bi-directional circulator 2002. As described above, the circulation directions of circulator 2002 are disposed such that the wavelengths comprising the first composite signal 2028 circulate during their initial pass therethrough so as to bypass the intermediate port #2 2010. Thus, the individual signals of the first composite signal 2028 are directed in the counterclockwise circulation direction through bi41 directional circulator 2002 to the port #3 2012, from which they are output to the intermediate fiber link 2006. All such channels pass entirely through intermediate fiber link 2006 to second circulator 2004 except for those channels comprising wavelengths corresponding to a reflection band of one of the grating reflectors within grating reflector set 2044. The channels originally from first composite signal 2028 that are not reflected by any such grating reflector are input to port #4 2014 of the second bi-directional circulator 2004 via the intermediate fiber link 2006. These signal channels are once again circulated through circulator 2004 in the same logical circulation direction as in circulator 2002 and are thus directed to the port #6 2018, from which they are output so as to form components of the fourth composite signal 2034.

Those individual signals of the first composite signal 2028 that are reflected by one of the grating reflectors comprising first grating set 2044 do not travel to the second bi-directional circulator 2004 but are instead directed back to port #3 2012 of the first bi-directional circulator 2002 at which they are input to the circulator for a second time. Continuing in the same logical circulation direction as during their first pass through this bi-directional circulator, these signals are directed from port #3 2012 to the intermediate port #2 2010 from which they are output to the first add/drop line 2024. In this fashion, these signals, which do not travel to second bi-directional circulator 2004, become those signals dropped to first add/drop line 2024. In the specific example of FIG. 20, the grating reflector set 2044 comprises one fiber Bragg grating reflecting the $\lambda_5$ signal and thus this $\lambda_5$ signal is dropped from the first composite signal 2028 to the first add/drop line 2024.

Individual signals of the third composite signal 2032 are input to multiplexer 2000 through port #6 2018 of second bi-directional circulator 2004. The circulation directions of circulator 2004 are disposed such that the wavelengths comprising the third composite signal 2032 circulate during their initial pass therethrough so as to bypass the intermediate port #5 2016. Thus, the individual signals of the third composite signal 2032 are directed in the clockwise circulation direction through bi-directional circulator 2004 to the port #4 2014, from which they are output to the intermediate fiber link 2006. All such channels pass entirely through intermediate fiber link 2006 to the first circulator 2002 except for those channels comprising wavelengths corresponding to a reflection band of one of the grating reflectors within second grating reflector set 2046. The channels originally from third composite signal 2032 that are not reflected by any such grating reflector are input to port #3 2012 of the first bi-directional circulator 2002 via the intermediate fiber link 2006. These signal channels are once again circulated through circulator 2002 in the same logical circulation direction as in circulator 2004 and are thus directed to the port #1 2008, from which they are output so as to form components of the second composite signal 2030.

Those individual signals of the third composite signal 2032 that are reflected by one of the grating reflectors comprising second grating set 2046 do not travel to the first bi-directional circulator 2002 but are instead directed back to port #4 2014 of the second bi-directional circulator 2004 at which they are input to the circulator for a second time. Continuing in the same logical circulation direction as during their first pass through this bi-directional circulator, these signals are directed from port #4 2014 to the intermediate port #5 2016 from which they are output to the second add/drop line 2026. In this fashion, these signals, which do not travel to first bi-directional circulator 2002, become those signals dropped to second add/drop line 2026. In the specific example of FIG. 20, the second grating reflector set 2046 comprises one fiber Bragg grating reflecting the $\lambda_1$ signal and thus this $\lambda_1$ signal is dropped from the third composite signal 2032 to the second add/drop line 2026.

Signals of the second signal subset 2038 travel to multiplexer 2000 through the first add/drop line 2024 and are input to multiplexer 2000 through port #2 2010 of first bi-directional circulator 2002. Since signals of the second signal subset 2038 are not of the same wavelength band as those signals comprising the first composite signal 2028, the signals of the second signal subset 2038 circulate through circulator 2002 in a circulation direction opposite to those signals of the first composite signal 2028. Thus, the individual signals of the second signal subset 2038 are directed in the clockwise circulation direction through bi-directional circulator 2002 to the port #3 2012, from which they are output to the intermediate fiber link 2006.

The signals of the second signal subset 2038 comprise wavelengths corresponding to dropped signals of the third composite signal 2032 and are therefore reflected by one of the grating reflectors within second grating reflector set 2046. These signals are therefore directed back to port #3 2012 of the first bi-directional circulator 2002 at which they are input to the circulator for a second time. Continuing in the same logical circulation direction as during their first pass through this bi-directional circulator, these signals of the second signal subset 2038 are directed from port #3 2012 to port #1 2008 of first bi-directional circulator 2002. The signals of the second signal subset 2038 are then output from port #1 2008 so as to become added components of the second composite signal 2030.

In the specific example of FIG. 20, the second signal subset 2038 comprises a single signal $\lambda'_1$ of exactly the same wavelength as that of signal $\lambda_1$. As shown in FIG. 20, this $\lambda'_1$ signal is inputted via the first add/drop line 2024 and outputted via the first bi-directional system 2020. In the specific example of FIG. 20, this $\lambda'_1$ signal is added to the second composite signal 2030 whilst, as discussed previously, the $\lambda_1$ signal is dropped from the third composite signal 2032 to the second add/drop line 2026.

Signals of the fourth signal subset 2042 travel to multiplexer 2000 through the second add/drop line 2026 and are input to multiplexer 2000 through port #5 2016 of second bi-directional circulator 2004. Since signals of the fourth signal subset 2042 are not of the same wavelength band as those signals comprising the third composite signal 2032, the signals of the fourth signal subset 2042 circulate through circulator 2004 in a circulation direction opposite to those signals of the third composite signal 2032. Thus, the individual signals of the fourth signal subset 2042 are directed in the counterclockwise circulation direction through bi-directional circulator 2004 to the port #4 2014, from which they are output to the intermediate fiber link 2006.

The signals of the fourth signal subset 2042 comprise wavelengths corresponding to dropped signals of the first composite signal 2028 and are therefore reflected by one of the grating reflectors within first grating reflector set 2044. These signals are therefore directed back to port #4 2014 of the second bi-directional circulator 2004 at which they are input to the circulator for a second time. Continuing in the same logical circulation direction as during their first pass through this bi-directional circulator, these signals of the fourth signal subset 2042 are directed from port #4 2014 to port #6 2018 of second bi-directional circulator 2004. The signals of the fourth signal subset 2042 are then output from port #6 2018 so as to become added components of the fourth composite signal 2034.

In the specific example of FIG. 20, the fourth signal subset 2042 comprises a single signal $\lambda'_5$ of exactly the same wavelength as that of signal $\lambda_5$. As shown in FIG. 20, this $\lambda'_5$ signal is inputted via the second add/drop line 2026 and outputted via the second bi-directional system 2022. In the specific example of FIG. 20, this $\lambda'_5$ signal is added to the fourth composite signal 2034 whilst, as discussed previously, the $\lambda_5$ signal is dropped from the first composite signal 2028 to the first add/drop line 2024.

Figure 21:
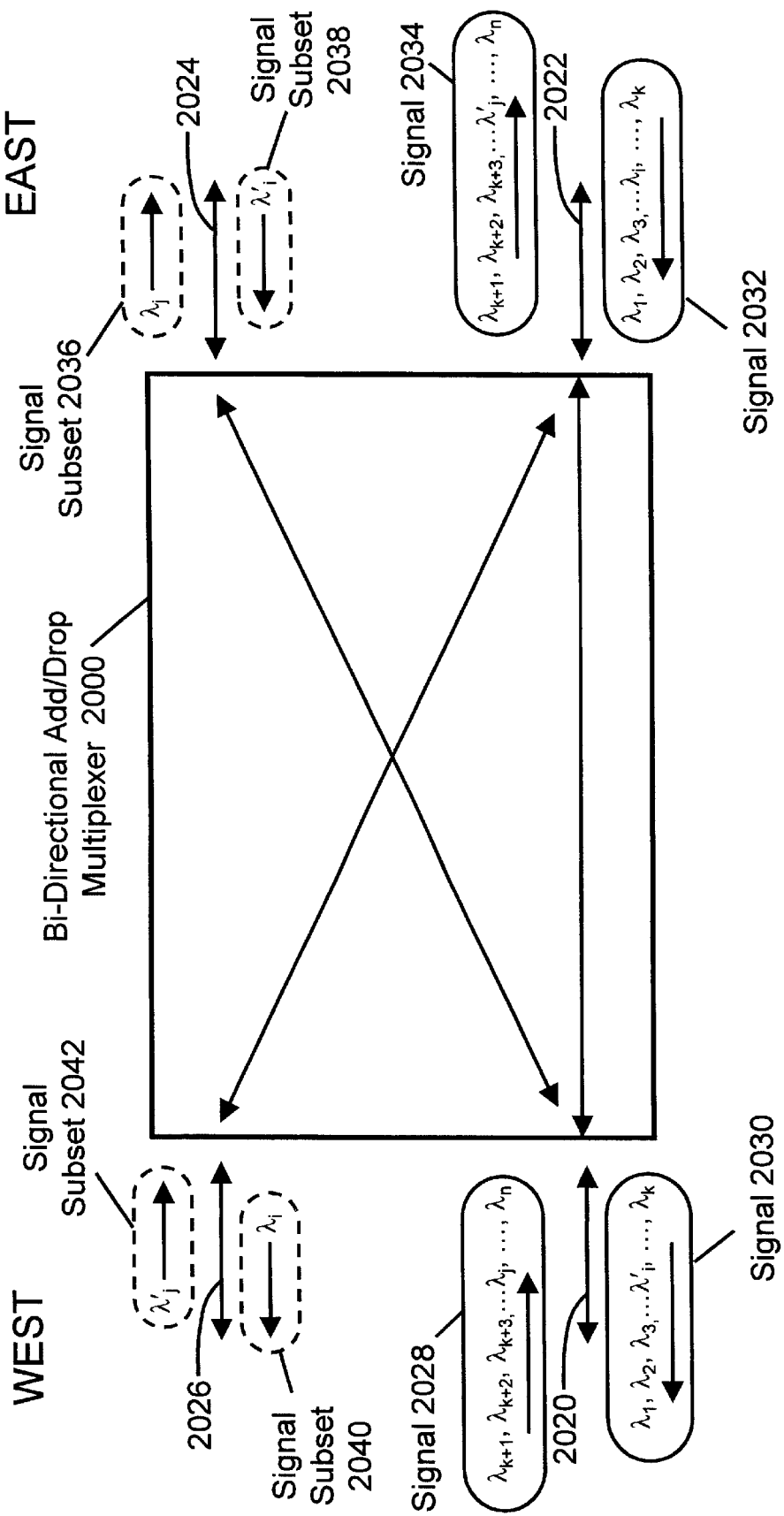
FIG. 21 is a block diagram schematically illustrating the signal routing functionality of the bi-directional wavelength division optical add/drop multiplexer of the present invention.

FIG. 21 illustrates the functionality of the bi-directional wavelength division optical add/drop multiplexer 2000 of the present invention. In FIG. 21, solid-line ovals represent bi-directional optical communication or transmission systems and the signals carried therein and dashed-line ovals represent bi-directional optical add/drop lines and the signal subsets carried therein. If it is assumed that the left side and right sides of FIG. 21 represent the logical West and East sides of multiplexer 2000, respectively, then it is seen that both bi-directional communication systems 2020 and 2022 and both add/drop lines 2024 and 2026 carry both Eastbound and Westbound signal sets. The communication system 2020 carries both Westbound composite signal 2030 comprising k channels, each channel of a different wavelength, and Eastbound composite signal 2028, comprising (n–k) channels, each of a different wavelength different from the wavelengths of composite signal 2030. Likewise, the communication system 2022 carries both Westbound composite signal 2032 comprising k channels, each channel of a different wavelength, and Eastbound composite signal 2034, comprising (n–k) channels, each of a different wavelength different from the wavelengths of composite signal 2032. The wavelengths of the k channels of signal 2030 are identical to those of signal 2032 and the wavelengths of the (n–k) channels of signal 2028 are identical to those of signal 2034.

In the example of the operation of the bi-directional wavelength division optical add/drop multiplexer 2000 illustrated in FIG. 21, the Westbound signal $\lambda_i$ of signal 2032 is dropped to add/drop line 2026 and is replaced by the Westbound signal $\lambda'_i$ which is added to signal 2030 from the add/drop line 2024. At the same time, the Eastbound signal $\lambda_j$ of signal 2028 is dropped to add/drop line 2024 and is replaced by the Eastbound signal $\lambda'_j$ which is added to signal 2034 from the add/drop line 2026. Each added signal corresponds to a matching dropped signal of the identical wavelength. For simplicity, only one added signal is shown in FIG. 21 for each of the Eastbound and Westbound directions. However, the present invention is not meant to be limited to a single added signal or dropped signal in either direction. All non-dropped Westbound and Eastbound signals are transferred from signal 2032 to signal 2030 and from signal 2028 to signal 2034, respectively. Furthermore, the bi-directional optical communication systems 2020 and 2022 are not meant to be limited to band bi-directional systems comprising so-called "red" wavelength bands and "blue" wavelength bands. The optical communication systems 2020 and 2022 could equally well be interleaved bi-directional systems in which every $n^{th}$ channel propagates in a first direction and the remaining channels propagate in a second direction opposite to the first direction.

Figure 22:
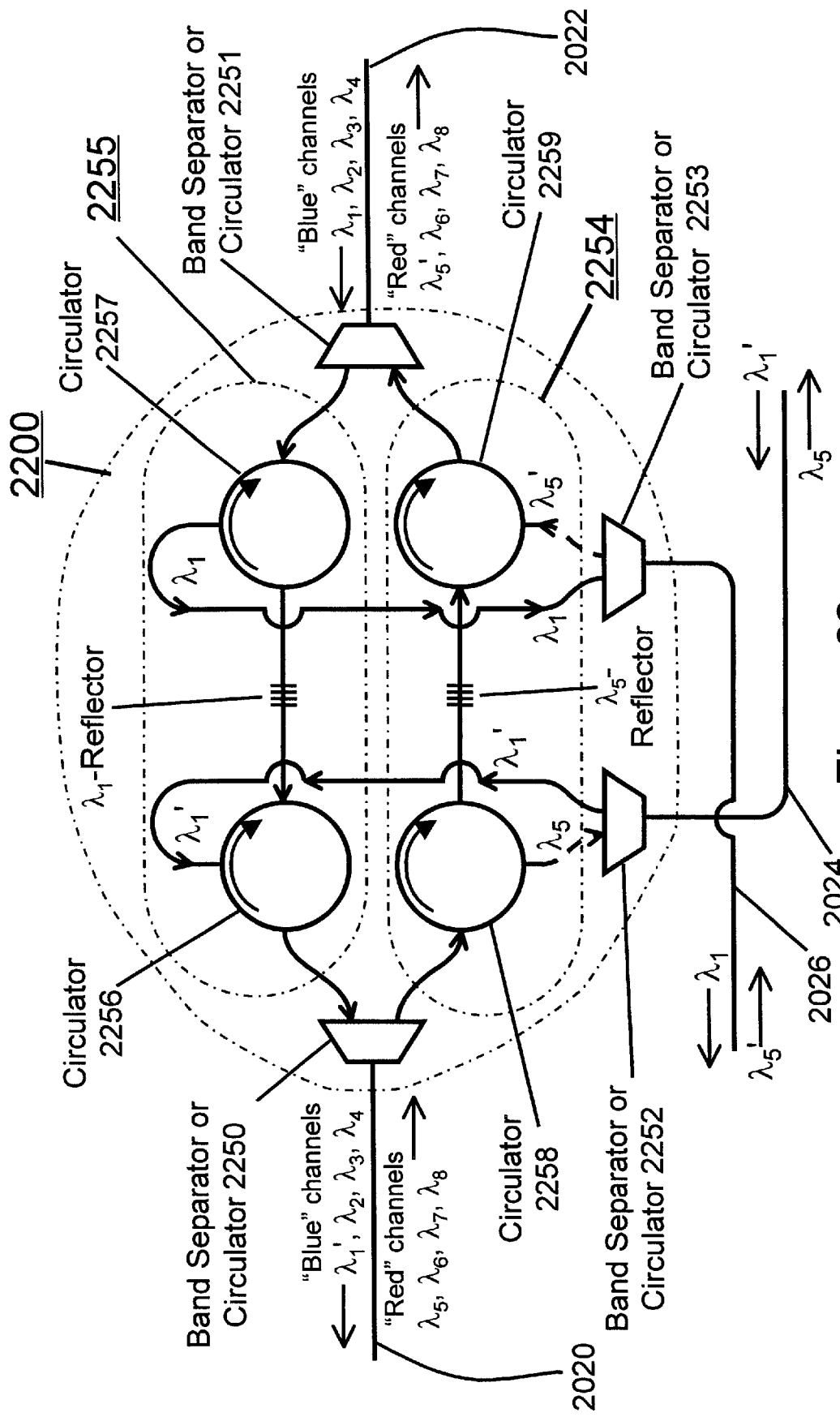
FIG. 22 is a diagram of a bi-directional wavelength division optical add/drop multiplexer utilizing conventional optical circulators.

The bi-directional wavelength division optical add/drop multiplexer of the present invention has a significant advantage over the prior art in terms of simplicity. FIG. 22 illustrates a bi-directional wavelength division optical add/drop multiplexer comprised of conventional prior art components. As is the case for the multiplexer of the present invention, the prior art multiplexer 2200 of FIG. 22 is optically coupled to two band bi-directional optical communication systems 2220 and 2222 and to two bi-directional add/drop lines 2024 and 2026. Because the prior art circulators are not bi-directional, extra band separators or circulators 2250, 2251, 2252 and 2253 are required to either separate the "red" and "blue" bands before the add/drop operation or to recombine them subsequent to the add/drop operation. This band separation essentially creates two unidirectional light propagation systems 2254 and 2255 within which the add/drop operations occur for the channels of the "red" and "blue" bands, respectively. Also, one circulator each is required for the add operation and the drop operation in each of the unidirectional systems. This necessitates four separate circulators 2256–2259 within the bi-directional add/drop multiplexer 2200. By comparing FIG. 22 with FIG. 20, it is seen that far fewer optical components are required in the present invention, thus permitting a saving in cost and an improvement in optical throughput.

Figure 23:
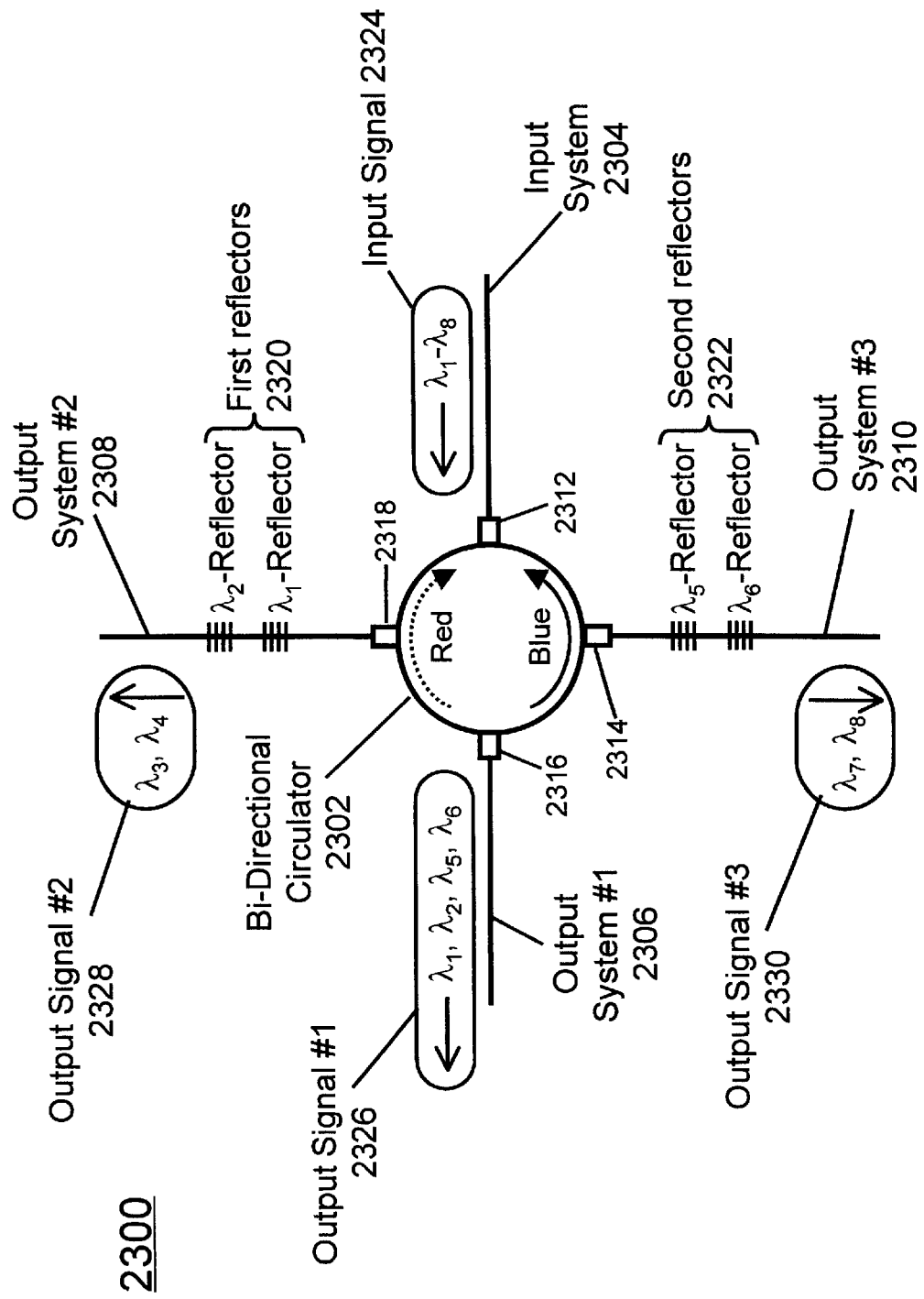
FIG. 23 is a diagram of an embodiment of the present invention comprising a three-way optical channel separator.

FIG. 23 illustrates another embodiment of the present invention comprising a three-way optical channel separator. The three-way optical channel separator 2300 comprises a four-port bi-directional circulator 2302 optically coupled to an input unidirectional wavelength division multiplexed optical communication system 2304 and three optical output lines 2306, 2308 and 2310. The input unidirectional communication system 2304 is optically coupled to one port 2312 of the bi-directional circulator 2302 and thus port 2312 comprises the input port of the three-way optical channel separator. The bi-directional circulator 2302 comprises a total of four ports, with port 2312 used for input and the other three ports 2314, 2316 and 2318 used for output. In the discussion of the present example, it is assumed that the sequence of ports 2312, 2314, 2316 and 2318 defines the logical clockwise circulation direction of bi-directional circulator 2302 and that the "red" and "blue" bands circulate in logical clockwise and counterclockwise directions, respectively, within the circulator. The first output system 2306 is optically coupled to port 2316, two ports removed from the input port 2312, and the second output system 2308 and third output system 2310 are optically coupled to ports 2318 and 2314 respectively. Input signal 2324 is input to the input port 2312 by input system 2304. Output signals 2326, 2328 and 2330 are output from output ports 2316, 2318, and 2314, respectively.

Disposed within the second output system 2308 are a first set 2320 of grating reflectors targeted to reflect certain "blue" channel wavelengths. Disposed within the third output system 2310 are a second set 2322 of grating reflectors targeted to reflect certain "red" channel wavelengths. Each set 2320 and 2322 of grating reflectors comprises a plurality of individual grating reflectors, preferably in-fiber Bragg grating reflectors which efficiently reflect only the wavelength of the channel specified and transmit all other wavelengths.

The operation of the three-way optical channel separator is now described with reference to FIG. 23. The composite input signal 2324 comprises a plurality of wavelength division multiplexed channels, all propagating in the direction towards input port 2312 via system 2304. The channels of the composite input signal 2324 further comprise two subsets of channels, one subset comprising wavelengths of the "red" band and a second subset comprising wavelengths of the "blue" band, these "red" and "blue" bands being circulated clockwise and counterclockwise, respectively, through the circulator 2302. For purposes of the discussion of the current example, it is assumed that this input signal comprises eight channels, denoted $\lambda_1$–$\lambda_8$, and that the "blue" and "red" band subsets comprise the four channels $\lambda_1$–$\lambda_4$ and $\lambda_5$–$\lambda_8$, respectively. It is further assumed that the first grating reflector set 2320 comprises two Bragg grating reflectors specific to the $\lambda_1$ and $\lambda_2$ "blue" channels and that the second grating reflector set 2322 comprises two Bragg grating reflectors specific to the $\lambda_5$ and $\lambda_6$ "red" channels.

Of the channels of the composite input signal 2324 input to circulator 2302 through input port 2312, the signals of channels $\lambda_1$–$\lambda_4$ are directed in the logical clockwise direction to port 2318 and output to second output system 2308 whilst those of channels $\lambda_5$–$\lambda_8$ are directed in the logical counterclockwise direction to port 2314 and output to third output system 2310. Of the signals $\lambda_1$–$\lambda_4$ output to second output system 2308, the $\lambda_1$ and $\lambda_2$ signals are reflected by first grating reflector set 2320 back to circulator port 2318 at which they re-enter circulator 2302. The remaining $\lambda_3$ and $\lambda_4$ signals continue through first grating reflector set 2320 to become the second output signal 2328. Of the signals $\lambda'_5$–$\lambda_8$ output to third output system 2310, the $\lambda_5$ and $\lambda_6$ signals are reflected by second grating reflector set 2322 back to circulator port 2314 at which they re-enter circulator 2302. The remaining $\lambda_7$ and $\lambda_8$ signals continue through second grating reflector set 2322 to become the third output signal 2330. The $\lambda_1$ and $\lambda_2$ signals circulate in the logical counterclockwise direction through circulator 2302 from port 2318 to port 2316 and the $\lambda_5$ and $\lambda_6$ signals circulate in the logical counterclockwise direction through circulator 2302 from port 2314 to port 2316. The $\lambda_1$ and $\lambda_2$ and $\lambda_5$ and $\lambda_6$ signals thus join at and are output from port 2316 of circulator 2302 so as to form the first output signal 2326 propagating through first output line 2306. In this way, the three-way optical channel separation is accomplished.

Figure 24:
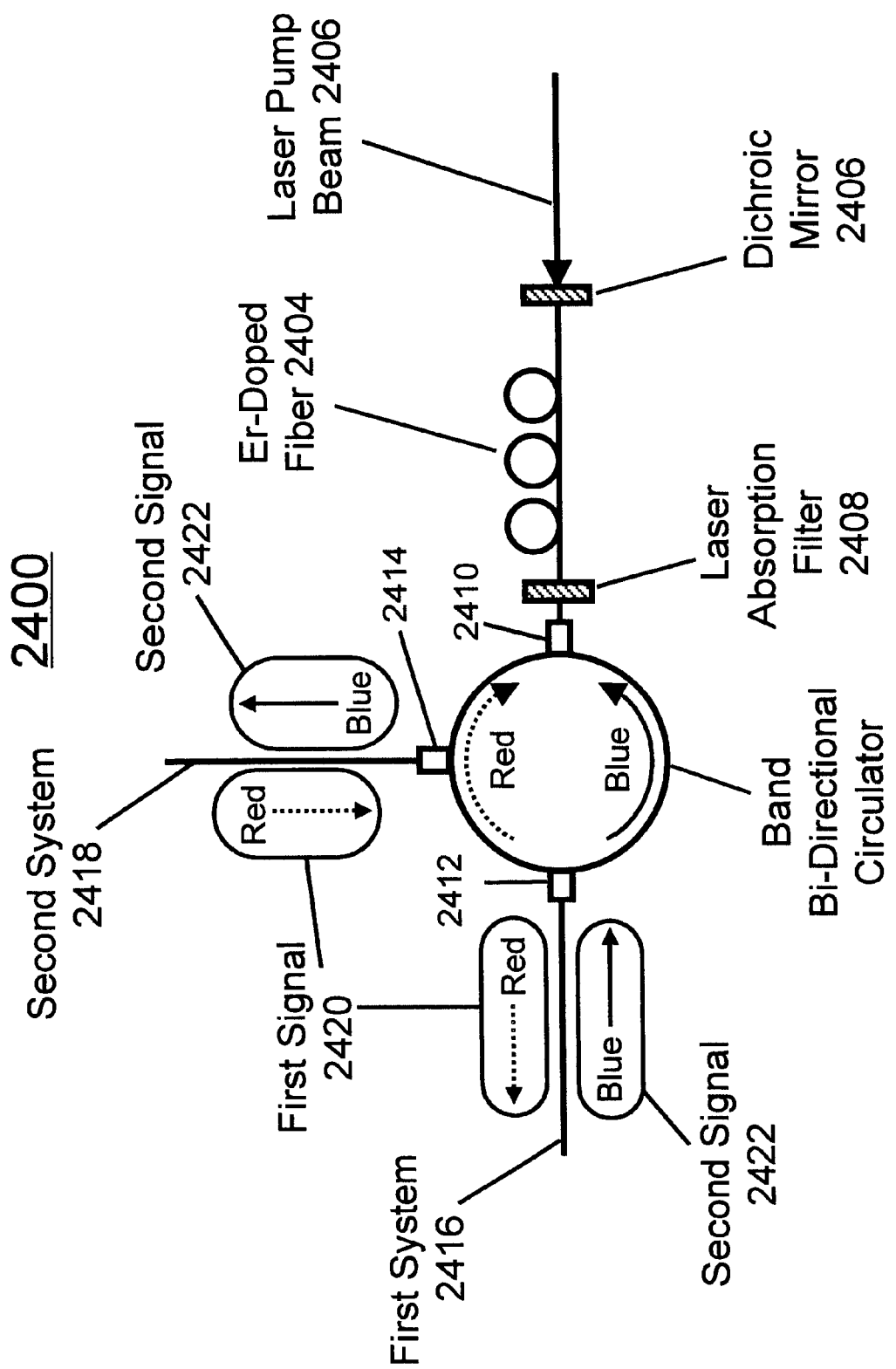
FIG. 24 is a diagram of an embodiment of the present invention comprising a bi-directional optical amplifier.

FIG. 24 illustrates another embodiment of the present invention comprising a bi-directional optical amplifier. The bi-directional optical amplifier 2400 of FIG. 24 comprises a three-port bi-directional circulator 2402 optically coupled, via a first port 2410 to an Er-doped fiber 2404 or other optical gain element. Disposed at the termination of the Er-doped fiber 2404 furthest from circulator 2402 is a dichroic mirror 2406 which reflects the wavelengths of optical signals but permits a laser pump beam 2406 to pass therethrough in a direction towards the circulator 2402. An optional laser absorption filter 2408 disposed between the Er-doped fiber 2404 and the circulator 2402 removes the laser pump beam from the signal and prevents it from entering circulator 2402. The second port 2412 and third port 2414 of bi-directional circulator 2402 are optically coupled to a first 2416 and second 2418 bi-directional wavelength division multiplexed optical communication system, respectively. Each of these bi-directional communication systems carries a first composite signal 2420 which propagates therethrough in a first direction and a second composite signal 2422 which propagates therethrough in a second direction opposite to the first direction. In the discussion of the present example, it is assumed that the bi-directional systems 2416 and 2418 comprise band bi-directional systems and, correspondingly, that the bi-directional circulator 2402 comprises a band bi-directional circulator. The bi-directional optical amplifier 2400 is not limited to band bi-directional systems or components, however and could comprise an interleaved bi-directional system.

The circulation directions of the bi-directional circulator 2402 are disposed such that composite signals 2420 and 2422 are circulated in directions such that they are directed to the first port 2410 after being input to circulator 2402 from third port 2414 and first port 2412, respectively. Therefore, according to FIG. 24 and this discussion pertaining thereto, it is assumed that the first composite signal 2420, whose wavelengths are of the "red" band, travels to circulator 2402 through the second bi-directional system 2418 and circulates in the logical clockwise direction within circulator 2402. Correspondingly, it is assumed that the second composite signal 2422, whose wavelengths are of the "blue" band, travels to circulator 2402 through the first bi-directional system 2416 and circulates in the logical counterclockwise direction.

The first composite signal 2420 enters bi-directional circulator 2402 through the third port 2414 and is directed, within circulator 2402, in the logical clockwise direction so as to exit the circulator through the first port 2410. The second composite signal 2422 enters bi-directional circulator 2402 through the second port 2412 and is directed, within circulator 2402, in the logical counterclockwise direction so as to exit the circulator through the first port 2410. Both composite signals 2420 and 2422 are output from first port 2410 and pass through the laser absorption filter 2408 to the Er-doped fiber 2404. After traversing the length of Er-doped fiber 2404, the two composite signals 2420 and 2422 are reflected by dichroic mirror 2406 back to Er-doped fiber 2404 so as to traverse the fiber for a second time and in the direction towards circulator 2402. Simultaneously, the laser pump beam is transmitted through dichroic mirror 2406 so as to enter and travel through the Er-doped fiber 2404 in the direction towards circulator 2402. The propagation of the laser pump beam 2406 together with the composite signals 2420 and 2422 within Er-doped fiber causes amplification of each of the component signals of each composite signal. Both composite signals, so amplified, subsequently pass through the laser absorption filter 2408 re-enter bi-directional circulator 2402 through first port 2410 whilst the laser pump beam is removed by laser absorption filter 2408. The now-amplified first composite signal 2420 and second composite signal 2422 are then directed through circulator 2402 in the logical clockwise direction to port 2412 and counterclockwise direction to port 2414, respectively. The amplified first composite signal 2420 is then outputted from the port 2412 of circulator 2402 to the first bi-directional communication system 2416. Likewise, the amplified second composite signal 2422 is then outputted from the port 2414 of circulator 2402 to the second bi-directional communication system 2418. In this fashion, the bi-directional optical amplifier 2400 of the present invention performs the simultaneous amplification function of two mutually counter-propagating composite signals.

Figure 25:
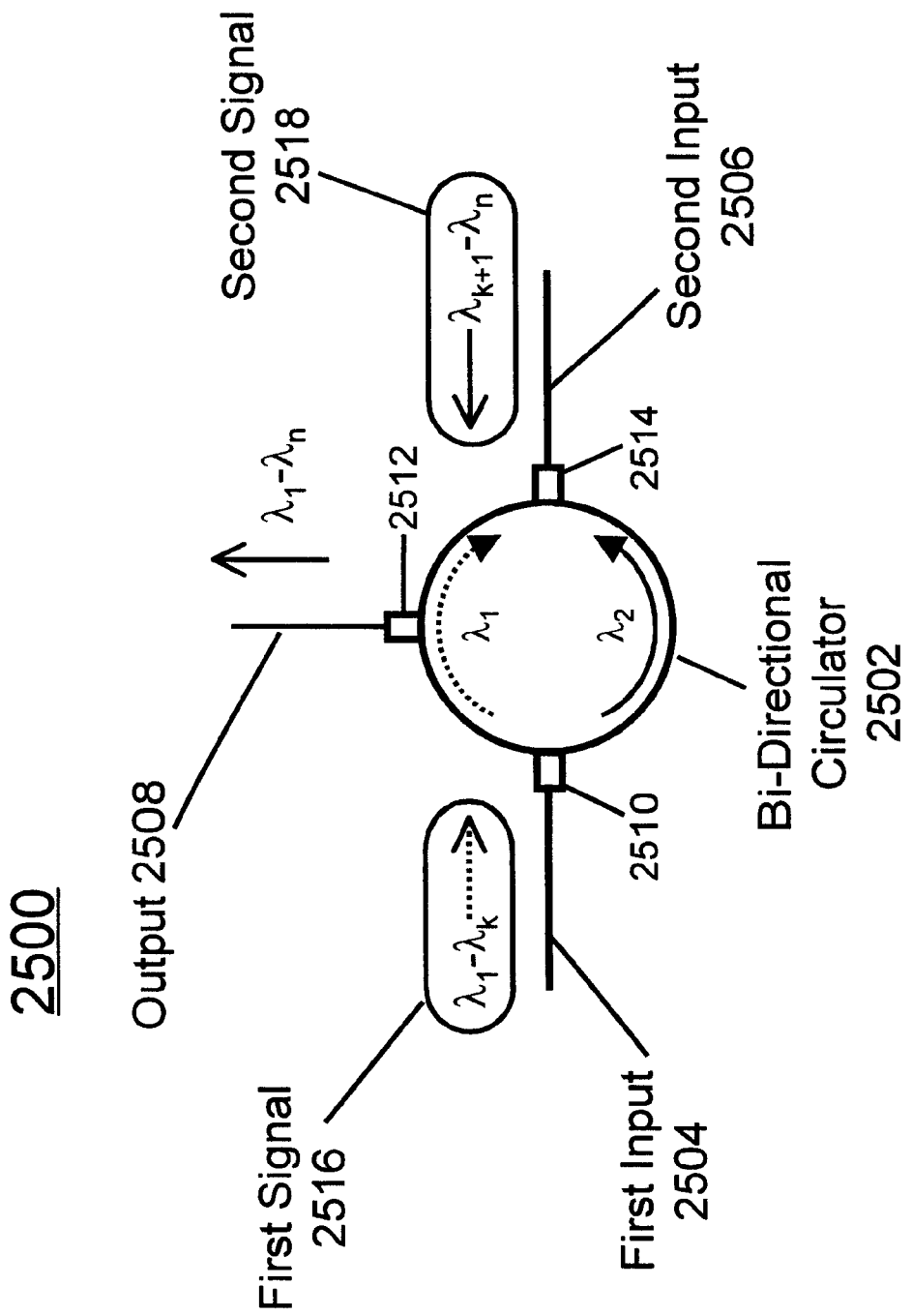
FIG. 25 is a diagram of an embodiment of the present invention comprising a two-way multiplexer.

FIG. 25 illustrates another embodiment of the present invention comprising a two-way wavelength division optical multiplexer. The multiplexer 2500 of the embodiment of the present invention illustrated in FIG. 25 comprises a three-port bi-directional circulator 2502 optically coupled to a first optical input 2504, a second optical input 2506 and an optical output 2508. The three ports of bi-directional circulator 2502 comprise a first port 2510, a second port 2512 and a third port 2514 disposed about the circulator 2502 in this order with the first port 2510, second port 2512 and third port 2514 optically coupled to the first input 2504, output 2508 and second input 2506, respectively. The first input 2504 and second input 2506 respectively carry a first composite signal 2516 comprising wavelengths $\lambda_1$–$\lambda_k$ and a second composite signal 2518 comprising wavelengths $\lambda_{k+1}$–$\lambda_n$ in the direction towards the circulator 2502. The circulation directions of bi-directional circulator 2502 are disposed such that the wavelengths $\lambda_1$–$\lambda_k$ of the first signal are directed within circulator 2502 from first port 2510 to second port 2512 and also such that the wavelengths $\lambda_{k+1}$–$\lambda_n$ of the second signal are directed within circulator 2502 from third port 2514 to second port 2512. Thus, after being input to circulator 2502 from the first port 2510 and the third port 2514, respectively, both the first signal 2516 and second signal 2518 are directed to second port 2512 from which they are output. The first signal 2516 and second signal 2518 are thus combined so as to simultaneously co-propagate away from circulator 2502 along output line 2508. In this way, the multiplexer 2500 performs the signal multiplexing operation.

Figure 26:
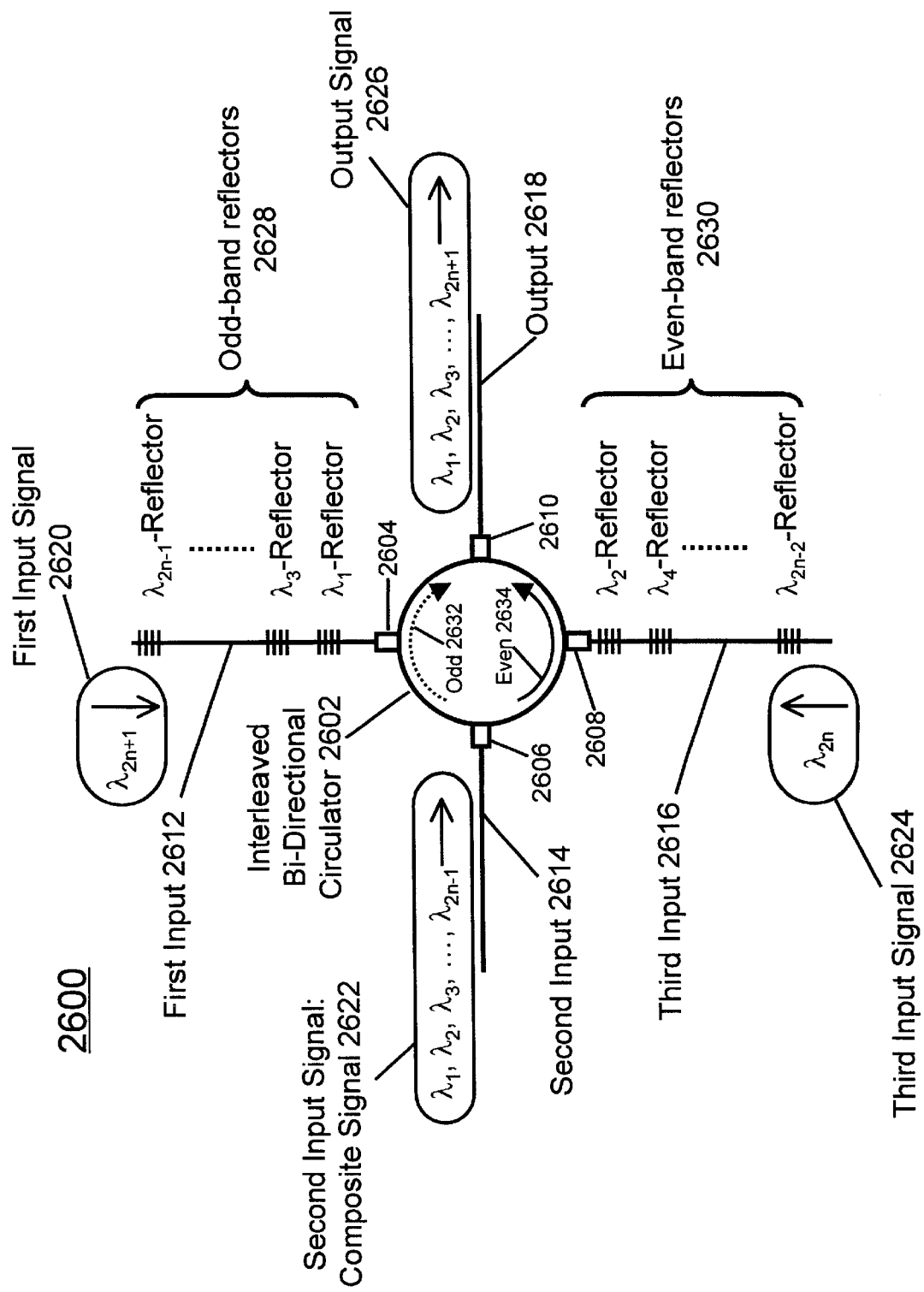
FIG. 26 is a diagram of an embodiment of the present invention comprising a three-way multiplexer.

Finally, FIG. 26 illustrates another embodiment of the present invention comprising a three-way wavelength division optical multiplexer. The three-way wavelength division optical multiplexer 2600 comprises a four-port bi-directional optical circulator 2602, a first input optical communication system 2612, a second input optical communication system 2614, a third input optical communication system 2616 and an output optical communication system 2618. The bi-directional circulator comprises a first port 2604, a second port 2606, a third port 2608 and a fourth port 2610 disposed about the circulator 2602 in this order and optically coupled to the first input 2612, second input 2614, third input 2616 and output 2618 optical communication systems, respectively. The first input optical communication system 2612 and third input optical communication system 2616 respectively carry a first input optical signal 2620 and a third input optical signal 2624 towards bi-directional circulator 2602. For simplicity, it is assumed in the present discussion that each of the signals 2620 and 2624 comprises a single wavelength channel. It is to be understood, however, that, in general, either or both of the signals 2620 and 2624 may comprise a composite signal comprised of a plurality of wavelength channels. The second input optical communication system 2614 carries, in the direction towards bi-directional circulator 2602, a composite signal 2622 comprised of a plurality of individual signals each at a different wavelength. The output system 2618 carries, in the direction away from bi-directional circulator 2602, a composite output signal 2626 comprised of all the individual signals of composite signal 2622 together with the first input signal 2620 and the third input signal 2624.

The bi-directional circulator directs signals therein along both a logical clockwise and a logical counterclockwise circulation direction. For purposes of the discussion of this example, it is assumed that the logical clockwise circulation direction is defined by the sequence of ports 2604, 2610, 2608, 2606 and 2604, in this order, and that the logical counterclockwise circulation direction is defined by the reverse sequence of ports. The composite signal 2622 is comprised of two subsets of signals, a first 2632 and second 2634 subset which are circulated through circulator 2602 in the logical clockwise and counterclockwise direction, respectively. Disposed along the first input optical communication system 2612 are a series 2628 of grating reflectors, preferably in-fiber Bragg grating reflectors, disposed so as to reflect each of and only the signals comprising signal subset 2632. Likewise, disposed along the third input optical communication system 2616 are a series 2630 of grating reflectors, preferably in-fiber Bragg grating reflectors, disposed so as to reflect each of and only the signals comprising the signal subset 2634. Furthermore, the first input signal 2620 and third input signal 2624 are of wavelengths such that these signals are circulated in the clockwise and counterclockwise directions, respectively, through circulator 2602. Still further, the first input signal 2620 and third input signal 2624 comprise wavelengths that are different from one another and different from any wavelength of any signal comprising composite signal 2622.

The operation of the three-way wavelength division optical multiplexer 2600 is now described in detail with reference to FIG. 26. For purposes of the present example, it is assumed that the bi-directional circulator 2602 is an inter-leaved bi-directional circulator and that the odd-numbered and even-numbered signal channels of composite signal 2622 comprise the clockwise circulated subset 2632 and the counterclockwise circulated subset 2634, respectively. Furthermore, according to the above assumptions, first input signal 2620 and second input signal 2624 comprise an odd channel and even channel, respectively. As shown in FIG. 26, the composite signal 2622 is carried to bi-directional circulator 2602 through input optical communication system 2614 and input to circulator 2602 through its second port 2606. The signal subset 2632 comprising the odd-numbered channels of signal 2622 is directed in the logical clockwise direction through circulator 2602 towards port 2604. Contrariwise, the signal subset 2634 comprising the even-numbered channels of signal 2622 is directed in the logical counterclockwise direction through circulator 2602 towards port 2608. The signal subset 2632 and signal subset 2634 are output from port 2604 to first input optical communication system 2612 and from port 2608 to third input optical communication system 2616, respectively. Each individual signal of signal subset 2632 is reflected back towards port 2604 by one and only one of the grating reflectors comprising reflector set 2628. Each individual signal of signal subset 2634 is reflected back towards port 2608 by one and only one of the grating reflectors comprising reflector set 2630. The first signal subset 2632 and second signal subset 2634 therefore re-enter circulator 2602 via port 2604 and 2608, respectively. Subsequently, the first signal subset 2632 and second signal subset 2634 are circulated in the clockwise and counterclockwise directions, respectively, through circulator 2602 to port 2610.

As is further shown in FIG. 26, the first input signal 2620 is carried towards bi-directional circulator 2602 through first input optical communication system 2612. Because the first input signal 2620 is of a wavelength different from the wavelength of any signal wavelength comprising signal subset 2632 and because the set of grating reflectors 2628 only reflect wavelengths comprising signals of subset 2632, the first input signal 2620 travels completely through reflector set 2628. The first input signal 2620 is thus input to circulator 2602 through first port 2604. Likewise, the third input signal 2624 is carried towards bi-directional circulator 2602 via the third input optical communication system 2616, passes through grating reflector set 2630 and is subsequently input to circulator 2602 through third port 2608. Because first input signal 2620 is circulated in the logical clockwise direction through circulator 2602, it is combined with the re-input signal subset 2632 and circulated from port 2604 to port 2610. Because third input signal 2616 is circulated in the logical counterclockwise direction through circulator 2602, it is combined with the re-input signal subset 2634 and circulated from port 2608 to port 2610.

According to the above discussion and FIG. 26, the first input signal 2620, the odd-channel signal subset 2632, the even-channel signal subset 2634 and the third input signal 2624 are all directed to the output port 2610 of circulator 2602. By the properties of bi-directional circulator 2602, all such signals and signal subsets are thus recombined at port 2610 and output from circulator 2602 to the output optical communication system 2618 as output composite signal 2626. In this fashion, the three-way wavelength division optical multiplexer 2600 performs its function of combining three inputs into a single output in a single stage of operation.

The present invention has been described with respect to the above-mentioned embodiments, but is not limited thereto.

The many features and advantages of the present invention are apparent from the detailed specification and, thus, it is intended claims to cover all such features and advantages of the present invention which fall within the true spirit and scope of the present invention. Further, since numerous modifications and changes will readily occur to those skilled in the art, it is not desired to limit the present invention to the exact construction and operation illustrated and described, and accordingly all suitable modifications and equivalents may be resorted to, falling within the scope of the present invention as described in the appended claims.

What is claimed is:

1. A method of bi-directional optical circulation for a logical sequence of optical input/output ports, said method comprising:

transmitting light of a first set of lights from an input port to a next logical port in the logical sequence as an output port for the light of the first set of lights; and transmitting light of a second set of lights from an input port to a preceding logical port in the logical sequence as an output port for the light of the second set of lights.

2. The method according to claim 1, wherein the light of the first set of lights and the light of the second set of lights is prevented from being output by a port other than the corresponding output port.

3. The method according to claim 1, wherein the light of the first set of lights is interleaved according to wavelength with the light of the second set of lights.

4. The method according to claim 1, wherein the light of the first set of lights is transmitted in a first band of wavelengths and the light of the second set of lights is transmitted in a second band of wavelengths, and wherein the first band and the second band are individually contiguous with each other.

5. The method according to claim 4, wherein each of the first band and the second band comprises wavelength multiplexed channels, each of the channels carrying a signal.

6. A bi-directional optical circulator transmitting light of a first set of lights from an input port of the bi-directional optical circulator to a next logical port of the bi-directional optical circulator and transmitting light of a second set of lights from an input port of the bi-directional optical circulator to a preceding logical port of the bi-directional optical circulator.

7. The bi-directional optical circulator according to claim 6, wherein the bi-directional optical circulator prevents the light of the first set of lights and the light of the second set of lights from being output by a port other than the corresponding output port.

8. The bi-directional optical circulator according to claim 6, wherein the light of the first set of lights is interleaved according to wavelength with the light of the second set of lights.

9. The bi-directional optical circulator according to claim 6, wherein the light of the first set of lights is transmitted in a first band of wavelengths and the light of the second set of lights is transmitted in a second band of wavelengths, and wherein the first band and the second band are individually contiguous with each other.

10. The bi-directional optical circulator according to claim 9, wherein each of the first band and the second band comprises wavelength multiplexed channels, each of the channels carrying a signal.

11. A bi-directional optical circulator comprising:

a ferrule comprising optical ports;

optical collimators corresponding to and adjacent to each of the optical ports;

a first birefringent walk-off plate adjacent to the collimators and separating unpolarized light input thereto into plane polarized o-ray and e-ray sub-lights;

a first reciprocal optical rotator adjacent to the first birefringent walk-off plate and opposite to the collimators and intercepting and reversibly rotating by a first amount a direction of a polarization plane of one of the two sub-lights from each port;

a second reciprocal optical rotator adjacent to the first birefringent walk-off plate and opposite to the collimators and intercepting and reversibly rotating by the first amount a direction of a polarization plane of another of the two sub-lights from each port;

a second birefringent walk-off plate adjacent to each of the first reciprocal optical rotator and the second reciprocal optical rotator and opposite to the first birefringent walk-off plate;

a third reciprocal optical rotator adjacent to the second birefringent walk-off plate and opposite to the first and second reciprocal optical rotators, intercepting and reversibly rotating by a second amount a direction of a polarization plane of light from each port;

a non-reciprocal optical rotator adjacent to the second birefringent walk-off plate and opposite to the first and second reciprocal optical rotators, intercepting and non-reversibly rotating by the second amount a direction of a polarization plane of light from each port;

a focusing lens adjacent to the third reciprocal optical rotator and to the non-reciprocal optical rotator and opposite to the second birefringent walk-off plate; and a reflecting element disposed at the focal point of the focusing lens and opposite to the third reciprocal optical rotator and to the non-reciprocal optical rotator.

12. The bi-directional optical circulator according to claim 11, wherein the reflecting element comprises a mirror and a waveplate assembly.

13. The bi-directional optical circulator according to claim 11, wherein the reflecting element comprises a non-linear interferometer.

14. A bi-directional wavelength division optical multiplexer comprising:

a bi-directional optical circulator transmitting light of a first set of lights from an input port of the bi-directional optical circulator to a next logical port of the bi-directional optical circulator and transmitting light of a second set of lights from an input port of the bi-directional optical circulator to a preceding logical port of the bi-directional optical circulator;

bi-directional optical communications systems each respectively coupled to one of the ports of the bi-directional optical circulator and each including sets of lights propagating in opposite directions from each other; and a uni-directional optical communication system coupled to another of the ports of the bi-directional optical circulator, comprising a set of channel-specific reflecting elements.

15. The bi-directional wavelength division optical multiplexer according to claim 14, wherein the sets of lights are each input from its respective bi-directional optical communications system to the bi-directional optical circulator, are propagated through the bi-directional optical circulator in opposite directions from each other, and are each output from the another port.

16. The bi-directional wavelength division optical multiplexer according to claim 15, wherein a first selection of wavelengths of one of the sets of lights output from the another port and a second selection of wavelengths of other of the sets of lights output from the another port are reflected back to and re-input into the bi-directional optical circulator at the another port and are output from their respective output ports, while non-selected wavelengths of each of the sets of lights are output from the another port.

17. A method of bi-directional wavelength division optical multiplexing comprising:

transmitting by a bi-directional optical circulator a first set of lights from an input port of the bi-directional optical circulator to a next logical port of the bi-directional optical circulator and transmitting a second set of lights from an input port of the bi-directional optical circulator to a preceding logical port of the bi-directional optical circulator;

inputting from bi-directional optical communications systems each respectively coupled to one of the ports of the bi-directional optical circulator sets of lights propagating in opposite directions from each other; and outputting the sets of lights to a unidirectional optical communication system coupled to another of the ports of the bi-directional optical circulator.

18. The method according to claim 17, wherein a first selection of wavelengths of one of the sets of lights output from the another port and a second selection of wavelengths of the other of the sets of lights output from the another port are reflected back to and re-input into the bi-directional optical circulator at the another port and are output from their respective output ports, while non-selected wavelengths of each of the sets of lights are output from the another port.

19. A bi-directional wavelength division optical add/drop multiplexer comprising:

bi-directional optical circulators each transmitting light of a first set of lights from an input port of the corresponding bi-directional optical circulator to an output port of the corresponding bi-directional optical circulator and transmitting in a direction opposite from that of the light of the first set of lights light of a second set of lights from an input port of the corresponding bi-directional optical circulator to an output port of the corresponding bi-directional optical circulator;

bi-directional optical communications systems, a first of said bi-directional optical communications systems transmitting the light of the first set of lights to and receiving the light of the second set of lights from a first of the bi-directional optical circulators, and a second of said bi-directional optical communications systems transmitting the light of the second set of lights to and receiving the light of the first set of lights from a second of the bi-directional optical circulators; and bi-directional add/drop systems adding and dropping light from each of the first set of lights and the second set of lights through the first of the bi-directional optical circulators and the second of the bi-directional optical circulators, wherein the bi-directional optical communications systems are each coupled to respective optical circulators through a first port of the optical circulators, the bi-directional add/drop systems are each optically coupled to respective optical circulators through a second port of the optical circulators and the bi-directional optical circulators are optically coupled to each other through a third of their respective ports.

20. The bi-directional wavelength division optical add/drop multiplexer according to claim 19, wherein the light of the first set of lights comprises first wavelengths propagating through the bi-directional optical circulators, the bi-directional optical communications systems, and the bi-directional add/drop systems in a first direction and the light of the second set of lights comprises second wavelengths propagating through the bi-directional optical circulators, the bi-directional optical communications systems, and the bi-directional add/drop systems in a second direction opposite to the first direction.

21. The bi-directional wavelength division optical add/drop multiplexer according to claim 19, wherein the first wavelengths include through-going wavelengths, dropped wavelengths and added wavelengths, and wherein:

the through-going wavelengths are transmitted from a first of the bi-directional optical communications systems to a first of the bi-directional optical circulators to a second of the bi-directional optical circulators, and are output from the second of the bi-directional optical circulators;

the dropped wavelengths are transmitted from the first of the bi-directional optical circulators to a reflector, then back to the first of the bi-directional optical circulators, and to a first of the bi-directional add/drop systems; and the added wavelengths are transmitted from a second of the bi-directional add/drop systems to the second of the bi-directional optical circulators, to another reflector, back to the second of the bi-directional optical circulators, and to the second of the optical communications systems.

22. The bi-directional wavelength division optical add/drop multiplexer according to claim 21, wherein the through-going wavelengths are transmitted from the first of the bi-directional optical communications systems to the first port of the first of the bi-directional optical circulators to the third port of the first of the bi-directional optical circulators, the dropped wavelengths are transmitted from the first port of the first of the bi-directional optical circulators to the third port of the first of the bi-directional optical circulators and from the third port of the first of the bi-directional optical circulators to the second port of the first of the bi-directional optical circulators, and the added wavelengths are transmitted from the second port of the second of the bi-directional optical circulators to the third port of the second of the bi-directional optical circulators and from the third port of the second of the bi-directional optical circulators to the first port of the second of the bi-directional optical circulators.

23. The bi-directional wavelength division optical add/drop multiplexer according to claim 21, wherein the second wavelengths include through-going wavelengths, dropped wavelengths and added wavelengths, and wherein:

the through-going wavelengths are transmitted from a second of the bi-directional optical communications systems to a second of the bi-directional optical circulators to a first of the bi-directional optical circulators, and are output from the first of the bi-directional optical circulators;

the dropped wavelengths are transmitted from the second of the bi-directional optical circulators to a reflector, then back to the second of the bi-directional optical circulators, and to a second of the bi-directional add/drop systems; and the added wavelengths are transmitted from a first of the bi-directional add/drop systems to the first of the bi-directional optical circulators, to another reflector, back to the first of the bi-directional optical circulators, and to the first of the optical communications systems.

24. The bi-directional wavelength division optical add/drop multiplexer according to claim 23, wherein the through-going wavelengths are transmitted from the second of the bi-directional optical communications systems to the first port of the first of the bi-directional optical circulators to the third port of the second of the bi-directional optical circulators, the dropped wavelengths are transmitted from the first port of the second of the bi-directional optical circulators to the third port of the second of the bi-directional optical circulators and from the third port of the second of the bi-directional optical circulators to the second port of the second of the bi-directional optical circulators, and the added wavelengths are transmitted from the second port of the first of the bi-directional optical circulators to the third port of the first of the bi-directional optical circulators and from the third port of the first of the bi-directional optical circulators to the first port of the first of the bi-directional optical circulators.

25. A method of bi-directional wavelength division optical add/drop multiplexing comprising:

transmitting by a first optical communications system light of a first set of lights and comprising first wavelengths to a first bi-directional optical circulator and transmitting by a second optical communications system light of a second set of lights and comprising second wavelengths to a second bi-directional optical circulator;

transmitting by the first bi-directional optical circulator the light of the first set of lights from an input port to an output port of the first bi-directional optical circulator, and transmitting in a direction opposite from that of the light of the first set of lights the light of a second set of lights from an input port to an output port of the first bi-directional optical circulator;

transmitting by the second bi-directional optical circulator the light of the first set of lights from an input port to an output port of the second bi-directional optical circulator, and transmitting in a direction opposite from that of the light of the first set of lights the light of a second set of lights from an input port to an output port of the second bi-directional optical circulator; and outputting by the first bi-directional optical circulator the light of the second set of lights to the first optical communications system and by the second bi-directional optical circulator the light of the first set of lights to the second optical communications system.

26. The method according to claim 25, further comprising:

adding light to and dropping light from the second set of lights and the first set of lights, respectively, by a first bi-directional add/drop system through the first bi-directional optical circulator; and adding light to and dropping light from the first set of lights and the second set of lights, respectively by a second bi-directional add/drop system through the second bi-directional optical circulator.

27. The method according to claim 26, wherein the light of the first set of lights comprises first wavelengths propagating through the bi-directional optical circulators, the bi-directional optical communications systems, and the bi-directional add/drop systems in a first direction and the light of the second set of lights comprises second wavelengths propagating through the bi-directional optical circulators, the bi-directional optical communications systems, and the bi-directional add/drop systems in a second direction opposite to the first direction.

28. The method according to claim 27, wherein the first wavelengths include through-going wavelengths, dropped wavelengths and added wavelengths, and said method further comprising:

transmitting the through-going wavelengths from the first bi-directional optical communications system to the first bi-directional optical circulator to the second bi-directional optical circulator;

outputting the through-going wavelengths from the second bi-directional optical circulator;

transmitting the dropped wavelengths from the first bi-directional optical circulator to a reflector, then back to the first bi-directional optical circulator, and to the first bi-directional add/drop system; and transmitting the added wavelengths from the second bi-directional add/drop system to the second bi-directional optical circulator, to another reflector, back to the second bi-directional optical circulator, and to the second optical communications systems.

29. The method according to claim 28, further comprising:

transmitting the through-going wavelengths from the first bi-directional optical communications system to a first port of the first bi-directional optical circulator to a third port of the first bi-directional optical circulator;

transmitting the dropped wavelengths from the first port of the first bi-directional optical circulator to the third port of the first bi-directional optical circulator and from the third port of the first bi-directional optical circulator to a second port of the first bi-directional optical circulator; and transmitting the added wavelengths from a second port of the second bi-directional optical circulator to a third port of the second bi-directional optical circulator and from a third port of the second bi-directional optical circulator to a first port of the second bi-directional optical circulator.

30. The method according to claim 29, wherein the second wavelengths include through-going wavelengths, dropped wavelengths and added wavelengths, the method further comprising:

transmitting the through-going wavelengths of the second wavelengths from the second bi-directional optical communications system to a first port of the second bi-directional optical circulator to a third port of the second bi-directional optical circulator;

transmitting the dropped wavelengths of the second wavelengths from the first port of the second bi-directional optical circulator to the third port of the second bi-directional optical circulator and from the third port of the second bi-directional optical circulator to a second port of the second bi-directional optical circulator; and transmitting the added wavelengths of the second wavelengths from a second port of the first bi-directional optical circulator to a third port of the first bi-directional optical circulator and from a third port of the first bi-directional optical circulator to a first port of the first bi-directional optical circulator.

31. A three-way optical channel separator apparatus comprising:

a four-port bi-directional optical circulator optically coupled to an input communication system through its logical first port, to a first output communication system through its logical third port, and to second and third output communication systems through its remaining ports, wherein a set of channel-specific reflecting elements is disposed within the second output system and the third output system.

32. The three-way optical channel separator apparatus according to claim 31, wherein a set of wavelengths comprising a first and a second wavelength subset is input to the four-port bi-directional optical circulator through its first port such that the first wavelength set is directed by said four-port bi-directional optical circulator in a logical first circulation direction to the logical second port of the four-port bi-directional optical circulator.

33. The three-way optical channel separator apparatus according to claim 32, wherein the second wavelength set is directed by said four-port bi-directional optical circulator in a logical second circulation direction opposite to that of the logical first circulation direction to th e logical fourth port of the four-port bi-directional optical circulator.

34. The three-way optical channel separator apparatus according to claim 31, wherein the channel-specific reflecting elements reflect a first selection of the first wavelength set back to the four-port bi-directional optical circulator, said four-port bi-directional optical circulator re-inputting the first selection at the second port, circulating the first selection in the first logical direction, and outputting the first selection from the third port to the first output communications system.

35. The three-way optical channel separator apparatus according to claim 34, wherein non-selected wavelengths of the first wavelength set are output from the second port to the second optical output communications system.

36. The three-way optical channel separator apparatus according to claim 34, wherein the channel-specific reflecting elements reflect a second selection of the second wavelength set back to the four-port bi-directional optical circulator, said four-port bi-directional optical circulator re-inputting the second selection at the fourth port, circulating the second selection in the second logical direction, and outputting the second selection from the third port to the first output communications system.

37. The three-way optical channel separator apparatus according to claim 36, wherein non-selected wavelengths of the second wavelength set are output from the fourth port to the third optical output communications system.

38. The three-way optical channel separator apparatus according to claim 31, wherein the set of channel-specific reflecting elements includes Bragg grating reflectors.

39. A method of three-way optical channel separation, comprising:

inputting a set of wavelengths comprising a first and a second wavelength subset to a four-port bi-directional optical circulator through its first port such that the first wavelength set is directed by said four-port bi-directional optical circulator in a logical first circulation direction to the logical second port of the four-port bi-directional optical circulator, and the second wavelength set is directed by said four-port bi-directional optical circulator in a logical second circulation direction opposite to that of the logical first circulation direction to the logical fourth port of the four-port bi-directional optical circulator.

40. The method according to claim 39, further comprising:

reflecting by a set of channel-specific reflecting elements a first selection of the first wavelength set back to the four-port bi-directional optical circulator;

re-inputting by said four-port bi-directional optical circulator the first selection at the second port;

circulating by the four-port bi-directional optical circulator the first selection in the first logical direction; and outputting by the four-port bi-directional optical circulator the first selection from the third port to the first output communications system.

41. The method according to claim 40, further comprising outputting non-selected wavelengths of the first wavelength set from the second port to the second optical output communications system.

42. The method according to claim 40, further comprising:

reflecting by the channel-specific reflectors a second selection of the second wavelength set back to the four-port bi-directional optical circulator;

re-inputting by the four-port bi-directional optical circulator the second selection at the fourth port;

circulating by the four-port bi-directional optical circulator the second selection in the second logical direction; and outputting by the four-port bi-directional optical circulator the second selection from the third port to the first output communications system.

43. The method according to claim 42, further comprising:

outputting non-selected wavelengths of the second wavelength set from the fourth port to the third optical output communications system.

44. A bi-directional optical amplifier comprising:
- a three-port bi-directional optical circulator optically coupled to two bi-directional optical communications systems through two of its ports; and
- an optical gain element optically at a first end coupled to the three-port bi-directional optical circulator through a third port of the three-port bi-directional optical circulator.

45. The bi-directional optical amplifier according to claim 44, further comprising:
- a dichroic mirror reflecting signal wavelengths and transmitting pump laser wavelengths optically coupled to another end of the optical gain element; and
- a pump laser beam optically coupled to the another end of the optical gain element through the dichroic mirror.

46. A method for bi-directional optical amplification within a bi-directional optical communications system, comprising:
- inputting a first set of wavelengths into a three-port bi-directional optical circulator through a first port thereof and inputting a second set of wavelengths different than the first set of wavelengths into the three-port bi-directional optical circulator through a second port thereof;
- propagating by the three-port bi-directional optical circulator the first set of wavelengths in a first direction and the second set of wavelengths in a second direction opposite to that of the first direction; and
- outputting to an optical gain element the first set of wavelengths and the second set of wavelengths by a third port of the three-port bi-directional optical circulator.

47. The method according to claim 46, further comprising:
- propagating the first set of wavelengths and the second set of wavelengths through the optical gain element;
- reflecting by a dichroic mirror the first set of wavelengths and the second set of wavelengths back through the optical gain element to the third port while inputting a laser pump beam into the optical gain element through the dichroic mirror.

48. The method according to claim 47, further comprising:
- preventing the laser pump beam from entering the three-port bi-directional optical circulator;
- re-inputting into the third port the first set of wavelengths and the second set of wavelengths to the three-port bi-directional optical circulator; and
- circulating the first set of wavelengths by the three-port bi-directional optical circulator in the first direction to the second port and circulating the second set of wavelengths by the three-port bi-directional optical circulator in the second direction to the first port.

49. A two-way wavelength division optical multiplexer comprising:
- a three-port bi-directional optical circulator including a first port optically coupled to a first input, a second port optically coupled to a second input, and a third port optically coupled to an output optical communication system, said three-port bi-directional optical circulator receiving a first set of wavelengths input to the first port, directing in a first direction the first set of wavelengths through the three-port bi-directional optical circulator to the third port, and outputting the first set of wavelengths from the third port, said three-port bi-directional optical circulator receiving a second set of wavelengths input to the second port, directing in a second direction opposite to the first direction the second set of wavelengths through the three-port bi-directional optical circulator to the third port, and outputting the second set of wavelengths from the third port.

50. A method of wavelength division optical multiplexing, comprising:
- receiving by a first port of a three-port bi-directional optical circulator a first set of wavelengths and by a second port of the three-port bi-directional optical circulator a second set of wavelengths;
- directing the first set of wavelengths through the three-port bi-directional optical circulator in a first direction to a third port of the three-port bi-directional optical circulator, and directing the second set of wavelengths through the three-port bi-directional optical circulator in a second direction opposite to the first direction to the third port; and
- outputting the first set of wavelengths and the second set of wavelengths by the third port.

51. A three-way optical multiplexer comprising:
- a first input optical communication system transmitting a first set of wavelengths and comprising channel-specific reflectors;
- a second input optical communication system transmitting a second set of wavelengths comprising a first subset of the second set of wavelengths and a second subset of the second set of wavelengths;
- a third input optical communication system transmitting a third set of wavelengths and comprising channel-specific reflectors; and
- a four-port bi-directional optical circulator, optically coupled to each of the first, second, and third input optical communication systems through a respective one of the ports of the four-port bi-directional optical circulator, said four-port bi-directional optical circulator interleaving the first set of wavelengths, the second set of wavelengths, and the third set of wavelengths with each other to form an output signal comprising the first set of wavelengths, the second set of wavelengths, and the third set of wavelengths, by directing each of the first set of wavelengths, the first subset of the second set of wavelengths, the second subset of the second set of wavelengths, and the third set of wavelengths through the four-port bi-directional optical circulator in one of a first direction and a second direction opposite to the first direction, wherein the first subset of wavelengths of the second set of wavelengths is reflected by the channel-specific reflectors of the first input optical communication system and the second subset of wavelengths of the second set of wavelengths is reflected by the channel-specific reflectors of the third input optical system.

52. A method of three-way wavelength division optical multiplexing, comprising:
- interleaving by a four-port bi-directional optical circulator a first set of input wavelengths, a second set of input wavelengths, and a third set of input wavelengths with each other to form an output signal comprising the first set of wavelengths, the second set of wavelengths, and the third set of wavelengths, by directing each of the first set of wavelengths, a first subset of the second set of wavelengths, a second subset of the second set of wavelengths, and the third set of wavelengths through the four-port bi-directional optical circulator in one of a first direction and a second direction opposite to the first direction, including reflecting the first subset of wavelengths of the second set of wavelengths by first channel-specific reflectors and the second subset of wavelengths of the second set of wavelengths by second channel-specific reflectors.

53. A three-way optical multiplexer comprising:

a first input optical communication system transmitting a first set of wavelengths and comprising channel-specific reflectors;

a second input optical communication system transmitting a second set of wavelengths;

a third input optical communication system transmitting a third set of wavelengths and comprising channel-specific reflectors;

an output optical communication system; and a four-port bi-directional optical circulator including a first, a second, a third, and a fourth port, said four-port bi-directional optical circulator optically coupled to the first input optical communication system through the first port, to the second input optical communication system through the second port, to the third input optical communication system through the third port, and to the output optical communication system through the fourth port, wherein said first set of wavelengths are elements of a first subset of wavelengths directed through the four-port bi-directional optical circulator in a first circulation direction, the third set of wavelengths are elements of a second subset of wavelengths directed through the four-port bi-directional optical circulator in a second direction opposite to the first direction, and the second set of wavelengths comprise elements of the first wavelength subset and the second wavelength subset, said second set of wavelengths comprising the first wavelength subset are directed through the four-port bi-directional optical circulator in the first circulation direction from the second port to the first port, are output by the first port, are reflected back into the first port, are circulated in the first circulation direction to the fourth port and output therefrom, and said second set of wavelengths comprising the second wavelength subset are directed through the four-port bi-directional optical circulator in the second circulation direction from the second port to the third port, are output by the third port, are reflected back into the third port, are circulated in the second circulation direction to the fourth port and output therefrom, such that said four-port bi-directional optical circulator interleaves the first set of wavelengths, the second set of wavelengths, and the third set of wavelengths with each other to form a composite set of wavelengths and outputting the composite set of wavelengths through the fourth port.

54. A method of three-way wavelength division optical multiplexing, comprising:

interleaving and outputting by a four-port bi-directional optical circulator including a first, a second, a third, and a fourth port, a first set of wavelengths, a second set of wavelengths, and a third set of wavelengths input thereto with each other, said first set of wavelengths being elements of a first subset of wavelengths directed through the four-port bi-directional optical circulator in a first circulation direction, the third set of wavelengths being elements of a second subset of wavelengths directed through the four-port bi-directional optical circulator in a second circulation direction opposite to the first direction, and the second set of wavelengths comprise elements of the first wavelength subset and the second wavelength subset, wherein said second set of wavelengths comprising the first wavelength subset are directed through the four-port bi-directional optical circulator in the first circulation direction from the second port to the first port, output by the first port, reflected back into the first port, circulated in the first circulation direction to the fourth port and output therefrom, and said second set of wavelengths comprising the second wavelength subset are directed through the four-port bi-directional optical circulator in the second circulation direction from the second port to the third port, are output by the third port, are reflected back into the third port, are circulated in the second circulation direction to the fourth port and output therefrom.

55. A bi-directional optical circulator within which a first subset of two mutually exclusive subsets of signals propagates in a first direction and a second subset of the two mutually exclusive subsets of signals propagates in a second direction opposite to the first direction.

56. A multiplexer comprising a bi-directional optical circulator within which a first subset of two mutually exclusive subsets of signals propagates in a first direction and a second subset of the two mutually exclusive subsets of signals propagates in a second direction opposite to the first direction.

57. A de-multiplexer comprising a bi-directional optical circulator within which a first subset of two mutually exclusive subsets of signals propagates in a first direction and a second subset of the two mutually exclusive subsets of signals propagates in a second direction opposite to the first direction.

58. An apparatus comprising:

a multiplexer comprising a first bi-directional optical circulator within which a first subset of two mutually exclusive subsets of signals propagates in a first direction and a second subset of the two mutually exclusive subsets of signals propagates in a second direction opposite to the first direction; and a de-multiplexer comprising a second bi-directional optical circulator within which the first subset of the two mutually exclusive subsets of signals propagates in the first direction and the second subset of the two mutually exclusive subsets of signals propagates in the second direction opposite to the first direction.

* * * * *